United States Patent
Kagawa

(10) Patent No.: US 11,398,237 B2
(45) Date of Patent: Jul. 26, 2022

(54) COMMUNICATION TERMINAL, SHARING SYSTEM, DISPLAY CONTROL METHOD, AND NON-TRANSITORY COMPUTER-READABLE MEDIUM

(71) Applicant: Masaaki Kagawa, Tokyo (JP)

(72) Inventor: Masaaki Kagawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 163 days.

(21) Appl. No.: 16/795,577

(22) Filed: Feb. 20, 2020

(65) Prior Publication Data
US 2020/0273464 A1 Aug. 27, 2020

(30) Foreign Application Priority Data

Feb. 21, 2019 (JP) .............................. JP2019-029094

(51) Int. Cl.
| | |
|---|---|
| *G10L 15/22* | (2006.01) |
| *G10L 15/26* | (2006.01) |
| *G10L 15/30* | (2013.01) |
| *G06F 3/14* | (2006.01) |
| *G06F 3/16* | (2006.01) |

(52) U.S. Cl.
CPC ................ *G10L 15/26* (2013.01); *G06F 3/14* (2013.01); *G06F 3/167* (2013.01); *G10L 15/22* (2013.01); *G10L 15/30* (2013.01)

(58) Field of Classification Search
CPC . G06F 3/14; G06F 3/167; G10L 15/22; G10L 15/26
See application file for complete search history.

(56) References Cited

U.S. PATENT DOCUMENTS

| | | | | |
|---|---|---|---|---|
| 4,468,751 A | * | 8/1984 | Plunkett, Jr. ............ | G06F 40/10 360/55 |
| 4,658,097 A | * | 4/1987 | D'Agosto, III ........ | H04M 11/10 369/25.01 |
| 5,848,217 A | * | 12/1998 | Tsukagoshi .......... | G11B 27/034 386/239 |

(Continued)

FOREIGN PATENT DOCUMENTS

| | | | | |
|---|---|---|---|---|
| EP | 1061773 A2 | * | 12/2000 | ............. H04S 1/007 |
| EP | 2073511 A1 | * | 6/2009 | ......... G06F 3/04847 |

(Continued)

*Primary Examiner* — Daniel C Washburn
*Assistant Examiner* — Oluwadamilola M Ogunbiyi
(74) *Attorney, Agent, or Firm* — Xsensus LLP

(57) ABSTRACT

A communication terminal is communicable with a conversion system. The communication terminal includes circuitry configured to: receive a selection of one of a first mode and a second mode, the first mode being a mode in which audio data obtained based on sound collected by a sound collecting device is converted into text data, the second mode being a mode in which audio data obtained based on sound to be output from a sound output device is converted into text data, the audio data being relating to content obtained during an event being conducted; transmit, to the conversion system, audio data corresponding to selected one of the first mode and the second mode; receive, from the conversion system, text data converted from the transmitted audio data; and control a display to display text based on the received text data.

20 Claims, 58 Drawing Sheets

(56) References Cited

U.S. PATENT DOCUMENTS

| | | | |
|---|---|---|---|
| 7,103,154 B1* | 9/2006 | Cannon | H04M 1/6505 379/67.1 |
| 7,983,307 B2* | 7/2011 | Goto | H04N 21/41407 370/493 |
| 8,111,841 B2* | 2/2012 | Ibe | H04R 5/04 381/107 |
| 10,481,863 B2* | 11/2019 | Wei | G06F 3/167 |
| 10,510,345 B2* | 12/2019 | Bhat | H04R 25/558 |
| 11,297,456 B2* | 4/2022 | Lyren | G06F 3/04847 |
| 2003/0174160 A1* | 9/2003 | Deutscher | H04N 21/4143 715/716 |
| 2004/0083873 A1* | 5/2004 | Yoshino | G10D 13/26 84/107 |
| 2004/0212478 A1* | 10/2004 | Kutsuzawa | G08C 17/00 340/5.6 |
| 2006/0149558 A1* | 7/2006 | Kahn | G10L 15/18 704/278 |
| 2008/0319743 A1* | 12/2008 | Faisman | G10L 15/065 704/235 |
| 2009/0154713 A1* | 6/2009 | Kamiya | H04S 7/302 381/1 |
| 2009/0276215 A1* | 11/2009 | Hager | G06F 16/31 704/235 |
| 2012/0034904 A1* | 2/2012 | LeBeau | G10L 17/22 455/414.1 |
| 2014/0016034 A1* | 1/2014 | Cirstea | H04N 7/108 348/460 |
| 2015/0051898 A1* | 2/2015 | Cuthbert | G06F 40/58 704/3 |
| 2016/0188291 A1* | 6/2016 | Vilermo | G06F 3/017 345/156 |
| 2016/0269973 A1 | 9/2016 | Miyamoto et al. | |
| 2016/0357252 A1* | 12/2016 | Gavriliuc | G06F 3/167 |
| 2017/0047057 A1* | 2/2017 | Kim | G10H 1/34 |
| 2017/0134446 A1 | 5/2017 | Kitada et al. | |
| 2017/0249294 A1 | 8/2017 | Emori | |
| 2018/0091643 A1* | 3/2018 | Singh | H04M 3/42391 |
| 2018/0234765 A1* | 8/2018 | Torok | G06F 3/167 |
| 2018/0358052 A1* | 12/2018 | Miller | G11B 27/10 |
| 2019/0005978 A1* | 1/2019 | Barnett | G06F 3/165 |
| 2019/0034154 A1 | 1/2019 | Nakamura | |
| 2019/0378092 A1* | 12/2019 | Alexander | G06Q 10/1053 |
| 2020/0007902 A1* | 1/2020 | Li | H04N 21/235 |
| 2020/0034387 A1* | 1/2020 | Kagawa | G06F 16/5866 |
| 2020/0219515 A1* | 7/2020 | Bhowmik | G06F 3/0346 |
| 2021/0048944 A1* | 2/2021 | Chandrababu | H04W 4/80 |
| 2021/0243254 A1* | 8/2021 | Anderl | G06F 3/038 |
| 2021/0274039 A1* | 9/2021 | Engelke | H04M 1/72433 |

FOREIGN PATENT DOCUMENTS

| | | | |
|---|---|---|---|
| JP | 2016-105241 | 6/2016 | |
| JP | 2016-171424 | 9/2016 | |
| JP | 2018-045193 | 3/2018 | |
| JP | 2019-029813 | 2/2019 | |
| KR | 20150131877 A | * 11/2015 | H04S 1/007 |

* cited by examiner

FIG. 11A

USER AUTHENTICATION MANAGEMENT TABLE

| USER ID | USER NAME | ORGANIZATION ID | PASSWORD |
|---|---|---|---|
| u0001 | Taro Ricoh | o1001 | p9991 |
| u0002 | Goro Kondo | o1002 | p9992 |
| ... | ... | ... | ... |

FIG. 11B

ACCESS MANAGEMENT TABLE

| ORGANIZATION ID | ACCESS ID | ACCESS PASSWORD |
|---|---|---|
| o1001 | a1001 | p1001 |
| ... | ... | ... |

FIG. 11C

SCHEDULE MANAGEMENT TABLE

SCHEDULED EVENT ID: pe0001, CONDUCTED EVENT ID: ee0001

| ORGAN- IZATION ID | USER ID OF RESER- VATION HOLDER | PAR- TICIPA- TION | NAME OF RESER- VATION HOLDER | SCHED- ULED START TIME | SCHED- ULED END TIME | EVENT NAME | USER ID OF OTHER PARTIC- IPANT | PAR- TICIPA- TION | USER NAME OF OTHER PARTICIPANT | FILE DATA |
|---|---|---|---|---|---|---|---|---|---|---|
| o1001 | u0001 | ✓ | Taro Ricoh | 9:00 | 10:00 | Meeting on strategic plan | u0000 | ✓ | Electronic Whiteboard | ・XXX.ppt |
| | | | | | | | u0002 | ✓ | Goro Kondo | ・YYY.xsl |
| | | | | | | | u0003 | ✓ | Yoshio Yamashita | ・... |

FIG. 12A
CONDUCTED EVENT MANAGEMENT TABLE

| PROJECT ID | CONDUCTED EVENT ID |
|---|---|
| p0001 | ee0001, ee0011, ee0021 |
| p0002 | ee0002, ee0012 |
| ... | ... |

FIG. 12B
CONTENT MANAGEMENT TABLE

CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Recording | ▪Audio data URL; c://••• | 2018/1/15 9:00:00 | 2018/1/15 9:00:30 |
| c0002 | Screenshot | ▪Image data URL; c://××× | 2018/1/15 9:00:30 | 2018/1/15 9:00:30 |
| c0003 | Voice text reception | ▪Text data URL; c://••• | 2018/1/15 9:00:00 | 2018/1/15 9:00:30 |
| ... | ... | ××× | ××× | ××× |
| c0201 | Action item | ▪User ID of owner of action item; u0003<br>▪Due: 2018/1/30<br>▪Image data URL; c://••• | 2018/1/15 9:44:47 | 2018/1/15 9:44:47 |
| c0202 | Recording | ▪Audio data URL; c://••• | 2018/1/15 9:45:00 | 2018/1/15 9:45:30 |
| c0203 | Screenshot | ▪Image data URL; c://••• | 2018/1/15 9:45:30 | 2018/1/15 9:45:30 |
| c0204 | Voice text conversion | ▪Text data URL; c://••• | 2018/1/15 9:45:00 | 2018/1/15 9:45:30 |
| ... | ... | ××× | ××× | ××× |
| c0301 | File transmission | ▪Data file URL; c://••• | 2018/1/15 10:00:00 | 2018/1/15 10:00:00 |

FIG. 13A  USER AUTHENTICATION MANAGEMENT TABLE

| USER ID | ORGANIZATION ID | PASSWORD |
|---|---|---|
| u0001 | o1001 | p9991 |
| u0002 | o1002 | p9992 |
| ... | ... | ... |

FIG. 13B  USER MANAGEMENT TABLE

ORIGINATION ID: o1001

| USER ID | USER NAME |
|---|---|
| u0001 | Taro Ricoh |
| u0002 | Goro Kondo |
| u0003 | Yoshio Yamashita |
| u0004 | Jim Berger |
| ... | ... |

FIG. 13C  RESOURCE MANAGEMENT TABLE

ORIGINATION ID: o1001

| RESOURCE ID | RESOURCE NAME |
|---|---|
| s1001 | Conference room X |
| s1002 | Conference room Y |
| ... | ... |

FIG. 14A
RESOURCE RESERVATION MANAGEMENT TABLE

ORGANIZATION ID: o1001

| RE-SOURCE ID | RESOURCE NAME | USER ID OF COMMUNICATION TERMINAL | USER ID OF RESERVATION HOLDER | SCHEDULED USE START DATE/TIME | SCHEDULED USE END DATE/TIME | EVENT NAME |
|---|---|---|---|---|---|---|
| s1001 | Conference room X | u0000 | u0001 | 2018/1/15 9:00 | 2018/1/15 10:00 | Meeting on strategic plan |
| s1001 | Conference room X | u0000 | u0004 | 2018/1/15 10:00 | 2018/1/15 11:00 | Regular meeting |
| s1001 | Conference room X | u0000 | u0002 | 2018/1/15 10:11 | 2018/1/15 15:00 | Management meeting |
| s1002 | Conference room Y | u1000 | u0005 | 2018/1/15 9:00 | 2018/1/15 10:00 | Meeting on new product development |
| ... | ... | ... | ... | ... | ... | ... |

FIG. 14B
EVENT MANAGEMENT TABLE

SCHEDULED EVENT ID: pe0001

| ORGANIZATION ID | USER ID | USER NAME | SCHEDULED EVENT START DATE/TIME | SCHEDULED EVENT END DATE/TIME | EVENT NAME | MEMO | FILE DATA |
|---|---|---|---|---|---|---|---|
| o1001 | u0000 | Electronic Whiteboard | 2018/1/15 9:00 | 2018/1/15 10:00 | Meeting on strategic plan | ... | ・XXX.ppt |
| o1001 | u0001 | Taro Ricoh | 2018/1/15 9:00 | 2018/1/15 10:00 | Meeting on strategic plan | ... | ・YYY.xsl |
| o1001 | u0002 | Goro Kondo | 2018/1/15 9:00 | 2018/1/15 10:00 | Meeting on strategic plan | ... | ・・・ |
| o1001 | u0003 | Yoshio Yamashita | | | | | |

FIG. 15A

SERVER AUTHENTICATION MANAGEMENT TABLE

| ACCESS ID | ACCESS PASSWORD |
|---|---|
| a1001 | p1001 |
| a1002 | p1002 |
| ... | ... |

FIG. 15B

PROJECT MEMBER MANAGEMENT TABLE

ORGANIZATION ID: o1001

| PROJECT ID | PROJECT NAME | USER ID OF PROJECT MEMBER |
|---|---|---|
| p0001 | Plan for next year | u0000, u0001, u0002, u0003 |
| p0002 | R&D project | u0000, u0004, u0005 |
| p0003 | New product development | u0000, u0005, u0006, u0007 |
| ... | ... | ... |

FIG. 16A

CONDUCTED EVENT RECORD MANAGEMENT TABLE

PROJECT ID: p0001, CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Recording | ·Audio data URL: http://··· | 2018/1/15 9:00:00 | 2018/1/15 9:00:30 |
| c0002 | Voice text reception | ·Text data URL: http://···· | 2018/1/15 9:00:00 | 2018/1/15 9:00:30 |
| c0003 | Screenshot | ·Image data URL: http://··· | 2018/1/15 9:00:30 | 2018/1/15 9:00:30 |
| ··· | ··· | ··· | ··· | ··· |
| c0201 | Action item | ·User ID of owner of action item; u0003<br>·Due: 2018/1/30<br>·Image data URL: http://··· | 2018/1/15 9:44:47 | 2018/1/15 9:44:47 |
| c0202 | Recording | ·Audio data URL: http://··· | 2018/1/15 9:45:00 | 2018/1/15 9:45:30 |
| c0203 | Voice text reception | ·Text data URL: http://··· | 2018/1/15 9:45:00 | 2018/1/15 9:45:30 |
| c0204 | Screenshot | ·Image data URL: http://··· | 2018/1/15 9:45:30 | 2018/1/15 9:45:30 |
| ··· | ··· | ··· | ··· | ··· |
| c0301 | File transmission | ·Data file URL: http://··· | 2018/1/15 10:00:00 | 2018/1/15 10:00:00 |

FIG. 16B

CONDUCTED EVENT MANAGEMENT TABLE

| CONDUCTED EVENT ID | EVENT NAME | START DATE/TIME | END DATE/TIME |
|---|---|---|---|
| ee0001 | Meeting on strategic plan | 2018/1/15 9:00 | 2018/1/15 10:00 |
| ee0002 | Regular meeting | 2018/1/15 10:00 | 2018/1/15 11:00 |
| ··· | ··· | ··· | ··· |

FIG. 17

RELATED INFORMATION MANAGEMENT TABLE

PROJECT ID: p0001, CONDUCTED EVENT ID: ee0001

| CONTENT GENERA- TION TIME | AUDIO DATA | | VOICE TEXT DATA | | | IMAGE DATA | | |
|---|---|---|---|---|---|---|---|---|
| | CONTENT PROCESS- ING ID | CONTENT PROCESS- ING TYPE | CONTENT ID | CONTENT PROCESSING TYPE | SEQUENCE NO. | CONTENT PROCESS- ING ID | CONTENT PROCESSING TYPE | SEQUENCE NO. |
| 00:00 | c0001 | Recording | c0002 | Voice text reception | 1 | — | — | — |
| 00:30 | c0004 | Recording | c0005 | Voice text reception | 2 | c0003 | Screenshot | 1 |
| 01:00 | c0007 | Recording | c0008 | Voice text reception | 3 | c0006 | Screenshot | 2 |
| ⋯ | ⋯ | ⋯ | ⋯ | ⋯ | ⋯ | ⋯ | ⋯ | ⋯ |
| 24:30 | c0202 | Recording | c0203 | Voice text reception | 61 | c0199 | Screenshot | 60 |
| ⋯ | ⋯ | ⋯ | ⋯ | ⋯ | ⋯ | ⋯ | ⋯ | ⋯ |
| 59:30 | c0298 | Recording | c0299 | Voice text reception | 93 | c0297 | Screenshot | 92 |

FIG. 18A

AUTHENTICATION MANAGEMENT TABLE

| | COMMUNICATION ID | | |
|---|---|---|---|
| TERMINAL ID | USER ID | ACCOUNT NAME | PASSWORD |
| 01aa | 10001 | Taro | aaa |
| 01bb | 10002 | Jiro | bbb |
| 01ba | 10003 | Hanako | ccc |
| ... | ... | ... | ... |

FIG. 18B

STATUS MANAGEMENT TABLE

| COMMUNICATION ID | OPERATING STATUS | RECEPTION DATE AND TIME | IP ADDRESS OF TERMINAL |
|---|---|---|---|
| 01aa | Online (Ready) | 2018/1/10 13:40 | 1.2.1.3 |
| 01bb | Offline | 2018/1/9 12:00 | 1.2.1.4 |
| 01ba | Online (Ready) | 2018/1/10 13:50 | 1.2.2.4 |
| ... | ... | ... | ... |

FIG. 19A

DESTINATION LIST MANAGEMENT TABLE

| COMMUNICATION ID OF REQUEST SENDER TERMINAL | COMMUNICATION ID OF DESTINATION TERMINAL |
|---|---|
| 01aa | 01ab, ···, 01ba, 01bb, ···, 01ca, 01da, ··· |
| 01bb | 01aa, 01ca, 01cb |
| 01ba | 01aa, 01ab, 01ca, 01cb, 01da, 01db |
| ··· | ··· |

FIG. 19B

SESSION MANAGEMENT TABLE

| SESSION ID FOR SELECTION | RELAY DEVICE ID | COMMUNICATION ID OF REQUEST SOURCE TERMINAL | COMMUNICATION ID OF DESTINATION TERMINAL | DELAY TIME (ms) | DELAY INFORMATION RECEPTION DATE/TIME |
|---|---|---|---|---|---|
| se1 | 111a | 01aa | 01bb | 200 | 2018/1/10 14:00 |
| se2 | 111b | 01ba | 01ca | 50 | 2018/1/10 14:10 |
| se3 | 111d | 01cd | 01cd | 400 | 2018/1/10 14:20 |
| ··· | ··· | ··· | ··· | ··· | ··· |

# COMMUNICATION TERMINAL, SHARING SYSTEM, DISPLAY CONTROL METHOD, AND NON-TRANSITORY COMPUTER-READABLE MEDIUM

CROSS-REFERENCE TO RELATED APPLICATION

This patent application is based on and claims priority pursuant to 35 U.S.C. § 119(a) to Japanese Patent Application No. 2019-029094, filed on Feb. 21, 2019, in the Japan Patent Office, the entire disclosure of which is hereby incorporated by reference herein.

BACKGROUND

Technical Field

The present disclosure relates to a communication terminal, a sharing system, a display control method, and a non-transitory computer-readable medium.

Description of the Related Art

Electronic whiteboards are widely used in companies or institutions to conduct events such as meetings. The electronic whiteboards display a background image on a display and allows users to draw stroke images such as text, numbers, figures, or the like on the background image.

Further, a technique is known that converts voice data obtained during event such as meeting to text data and displays text on a terminal such as the electronic whiteboard based on the text data converted from the voice data.

SUMMARY

According to one or more embodiments, a communication terminal is communicable with a conversion system. The communication terminal includes circuitry configured to: receive a selection of one of a first mode and a second mode, the first mode being a mode in which audio data obtained based on sound collected by a sound collecting device is converted into text data, the second mode being a mode in which audio data obtained based on sound to be output from a sound output device is converted into text data, the audio data being relating to content obtained during an event being conducted; transmit, to the conversion system, audio data corresponding to selected one of the first mode and the second mode; receive, from the conversion system, text data converted from the transmitted audio data; and control a display to display text based on the received text data.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 11A is a conceptual diagram illustrating a user authentication management table, according to an embodiment of the present disclosure;

FIG. 11B is a conceptual diagram illustrating an access management table, according to an embodiment of the disclosure;

FIG. 11C is a conceptual diagram illustrating a schedule management table, according to an embodiment of the present disclosure;

FIG. 12A is a conceptual diagram illustrating a conducted event management table, according to an embodiment of the present disclosure;

FIG. 12B is a conceptual diagram illustrating a content management table, according to an embodiment of the present disclosure;

FIG. 13A is a conceptual diagram illustrating a user authentication management table, according to an embodiment of the present disclosure;

FIG. 13B is a conceptual diagram illustrating a user management table, according to an embodiment of the present disclosure;

FIG. 13C is a conceptual diagram illustrating a resource management table, according to an embodiment of the present disclosure;

FIG. 14A is a conceptual diagram illustrating a resource reservation management table, according to an embodiment of the present disclosure;

FIG. 14B is a conceptual diagram illustrating an event management table, according to an embodiment of the present disclosure;

FIG. 15A is a conceptual diagram illustrating a server authentication management table, according to an embodiment of the present disclosure;

FIG. 15B is a conceptual diagram illustrating a project member management table, according to an embodiment of the present disclosure;

FIG. 16A is a conceptual diagram illustrating a conducted event record management table, according to an embodiment of the present disclosure;

FIG. 16B is a conceptual diagram illustrating a conducted event management table, according to an embodiment of the present disclosure;

FIG. 17 is a conceptual diagram illustrating a related information management table, according to an embodiment of the present disclosure;

FIG. 18A is a conceptual diagram illustrating an authentication management table, according to an embodiment of the present disclosure;

FIG. 18B is a conceptual diagram illustrating a status management table, according to an embodiment of the present disclosure;

FIG. 19A is a conceptual diagram illustrating a destination list management table, according to an embodiment of the present disclosure;

FIG. 19B is a conceptual diagram illustrating a session management table, according to an embodiment of the present disclosure;

Figure 1:
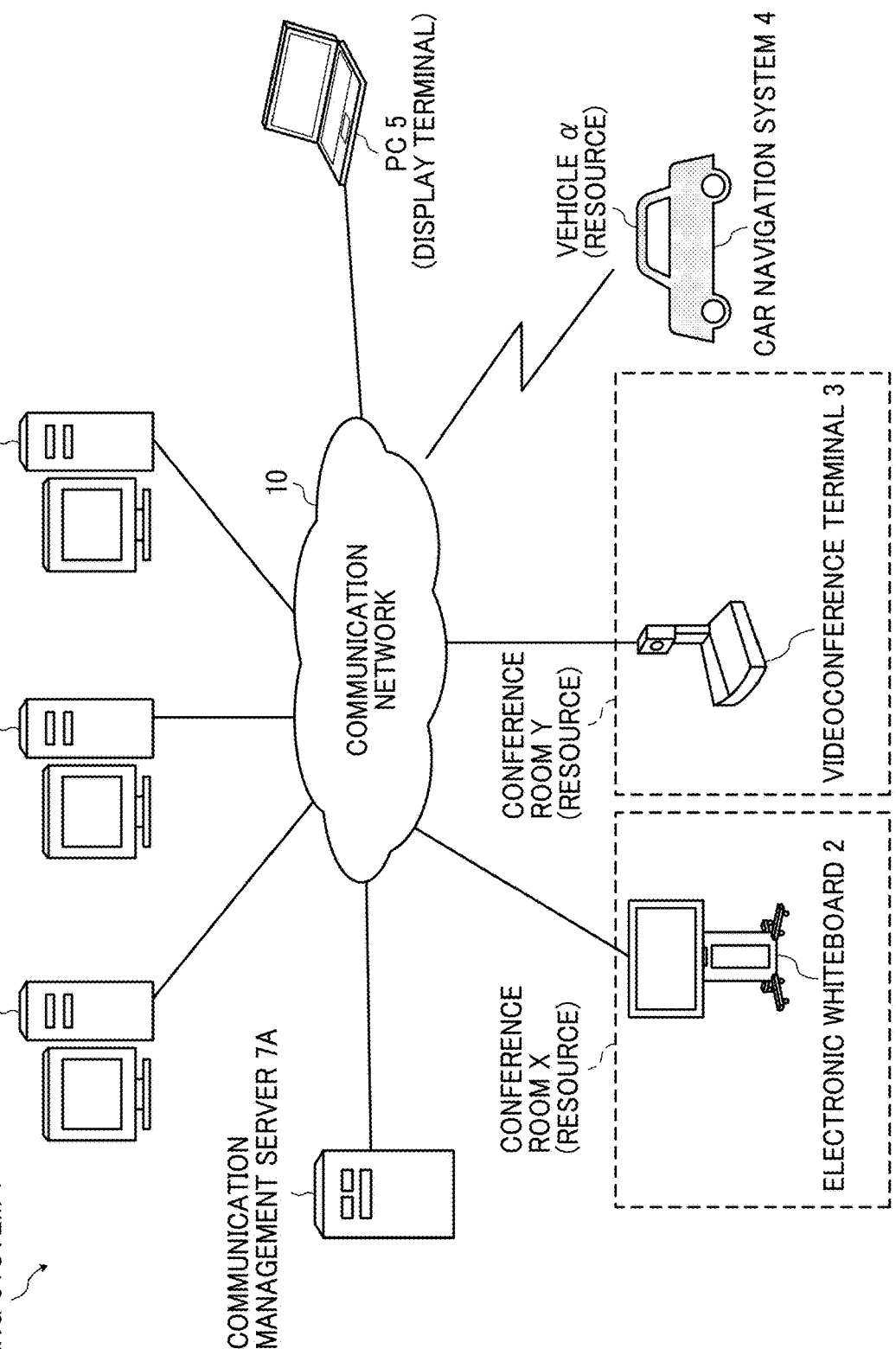
FIG. 1 is a schematic diagram illustrating an overview of a sharing system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

When a user operates a communication terminal to communicate with one or more other communication terminals to conduct an event such as a remote conference, the user sometimes wants to select by himself or herself whether text is displayed based on text data obtained from voice collected by the communication terminal that he/she is operating or based on text data obtained from voice collected by the one or more other terminals. Displaying text based on voice collected by an apparatus or a device such as the communication terminal may be referred to as "subtitle display". However, in the related art, when displaying text in real time based on voice generated in an ongoing event, no system or configuration is provided that allows a user to select a desired source device of voice data from which text is to be displayed. For this reason, there is a drawback that a communication terminal that conducts an event cannot perform subtitle display according to a type of the event currently being conducted.

Referring to the drawings, a system for sharing one or more resources ("sharing system 1") is described according to one or more embodiments. In this disclosure, an "electronic file" may be referred to as a "file".

Overview of System Configuration:

First, an overview of a configuration of a sharing system 1 is described. FIG. 1 is a schematic diagram illustrating an overview of the sharing system 1, according to one or more embodiments.

As illustrated in FIG. 1, the sharing system 1 of the embodiment includes an electronic whiteboard 2, a videoconference terminal 3, a car navigation system 4, a personal computer (PC) 5, a sharing assistant server 6, a communication management server 7A, a schedule management server 8, and a voice-to-text conversion server 9.

The electronic whiteboard 2, the videoconference terminal 3, the car navigation system 4, the PC 5, the sharing assistant server 6, the communication management server 7A, the schedule management server 8, and the voice-to-text conversion server 9 are communicable with one another via a communication network 10. The communication network 10 is implemented by the Internet, a mobile communication network, a local area network (LAN), etc. The communication network 10 may include, in addition to a wired network, a wireless network in compliance with such as 3rd Generation (3G), Worldwide Interoperability for Microwave Access (WiMAX), Long Term Evolution (LTE), etc.

In this example, the electronic whiteboard 2 is provided in a conference room X. The videoconference terminal 3 is provided in a conference room Y. Further, in this disclosure, a resource may be shared among a plurality of users, such that any user is able to reserve any resource. Accordingly, the resource can be a target for reservation by each user. The car navigation system 4 is provided in a vehicle a. In this case, the vehicle a is a vehicle shared among a plurality of users, such as a vehicle used for car sharing. Further, the vehicle could be any means capable of transporting the human-being from one location to another location. Examples of vehicle include, but not limited to, cars, motorcycles, bicycles, and wheelchairs.

Examples of the resource include, but not limited to, any object, service, space or place (room, or a part of room), information (data), which can be shared among a plurality of users. Further, the user may be an individual person, a group of persons, or an organization such as a company. In the sharing system 1 illustrated in FIG. 1, the conference room X, the conference room Y, and the vehicle a are examples of a resource shared among a plurality of users. Examples of information as a resource include, but not limited to, information on an account assigned to the user, with the user being more than one individual person. For example, the organization may only be assigned with one account that allows any user in the organization to use a specific service provided on the Internet. In such case, information on such account, such as a user name and a password, is assumed to be a resource that can be shared among a plurality of users in that organization. In one example, the teleconference or videoconference service may be provided via the Internet, which may be provided to a user who has logged in with a specific account.

The electronic whiteboard 2, the videoconference terminal 3, and the car navigation system 4, are each an example of a communication terminal. The communication terminal is any device capable of communicating with such as the sharing assistant server 6, the communication management server 7A, the schedule management server 8, and the voice-to-text conversion server 9, and providing information obtained from the server to the user of the resource. Examples of the communication terminal provided in the vehicle a may not only include the car navigation system 4, but also a smartphone or a smartwatch installed with such as a car navigation application.

The PC 5 is an example a display terminal. Specifically, the PC 5 is an example of a registration apparatus that registers, to the schedule management server 8, reservations made by each user to use each resource, or any event scheduled by each user. Examples of the event include, but not limited to, a conference, meeting, gathering, counseling, lecture, presentation, driving, ride, and transporting.

The sharing assistant server 6, which is implemented by one or more computers, assists in sharing of a resource among the users, for example, via the communication terminal.

The communication management server 7A, which is implemented by one or more computers, manages data communication performed between communication terminals provided at respective multiple sites. The communication management server 7A authenticates login of the communication terminal, controls communication by the communication terminal, and controls display of drawing images input to the electronic whiteboard 2, for example. The sharing system 1 is, for example, a system in which content data is transmitted unidirectionally from one communication terminal to one or more other communication terminals. Alternatively, the sharing system 1 is, for example, a communication system in which content data is transmitted bidirectionally between or among the plurality of communication terminals. The communication system is, for example, a videoconferencing system, a videophone system, a chat system, and the like.

The schedule management server 8, which is implemented by one or more computers, manages reservations for using each resource and schedules of each user.

The voice-to-text conversion server 9, which is implemented by one or more computers, converts voice data (example of audio data) received from an external computer (for example, the sharing assistant server 6), into text data.

The sharing assistant server 6, the communication management server 7A, the schedule management server 8, and the voice-to-text conversion server 9 may be collectively referred to as a "control system". The control system may be, for example, a server that performs all or a part of functions of the sharing assistant server 6, the communication management server 7A, the schedule management server 8, and the voice-to-text conversion server 9.

Figure 2:
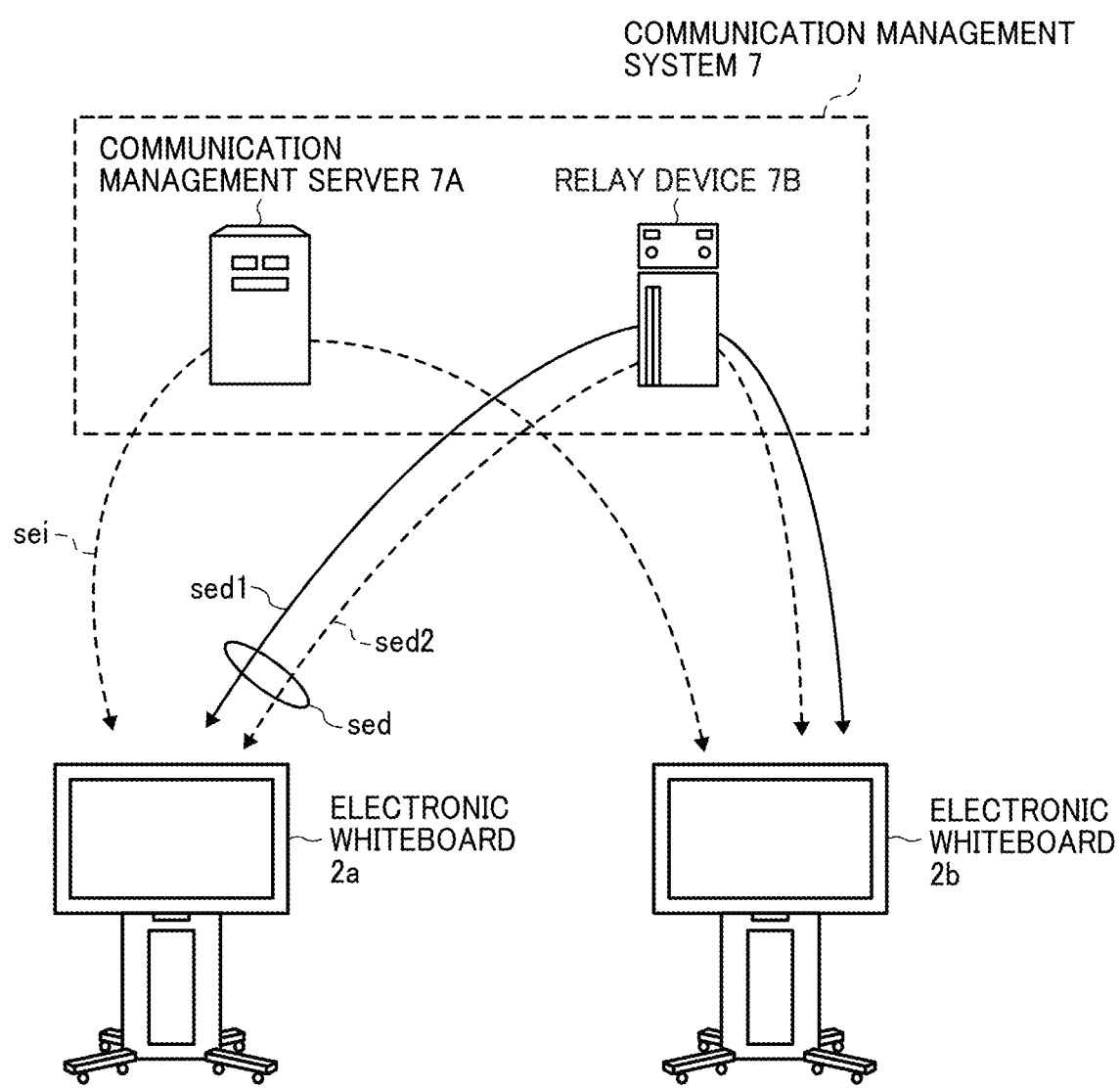
FIG. 2 is a schematic diagram illustrating how information is exchanged between communication terminals, according to an embodiment of the present disclosure.

FIG. 2 is a schematic diagram illustrating how information is exchanged between the communication terminals, according to the embodiment. Specifically, FIG. 2 illustrates an example in which content data is transmitted between an electronic whiteboard 2a and an electronic whiteboard 2b via a relay device 7B. The electronic whiteboard 2a and the electronic whiteboard 2b are examples of communication terminals provided in respective remote locations. The communication as illustrated in FIG. 2 is just one example of communication between or among the communication terminals. The communication terminals communicate data in any other suitable system such as a peer to peer (P2P) system.

In the example of FIG. 2, the communication management server 7A establishes a management data communication session "sei" with the electronic whiteboard 2a and the electronic whiteboard 2b, to transmit and receive various management data including call control message data. Further, a session "sed 1" for transmitting image data and a session "sed 2" for transmitting audio data are established between the electronic whiteboard 2a and the electronic whiteboard 2b via the relay device 7B. The relay device 7B is an apparatus that relays content data between the electronic whiteboard 2a and the electronic whiteboard 2b. In another example of the sharing system 1, the communication management server 7A also performs processes or functions of the relay device 7b. In this case, the relay device 7B can be omitted. In this example, the relay device 7B and the communication management server 7A are collectively referred to as a "communication management system 7", which relays and manages communication of content data between the communication terminals. In the following description, any one or more sessions of the session sed 1 and the session sed 2 for transmitting content data between the communication terminals is referred to as a "session sed".

Examples of the image data transmitted in the session sed 1 include image data of meeting materials such as presentation slides displayed on a window opened on the electronic whiteboard 2. For example, the session sed 1, which is a session for transmitting image data, can include a session for exchanging image data captured by an imaging device and another session for exchanging image data of the meeting materials or the like.

The image data may include basic data required to reproduce an image and extension data for enhancing a quality of the image to be reproduced when combined with the basic data. In this case, the session sed 1, which is a session for transmitting image data, includes a session for exchanging the basic data and another session for exchanging the extension data. In another example of the sharing system 1, the communication management server 7A performs processes or functions of the relay device 7B. In this case, the session sed between the communication terminals is established via the communication management server 7A.

<Hardware Configuration>

Referring to FIG. 3 to FIG. 6, a hardware configuration of the apparatus or terminal in the sharing system 1 is described according to the embodiment.

Figure 3:
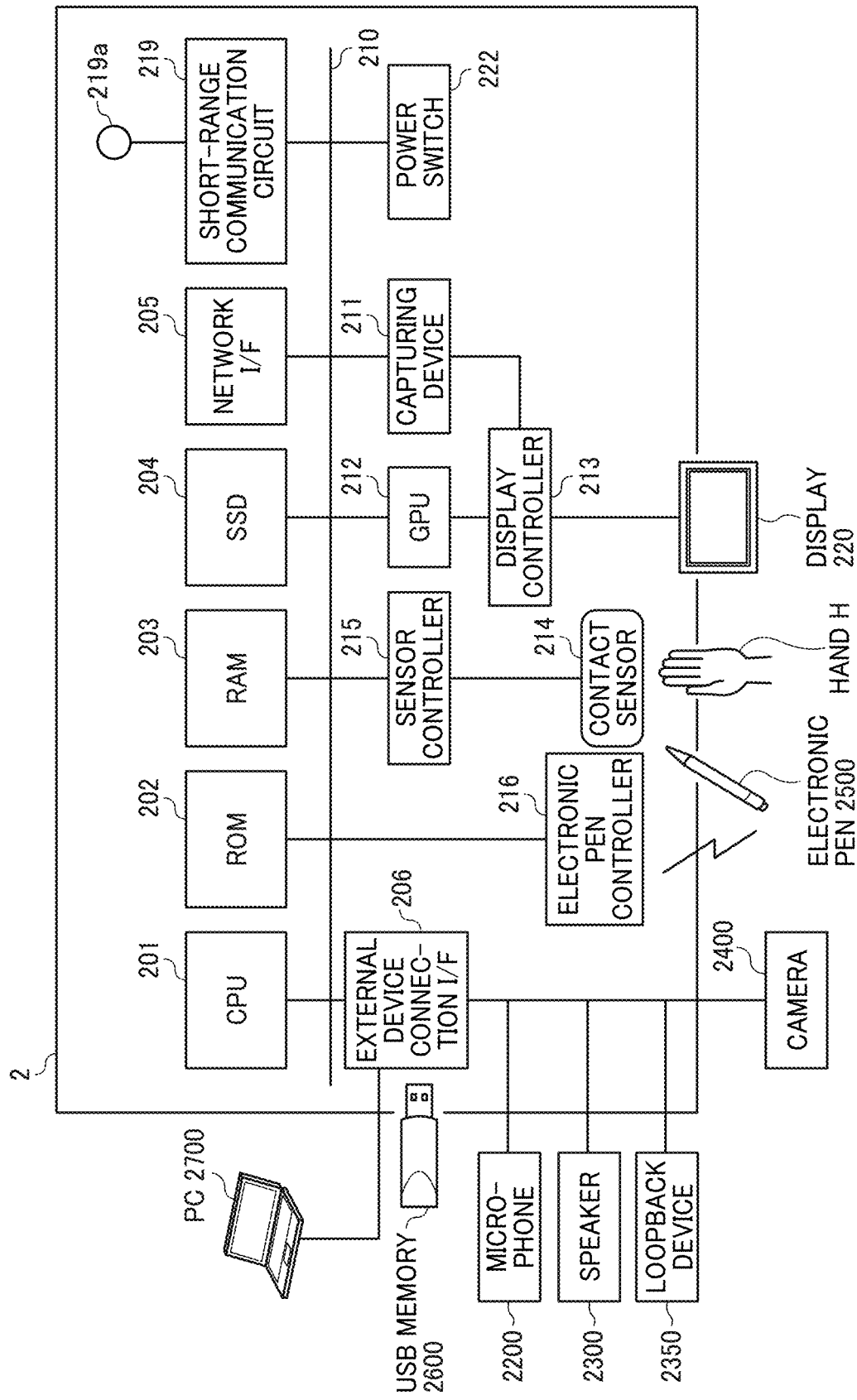
FIG. 3 is a schematic block diagram illustrating a hardware configuration of an electronic whiteboard, according to an embodiment of the present disclosure.

Hardware Configuration of Electronic Whiteboard:

FIG. 3 is a block diagram illustrating a hardware configuration of the electronic whiteboard 2, according to the embodiment. As illustrated in FIG. 3, the electronic whiteboard 2 includes a central processing unit (CPU) 201, a read only memory (ROM) 202, a random access memory (RAM) 203, a solid state drive (SSD) 204, a network interface (I/F) 205, and an external device connection I/F 206.

The CPU 201 controls entire operation of the electronic whiteboard 2. The ROM 202 stores a control program such as an Initial Program Loader (IPL) to boot the CPU 201. The RAM 203 is used as a work area for the CPU 201. The SSD 204 stores various data such as a control program for the electronic whiteboard 2. The network I/F 205 controls communication with an external device through the communication network 10. The external device connection I/F 206 controls communication with a universal serial bus (USB) memory 2600, a PC 2700, and external devices (a microphone 2200, a speaker 2300, a loopback device 2350, and a camera 2400).

The microphone 2200 is an example of a sound collecting device that collects sound. The microphone 2200 processes an input of an audio signal under control of the CPU 201. The speaker 2300 is an example of a sound output device that outputs an audio signal under control of the CPU 201. In another example, at least one of the microphone 2200 and the speaker 2300 is built in the electronic whiteboard 2. The loopback device 2350 acquires an audio signal based on sound to be output from the speaker 2300 under control of the CPU 201. In one example, the loopback device 2350 can be implemented as a loopback process by software as a virtual device.

The electronic whiteboard 2 further includes a capturing device 211, a graphics processing unit (GPU) 212, a display controller 213, a contact sensor 214, a sensor controller 215, an electronic pen controller 216, a short-range communication circuit 219, an antenna 219a for the short-range communication circuit 219, and a power switch 222.

The capturing device 211 acquires image data of an image displayed on a display 220 under control of the display controller 213, and stores the image data in the RAM 203 or the like. The display 220 is an example of display means (display unit). The GPU 212 is a semiconductor chip dedicated to processing of a graphical image. The display controller 213 controls display of an image processed at the capturing device 211 or the GPU 212 for output through the display 220 provided with the electronic whiteboard 2. The contact sensor 214 detects a touch onto the display 220 with an electronic pen (stylus pen) 2500 or a user's hand H. The sensor controller 215 controls operation of the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame surrounding the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the electronic pen 2500 to the display 220. The short-range communication circuit 219 is a communication circuit that communicates in compliance with the near field communication (NFC) (Registered Trademark), the Bluetooth (Registered Trademark), and the like. The power switch 222 turns on or off the power of the electronic whiteboard 2.

The electronic whiteboard 2 further includes a bus line 210. The bus line 210 is an address bus or a data bus, which electrically connects the elements in FIG. 3 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 2500, the electronic pen controller 216 may also detect a touch by another part of the electronic pen 2500, such as a part held by a hand of the user.

Figure 4:
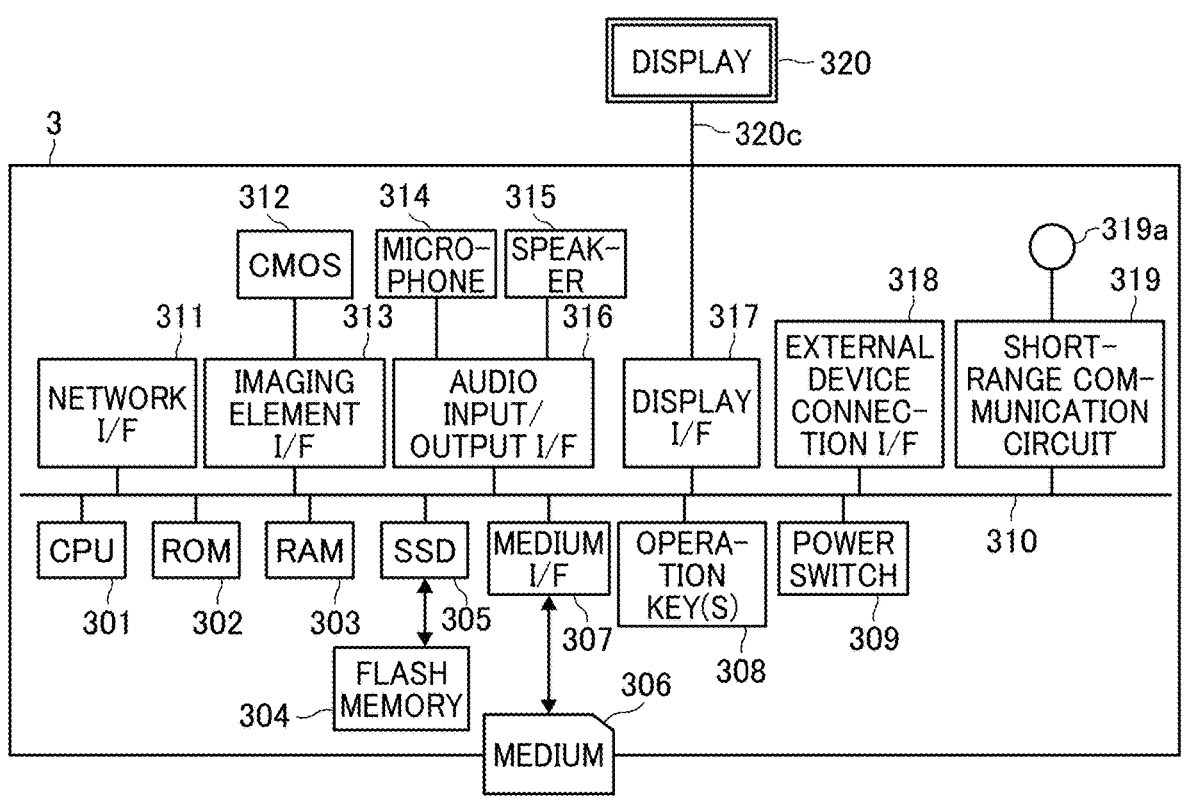
FIG. 4 is a schematic block diagram illustrating a hardware configuration of a videoconference terminal, according to the embodiment of the present disclosure.

Hardware Configuration of Videoconference Terminal:

FIG. 4 is a schematic block diagram illustrating a hardware configuration of the videoconference terminal 3, according to the embodiment. As illustrated in FIG. 4, the videoconference terminal 3 includes a CPU 301, a ROM 302, a RAM 303, a flash memory 304, a SSD 305, a medium I/F 307, an operation key 308, a power switch 309, a bus line 310, a network I/F 311, a complementary metal oxide semiconductor (CMOS) sensor 312, an imaging element I/F 313, a microphone 314, a speaker 315, an audio input/output I/F 316, a display I/F 317, an external device connection I/F 318, a short-range communication circuit 319, and an antenna 319a for the short-range communication circuit 319. The CPU 301 controls entire operation of the videoconference terminal 3. The ROM 302 stores a control program such as an IPL to boot the CPU 301. The RAM 303 is used as a work area for the CPU 301. The flash memory 304 stores various data such as a communication control program, image data, and audio data. The SSD 305 controls reading or writing of various data with respect to the flash memory 304 under control of the CPU 301. In alternative to the SSD, a hard disk drive (HDD) may be used. The medium I/F 307 controls reading or writing of data with respect to a storage medium 306 such as a flash memory. The operation key (keys) 308 is operated by a user to input a user instruction such as a user selection of a communication destination of the videoconference terminal 3. The power switch 309 is a switch that receives an instruction to turn on or off the power of the videoconference terminal 3.

The network I/F 311 in an interface that controls communication of data between the videoconference terminal 3 and an external device through the communication network 10 such as the Internet. The CMOS sensor 312 is an example of a built-in imaging device configured to capture a subject under control of the CPU 301 to obtain image data. The imaging element I/F 313 is a circuit that controls driving of the CMOS sensor 312. The microphone 314 is an example of built-in audio collecting device capable of inputting audio under control of the CPU 301. The audio input/output I/F 316 is a circuit for inputting or outputting an audio signal to the microphone 314 or from the speaker 315 under control of the CPU 301. The display I/F 317 is a circuit for transmitting display data to an external display 320 under control of the CPU 301. The external device connection I/F 318 is an interface circuit that connects the videoconference terminal 3 to various external devices. The short-range communication circuit 319 is a communication circuit that communicates in compliance with the NFC, the Bluetooth, and the like.

The bus line 310 is an address bus or a data bus, which electrically connects the elements in FIG. 4 such as the CPU 301.

The display 320 is an example of display means (display unit) configured to display an image of a subject, an operation icon or the like. The display 320 is configured as a liquid crystal display or an organic electroluminescence (EL) display, for example. The display 320 is connected to the display I/F 317 by a cable 320c. The cable 320c may be an analog red green blue (RGB) (video graphic array (VGA)) signal cable, a component video cable, a DisplayPort signal cable, a high-definition multimedia interface (HDMI) (registered trademark) signal cable, or a digital video interactive (DVI) signal cable.

In alternative to the CMOS sensor 312, an imaging element such as a CCD (Charge Coupled Device) sensor may be used. The external device connection I/F 318 is configured to connect an external device such as an external camera, an external microphone, or an external speaker through a USB cable or the like. In the case where an external camera is connected, the external camera is driven in preference to the built-in CMOS sensor 312 under control of the CPU 301. Similarly, in the case where an external microphone is connected or an external speaker is connected, the external microphone or the external speaker is driven in preference to the built-in microphone 314 or the built-in speaker 315 under control of the CPU 301.

The storage medium 306 is removable from the videoconference terminal 3. In addition to or in alternative to the flash memory 304, any suitable nonvolatile memory, such as an electrically erasable and programmable ROM (EE-PROM) can be used, provided that it reads or writes data under control of CPU 301.

Figure 5:
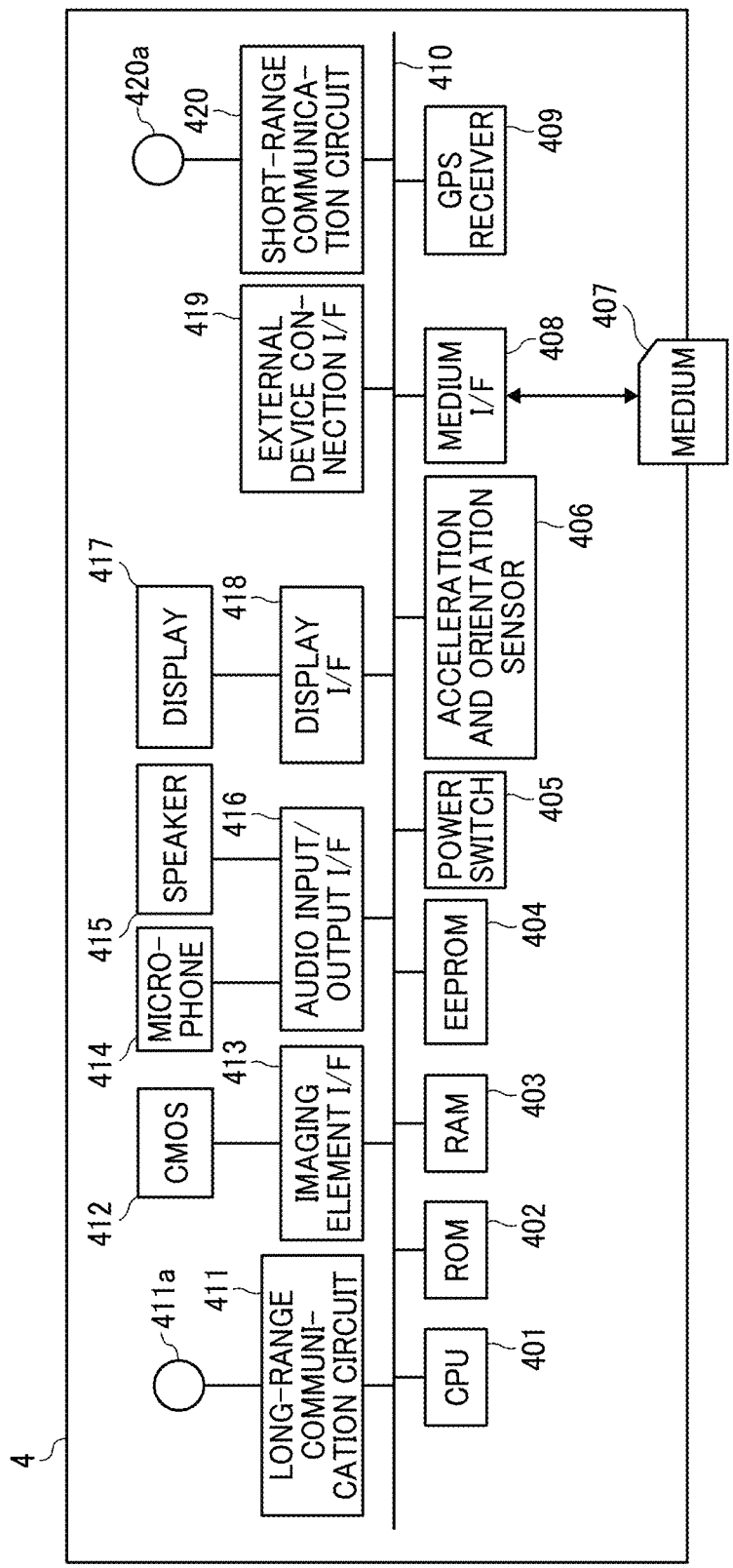
FIG. 5 is a schematic block diagram illustrating a hardware configuration of a car navigation system, according to the embodiment of the present disclosure.

Hardware Configuration of Car Navigation System:

FIG. 5 is a schematic block diagram illustrating a hardware configuration of the car navigation system 4, according to the embodiment. As illustrated in FIG. 5, the car navigation system 4 includes a CPU 401, a ROM 402, a RAM 403, an EEPROM 404, a power switch 405, an acceleration and orientation sensor 406, a medium I/F 408, and a global positioning system (GPS) receiver 409.

The CPU 401 controls entire operation of the car navigation system 4. The ROM 402 stores a control program such as an IPL to boot the CPU 401. The RAM 403 is used as a work area for the CPU 401. The EEPROM 404 reads or writes various data such as a control program for the car navigation system 4 under control of the CPU 401. The power switch 405 turns on or off the power of the car navigation system 4. The acceleration and orientation sensor 406 includes various sensors such as an electromagnetic compass for detecting geomagnetism, a gyrocompass, and an acceleration sensor. The medium I/F 408 controls reading or writing of data with respect to a storage medium 407 such as a flash memory. The GPS receiver 409 receives a GPS signal from a GPS satellite.

The car navigation system 4 further includes a long-range communication circuit 411, an antenna 411*a* for the long-range communication circuit 411, a CMOS sensor 412, an imaging element I/F 413, a microphone 414, a speaker 415, an audio input/output I/F 416, a display 417, a display I/F 418, an external device connection I/F 419, a short-range communication circuit 420, and an antenna 420*a* for the short-range communication circuit 420.

The long-range communication circuit 411 is a circuit, which receives traffic jam information, road construction information, traffic accident information and the like provided from an infrastructure system external to the vehicle, and transmits information on the location of the vehicle, life-saving signals, etc. back to the infrastructure system in the case of emergency. The infrastructure system external to the vehicle includes a road information guidance system such as Vehicle Information and Communication System (VICS) (registered trademark), for example. The CMOS sensor 412 is an example of a built-in imaging device configured to capture a subject under control of the CPU 401 to obtain image data. The imaging element I/F 413 is a circuit that controls driving of the CMOS sensor 412. The microphone 414 is an example of built-in audio collecting device configured to input sound under control of the CPU 401. The audio input/output I/F 416 is a circuit for inputting or outputting an audio signal between the microphone 414 and the speaker 415 under control of the CPU 401. The display 417 is an example of display means (display unit) configured to display an image of a subject, an operation icon, or the like. The display 417 is configured as a liquid crystal display or an organic EL display, for example. The display 417 has a function of a touch panel. The touch panel is an example of input means configured to enable the user to input a user instruction for operating the car navigation system 4 through touching a screen of the display 417. The display I/F 418 is a circuit that controls the display 417 to display an image. The external device connection I/F 419 is an interface circuit that connects the car navigation system 4 to various external devices. The short-range communication circuit 420 is a communication circuit that communicates in compliance with the NFC, the Bluetooth, and the like. The car navigation system 4 further includes a bus line 410. The bus line 410 is an address bus or a data bus, which electrically connects the elements in FIG. 4 such as the CPU 401.

Figure 6:
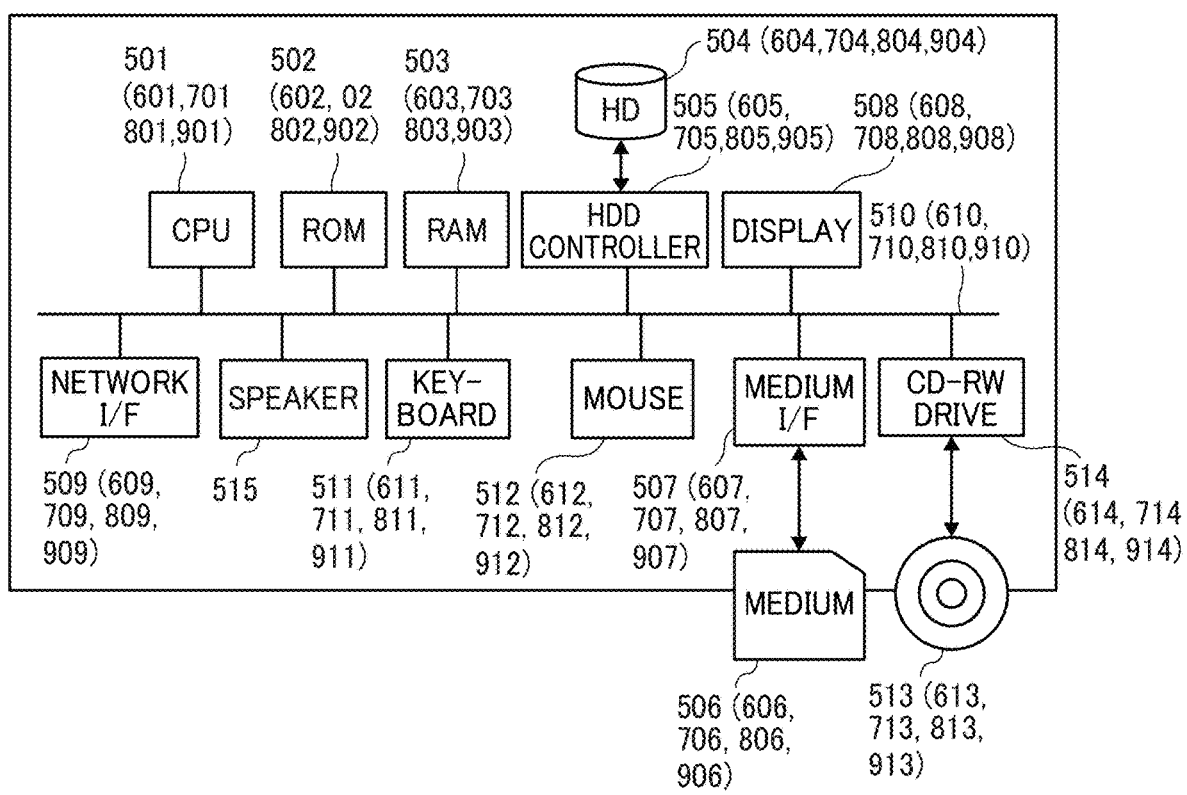
FIG. 6 is a schematic block diagram illustrating a hardware configuration of a computer, such as a personal computer (PC), and a server, according to an embodiment of the present disclosure.

Hardware Configuration of Server and PC:

FIG. 6 is a diagram illustrating a hardware configuration of the server (such as the sharing assistant server 6, the communication management server 7A, the relay device 7B, the schedule management server 8, and the voice-to-text conversion server 9) and the PC 5, according to the embodiment. The PC 5 is configured as a general-purpose computer. As illustrated in FIG. 6, the PC 5 includes a CPU 501, a ROM 502, a RAM 503, a hard disk (HD) 504, an HDD controller 505, a medium I/F 507, a display 508, a network I/F 509, a keyboard 511, a mouse 512, a compact disc rewritable (CD-RW) drive 514, a speaker 515, and a bus line 510.

The CPU 501 controls entire operation of the PC 5. The ROM 502 stores a control program such as an IPL to boot the CPU 501. The RAM 503 is used as a work area for the CPU 501. The HD 504 stores various data such as a control program. The HDD controller 505 controls reading or writing of various data to or from the HD 504 under control of the CPU 501. The medium I/F 507 controls reading or writing of data with respect to a storage medium 506 such as a flash memory. The display 508 displays various information such as a cursor, menu, window, characters, or image. The network I/F 509 is an interface that controls communication of data with an external device through the communication network 10. The keyboard 511 is one example of an input device (input means) provided with a plurality of keys for enabling a user to input characters, numerals, or various instructions. The mouse 512 is one example of an input device (input means) for enabling the user to select a specific instruction or execution, select a target for processing, or move a cursor being displayed. The CD-RW drive 514 reads or writes various data with respect to a CD-RW 513, which is one example of a removable storage medium. The speaker 515 outputs a sound signal under control of the CPU 501.

The bus line 510 is, for example, an address bus or a data bus, which electrically connects the elements such as the CPU 501 illustrated in FIG. 6.

Still referring to FIG. 6, a hardware configuration of each of the sharing assistant server 6, the communication management server 7A, the relay device 7B, the schedule management server 8 and the voice-to-text conversion server 9 is described. As illustrated in FIG. 6, the sharing assistant server 6, which is implemented by a general-purpose computer, includes a CPU 601, a ROM 602, a RAM 603, an HD 604, an HDD controller 605, a medium I/F 607, a display 608, a network I/F 609, a keyboard 611, a mouse 612, a CD-RW drive 614, and a bus line 610. The sharing assistant server 6 may be provided with a storage medium 606 or a CD-RW 613. Since these elements are substantially similar to the CPU 501, the ROM 502, the RAM 503, the HD 504, the HDD controller 505, the storage medium 506, the medium I/F 507, the display 508, the network I/F 509, the keyboard 511, the mouse 512, the CD-RW drive 514, and the bus line 510 of the PC 5, redundant description thereof is omitted.

Referring to FIG. 6, the communication management server 7A and the relay device 7B, each of which is implemented by a general-purpose computer, includes a CPU 701, a ROM 702, a RAM 703, an HD 704, an HDD controller 705, a medium I/F 707, a display 708, a network I/F 709, a keyboard 711, a mouse 712, a CD-RW drive 714, and a bus line 710. Each of the communication management server 7A and the relay device 7B may be provided with a storage medium 706 or a CD-RW 713. Since these elements are substantially similar to the CPU 501, the ROM 502, the RAM 503, the HD 504, the HDD controller 505, the storage medium 506, the medium I/F 507, the display 508, the network I/F 509, the keyboard 511, the mouse 512, the CD-RW drive 514, and the bus line 510 of the PC 5, redundant description thereof is omitted.

Referring to FIG. 6, the schedule management server 8, which is implemented by a general-purpose computer, includes a CPU 801, a ROM 802, a RAM 803, an HD 804, an HDD controller 805, a medium I/F 807, a display 808, a network I/F 809, a keyboard 811, a mouse 812, a CD-RW drive 814, and a bus line 810. The schedule management server 8 may be provided with a storage medium 806 or a CD-RW 813. Since these elements are substantially similar to the CPU 501, the ROM 502, the RAM 503, the HD 504, the HDD controller 505, the storage medium 506, the medium I/F 507, the display 508, the network I/F 509, the keyboard 511, the mouse 512, the CD-RW drive 514, and the bus line 510 of the PC 5, redundant description thereof is omitted.

Further referring to FIG. 6, the voice-to-text conversion server 9, which is implemented by a general-purpose computer, includes a CPU 901, a ROM 902, a RAM 903, an HD 904, an HDD controller 905, a medium I/F 907, a display 908, a network I/F 909, a keyboard 911, a mouse 912, a CD-RW drive 914, and a bus line 910. The voice-to-text conversion server 9 may be provided with a storage medium 906 or a CD-RW 913. Since these elements are substantially similar to the CPU 501, the ROM 502, the RAM 503, the HD 504, the HDD controller 505, the storage medium 506, the medium I/F 507, the display 508, the network I/F 509, the keyboard 511, the mouse 512, the CD-RW drive 514, and the bus line 510 of the PC 5, redundant description thereof is omitted.

Further, any one of the above-described control programs may be recorded in a file in a format installable or executable on a computer-readable storage medium for distribution. Examples of the storage medium include, but not limited to, Compact Disc Recordable (CD-R), Digital Versatile Disc (DVD), blue-ray disc, and SD card. In addition, such storage medium may be provided in the form of a program product to users within a certain country or outside that country. For example, the communication terminal such as the electronic whiteboard 2 executes the program according to the present disclosure to implement a display control method according to the present disclosure.

The sharing assistant server 6 can be configured by a single computer or a plurality of computers to which divided portions (functions, means, or storages) are arbitrarily allocated. This also applies to the communication management server 7A, the relay device 7B, the schedule management server 8 and the voice-to-text conversion server 9.

Figure 7:
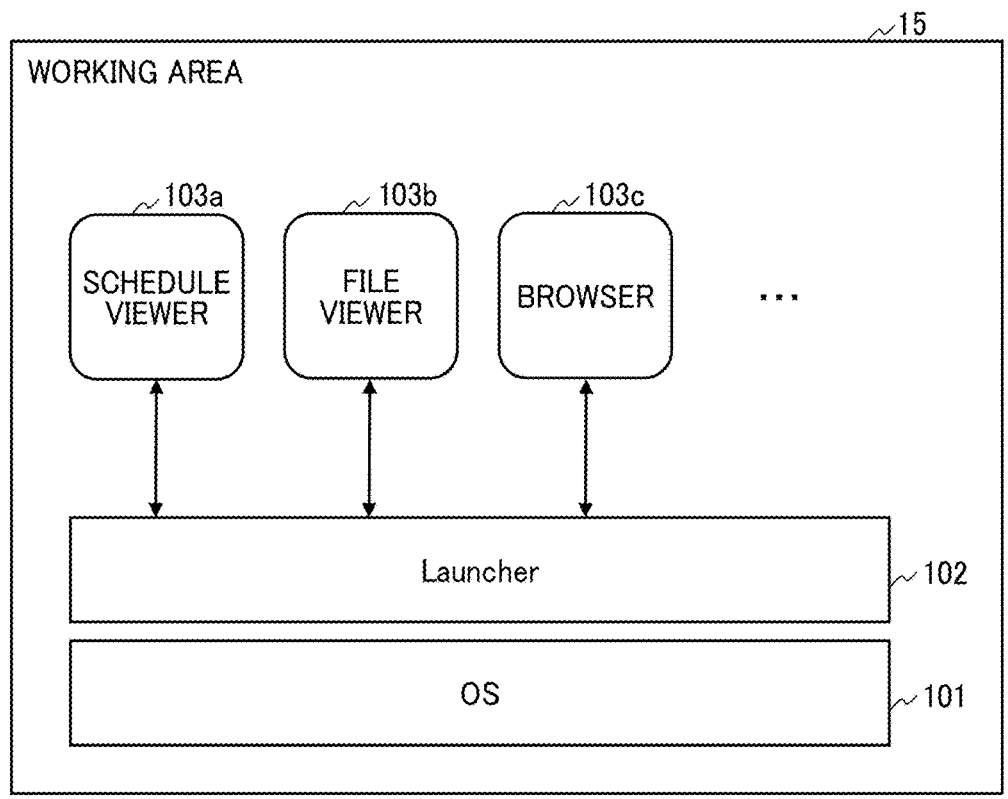
FIG. 7 is a schematic diagram illustrating a software configuration of the electronic whiteboard, according to an embodiment of the present disclosure.

Software Configuration of Electronic Whiteboard:

Next, referring to FIG. 7, computer software to be installed to the electronic whiteboard 2 is described according to an embodiment. In this disclosure, computer software (hereinafter simply referred to as "software") is a program relating to operation to be performed by a computer or any data to be used in processing by a computer according to such program. The program is a set of instructions for causing the computer to perform processing to have a certain result. While data to be used in processing according to the program is not a program itself, such data may define processing to be performed by the program such that it may be interpreted as equivalent to the program. For example, a data structure, which is a logical structure of data described by an interrelation between data elements, may be interpreted as equivalent to the program.

The application program, which may be simply referred to as "application", is a general term for any software used to perform certain processing. The operating system (hereinafter simply referred to as an "OS") is software for controlling a computer, such that software, such as applica-tion, is able to use computer resource. The OS controls basic operation of the computer such as input or output of data, management of hardware such as a memory or a hard disk, or processing to be executed. The application controls processing using functions provided by the OS.

FIG. 7 is a schematic diagram illustrating a software configuration of the electronic whiteboard 2, according to an embodiment. As illustrated in FIG. 7, the electronic whiteboard 2 is installed with OS 101, Launcher 102, schedule viewer 103a, file viewer 103b, and browser application 103c, which operate on a work area 15 of the RAM 203. The OS 101 is basic software that controls entire operation of the electronic whiteboard 2 through providing basic functions.

The Launcher 102 operates on the OS 101. The Launcher 102 controls, for example, processing to start or end an event managed by the electronic whiteboard 2, or controls external applications such as the schedule viewer 103a, the file viewer 103b, and the browser application 103c, which may be used during the event being conducted. In the following, one example of event is a meeting.

In this example, the schedule viewer 103a, the file viewer 103b, and the browser application 103c (collectively referred to as "external application" 103) operate on the Launcher 102. The external application 103 executes processing independently of the Launcher 102 to execute a service or a function under control of the OS 101. Although FIG. 7 illustrates an example in which three external applications including the schedule viewer 103a, the file viewer 103b and the browser application 103c are installed on the electronic whiteboard 2, any number of external applications may be installed on the electronic whiteboard 2.

Figure 8:
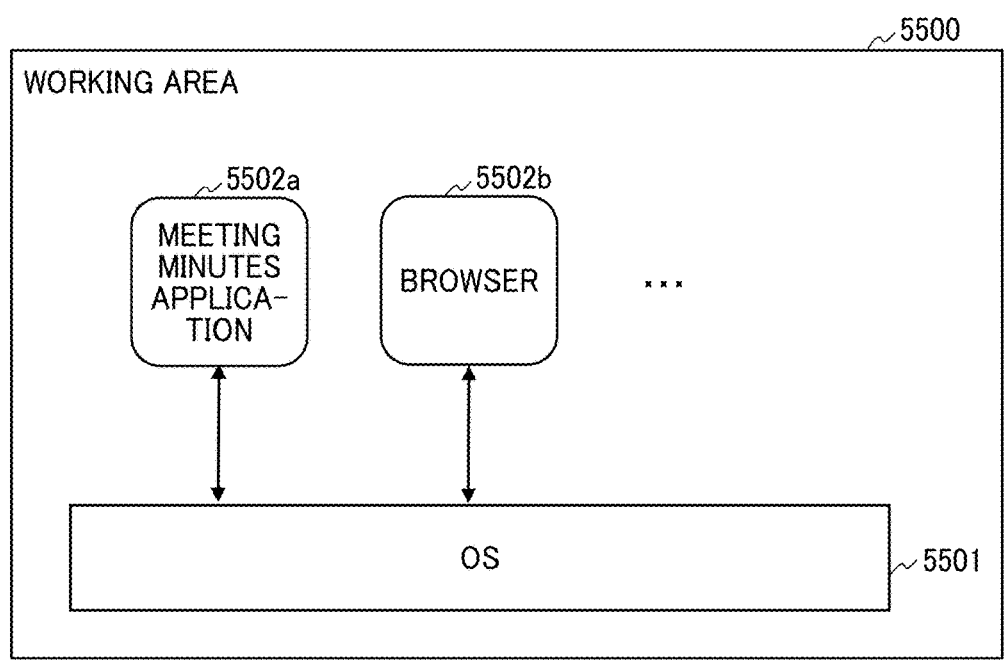
FIG. 8 is a schematic diagram illustrating a software configuration of the PC, according to an embodiment of the present disclosure.

Software Configuration of PC:

Next, referring to FIG. 8, computer software to be installed to the PC 5 is described according to an embodiment. FIG. 8 is a schematic diagram illustrating a software configuration of the PC 5, according to the embodiment. As illustrated in FIG. 8, the PC 5 is installed with an OS 5501, a meeting minutes application 5502a, and a browser 5502b, which operate on a working area 5500 of the RAM 503. The OS 5501 is basic software that controls entire operation of the PC 5 through providing basic functions.

The meeting minutes application 5502a, in cooperation with the browser 5502b, generates and displays an event record screen, which functions as meeting minutes of one or more meetings conducted using the electronic whiteboard 2, for example, based on various data transmitted from the schedule management server 8. Although FIG. 8 illustrates an example in which two external applications, i.e., the meeting minutes application 5502a and the browser 5502b, are installed on the PC 5, any number of external applications may be installed on the PC 5.

Figure 9:
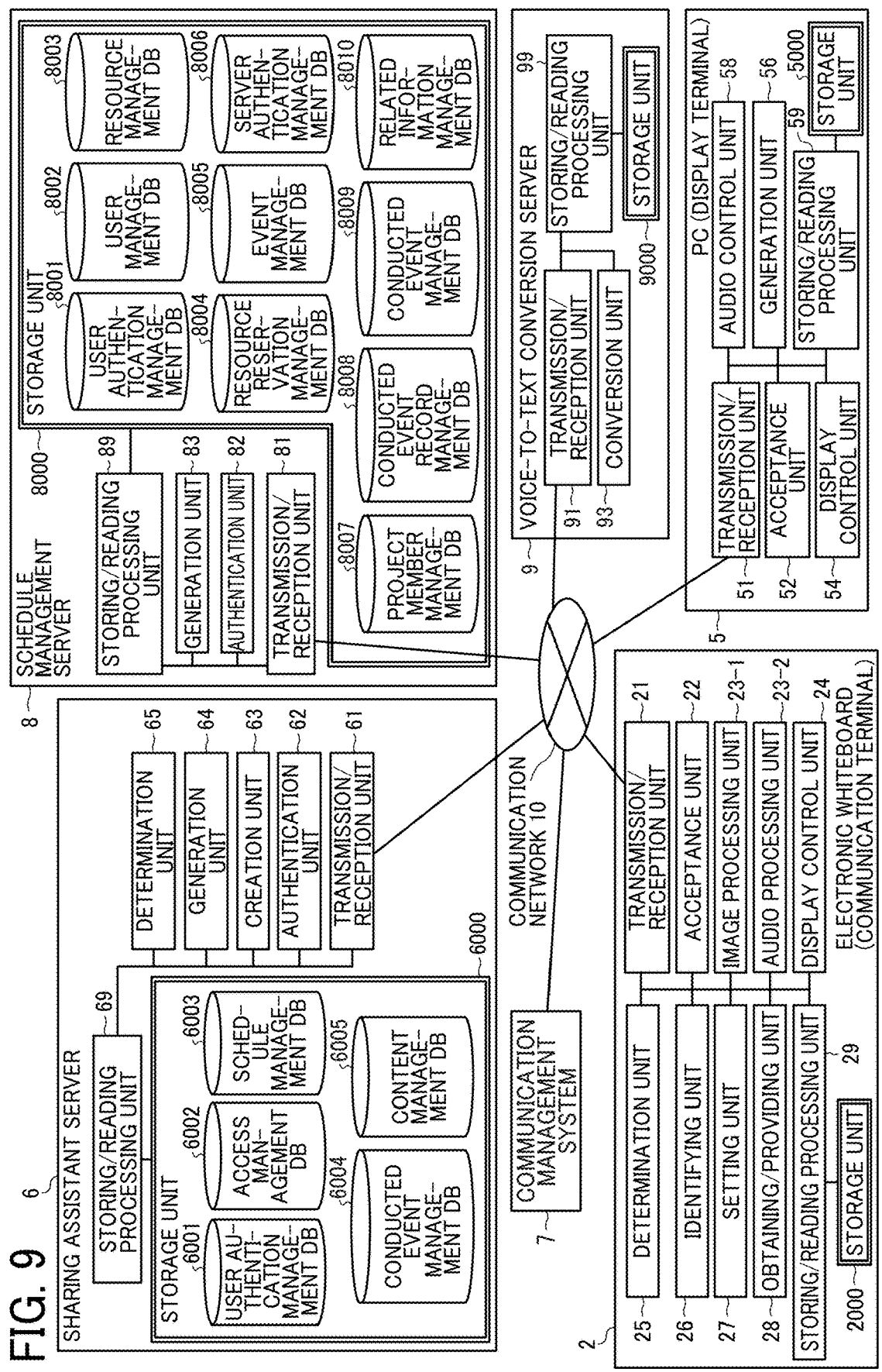
FIG. 9 is a schematic block diagram illustrating a functional configuration of the sharing system, according to an embodiment of the present disclosure.
Figure 10:
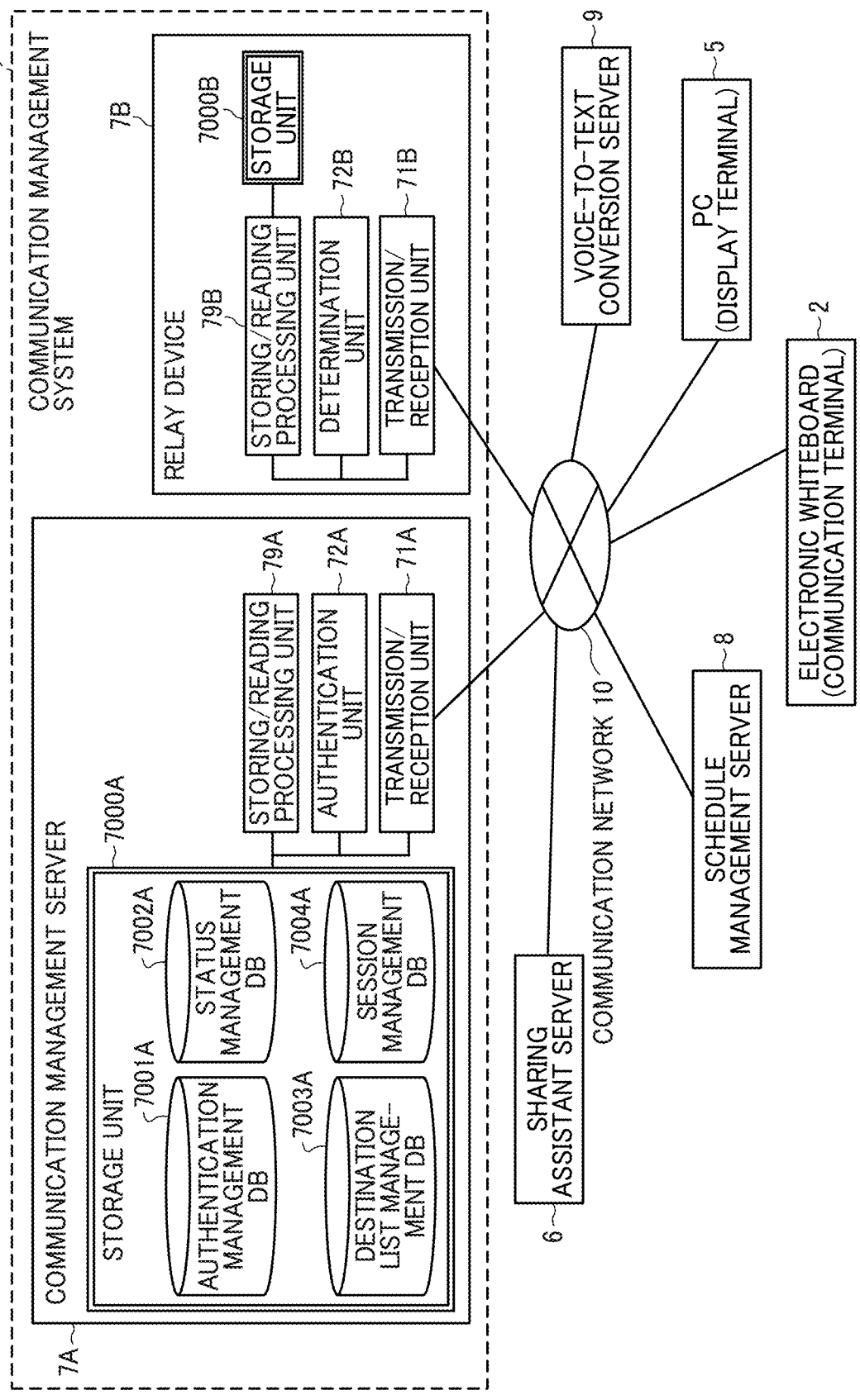
FIG. 10 is a schematic block diagram illustrating a functional configuration of the sharing system, according to an embodiment of the present disclosure.

Functional Configuration of Sharing System:

Referring to FIG. 9 to FIG. 19, a functional configuration of the sharing system 1 is described according to the embodiment. FIG. 9 and FIG. 10 are block diagrams illustrating an example of a functional configuration of the sharing system 1. In FIG. 9 and FIG. 10, only a part of those terminals, devices, and servers illustrated in FIG. 1 is illustrated, which relates to processing or operation to be described below. More specifically, the following illustrates an example case in which the user uses the conference room X as a resource, in which the electronic whiteboard 2 is provided. In other words, the videoconference terminal 3 and the car navigation system 4 do not have to be provided in the following embodiment.

Functional Configuration of Electronic Whiteboard:

As illustrated in FIG. 9, the electronic whiteboard 2 includes a transmission/reception unit 21, an acceptance unit 22, an image processing unit 23-1, an audio processing unit 23-2, a display control unit 24, a determination unit 25, an identifying unit 26, a setting unit 27, an acquiring/providing unit 28, and a storing/reading processing unit 29. These units are functions that are implemented by or that are caused to function by operating any of the elements illustrated in FIG. 3 in cooperation with the instructions of the CPU 201 according to the electronic whiteboard control program read from the SSD 204 to the RAM 203. The electronic whiteboard 2 further includes a storage unit 2000, which is implemented by the RAM 203, the SSD 204, or the USB memory 2600 illustrated in FIG. 3.

Functional Unit of Electronic Whiteboard:

Next, each functional unit of the electronic whiteboard 2 is described according to the embodiment. The transmission/reception unit 21, which is implemented by instructions of the CPU 201, by the network I/F 205, and by the external device connection I/F 206 illustrated in FIG. 3, transmits or receives various data (or information) to or from other terminal, apparatus, or system through the communication network 10. The transmission/reception unit 21 is an example of first transmitting means. Further, the transmission/reception unit 21 is an example of first receiving means.

The acceptance unit 22, which is implemented by instructions of the CPU 201, by the contact sensor 214, and by the electronic pen controller 216 illustrated in FIG. 3, receives various inputs from the user. The acceptance unit 22 is an example of accepting means.

In example operation, the image processing unit 23-1, which may be implemented by instructions of the CPU 201 and the capturing device 211 illustrated in FIG. 3, captures and stores image data displayed on the display 220. In other operation, the image processing unit 23-1, which may be implemented by instructions of the CPU 201 and the GPU 212 illustrated in FIG. 3, performs processing on data to be displayed on the display 220. For example, the image processing unit 23-1 applies image processing to image data of a subject that has been captured by the camera 2400. In another example, the image processing unit 23-1 obtains drawing image data, data of an image drawn by the user with the electronic pen 2500 or the user's hand H onto the display 220, and converts the drawing image data to coordinate data. For example, when the electronic whiteboard 2a transmits the coordinate data to an electronic whiteboard 2b at another site, the electronic whiteboard 2b at the another site controls the display 220 of the electronic whiteboard 2b at the another site to display a drawing image having the same content based on the received coordinate data.

The audio processing unit 23-2 is implemented by instructions of CPU 201 illustrated in FIG. 3. After voice of a user is converted to an audio signal by the microphone 2200, the audio processing unit 23-2 processes audio data based on this audio signal. Further, the audio processing unit 23-2 outputs the audio signal according to the audio data to the speaker 2300, and the speaker 2300 outputs sound. Further, the audio processing unit 23-2 controls the loopback device 2350 to acquires audio data base on sound to be output from the speaker 2300.

The display control unit 24 is implemented by instructions of the CPU 201 and by the display controller 213 illustrated in FIG. 3. The display control unit 24 controls the display 220 to display a drawing image, or accesses the sharing assistant server 6 using the web browser to display various screen data. Specifically, the display control unit 24 activates and executes the Launcher 102 and the external application 103, which operates on the OS 101 illustrated in FIG. 7, to display various screens on the display 220, under control of an API (Application Programming Interface) of the OS 101. The display control unit 24 is an example of display control means.

The determination unit 25, which is implemented by instructions of the CPU 201 illustrated in FIG. 3, makes various determinations to output determination results.

Figure 45:
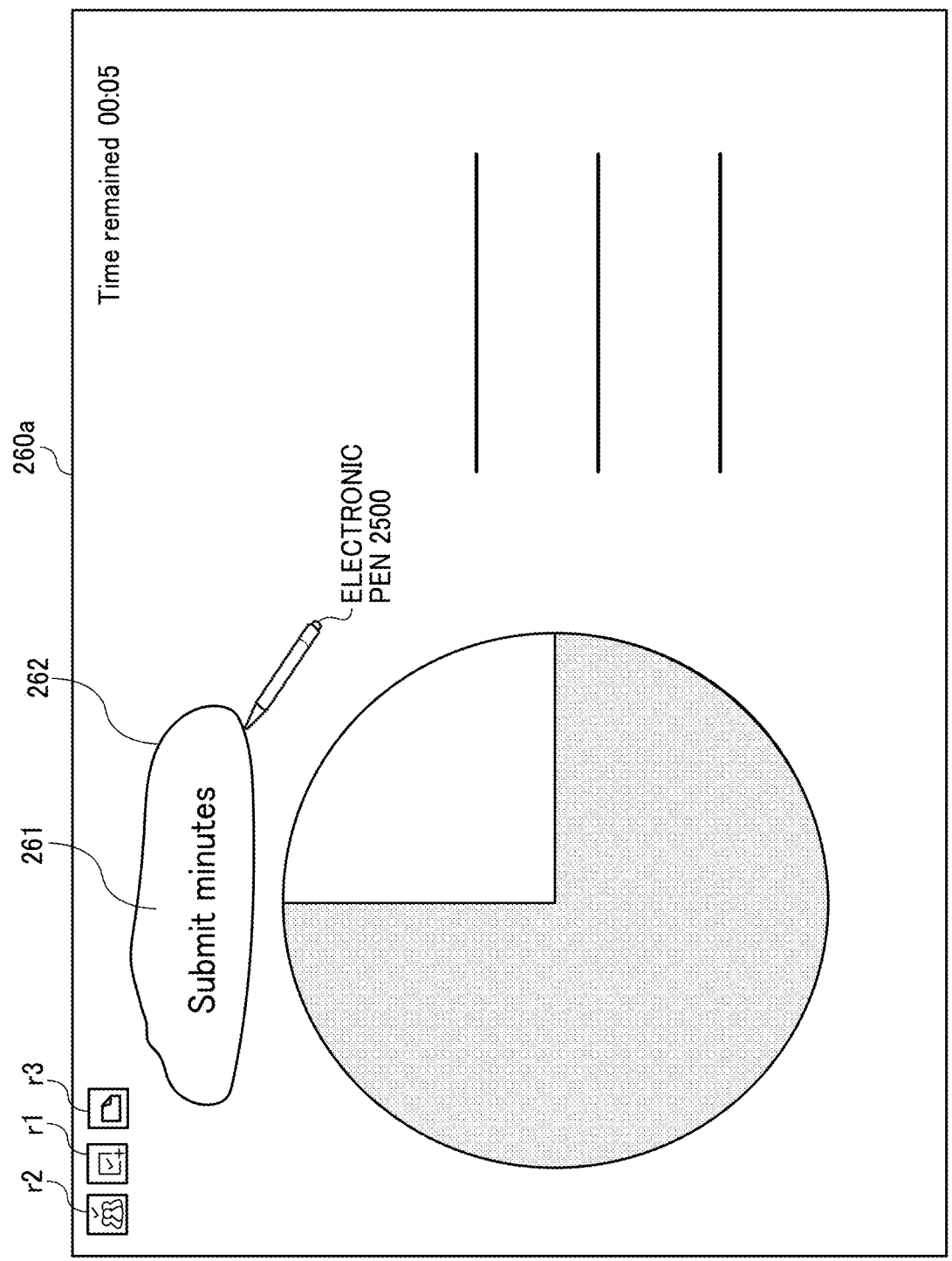
FIG. 45 is an illustration of an example screen in which an action item is designated, according to an embodiment of the present disclosure.

The identifying unit 26, which is implemented by instructions of the CPU 201 illustrated in FIG. 3, identifies a designated area 262 as illustrated in FIG. 45 described below on a screen of the display 220.

The setting unit 27, which is implemented by instructions of the CPU 201 illustrated in FIG. 3, configures settings of subtitle display of an on-going-event screen 170 described later.

The acquiring/providing unit 28, which is implemented by instructions of the CPU 201 and the short-range communication circuit 219 with the antenna 219a, illustrated in FIG. 3, communicates with a terminal device carried by the user, such as an IC card or a smartphone to obtain or provide data from or to the IC card or the smartphone by short-range communication.

The storing/reading processing unit 29, which is implemented by instructions of the CPU 201 and the SSD 204 illustrated in FIG. 3, performs processing to store various types of data in the storage unit 2000 or read various types of data stored in the storage unit 2000. Further, every time image data and audio data are received in performing communication with other electronic whiteboard or videoconference terminal, the storing/reading processing unit 29 overwrites data in the storage unit 2000 with the received image data and audio data. The display 220 displays an image based on image data before being overwritten, and the speaker 2300 outputs sound based on audio data before being overwritten.

Even if the videoconference terminal 3 or the car navigation system 4 is used as the communication terminal, the videoconference terminal 3 and the car navigation system 4 each has substantially the similar functions as those of the electronic whiteboard 2. Accordingly, redundant descriptions thereof are omitted below.

Functional Configuration of PC:

As illustrated in FIG. 9, the PC 5 includes a transmission/reception unit 51, an acceptance unit 52, a display control unit 54, a generation unit 56, an audio control unit 58, and a storing/reading processing unit 59. These units are functions that are implemented by or that are caused to function by operating any of the elements illustrated in FIG. 6 in cooperation with instructions of the CPU 501 according to the control program expanded from the HD 504 to the RAM 503. The PC 5 further includes a storage unit 5000 implemented by the HD 504 illustrated in FIG. 6.

Functional Unit of PC:

Next, each functional unit of the PC 5 is described according to the embodiment. The transmission/reception unit 51, which is implemented by instructions of the CPU 501 and by the network I/F 509 illustrated in FIG. 6, transmits or receives various types of data (or information) to or from other terminal, device, apparatus, or system through the communication network 10.

The acceptance unit 52, which is implemented by instructions of the CPU 501, by the keyboard 511, and by the mouse 512 illustrated in FIG. 6, accepts various inputs from the user.

The display control unit 54, which is implemented by the instructions of CPU 501 illustrated in FIG. 6, controls the display 508 to display an image, for example, using web browser based on various screen data that is obtained through accessing the sharing assistant server 6. Specifically, the display control unit 54 activates and executes the meeting minutes application 5502a or the browser 5502b, which operates on the OS 5501 illustrated in FIG. 8, to access the sharing assistant server 6 or the schedule management server 8. Further, the display control unit 54 downloads, for example, WebAPP (Web Application), which includes at least HTML (Hyper Text Markup Language), and further includes CSS (Cascading Style Sheets) or JavaScript (registered trademark). The display control unit 54 further controls the display 508 to display various image data generated using the WebAPP. For example, the display control unit 54 controls the display 508 to display image data generated by HTML5, which includes data in XML (Extensible Markup Language), JSON (JavaScript Object Notation), or SOAP (Simple Object Access Protocol).

The generation unit 56, which is implemented by instructions of the CPU 501 illustrated in FIG. 6, generates various types of image data for display on the display 508. For example, the generation unit 56 generates various image data using content data received at the transmission/reception unit 51. In one example, the generation unit 56 renders text data as an example of content data, and generates image data for display based on the text data that has been rendered. In this example, rendering is a set of processes to interpret data described in language for web page (HTML, CSS, XML, etc.) and calculate the arrangement of characters or images to be displayed on a screen.

The audio control unit 58, which is implemented by instructions of the CPU 501 illustrated in FIG. 6, controls the speaker 515 to output an audio signal. The audio control unit 58 sets audio data to be output from the speaker 515, such that the speaker 515 outputs the audio signal based on the set audio data to reproduce sound. The audio control unit 58 is an example of reproducing means.

The storing/reading processing unit 59, which is implemented by instructions of the CPU 501 and by the HDD controller 505 illustrated in FIG. 6, performs processing to store various types of data in the storage unit 5000 or read various types of data stored in the storage unit 5000.

Functional Configuration of Sharing Assistant Server:

The sharing assistant server 6 includes a transmission/reception unit 61, an authentication unit 62, a creation unit 63, a generation unit 64, a determination unit 65, and a storing/reading processing unit 69. These units are functions that are implemented by or that are caused to function by operating any of the hardware elements illustrated in FIG. 6 in cooperation with instructions of the CPU 601 according to a sharing assistant control program expanded from the HD 604 to the RAM 603. The sharing assistant server 6 further includes a storage unit 6000 implemented by the HD 604 illustrated in FIG. 6.

User Authentication Management Table:

FIG. 11A is an illustration of an example data structure of a user authentication management table. The storage unit 6000 stores a user authentication management DB 6001, which is implemented by the user authentication management table as illustrated in FIG. 11A. The user authentication management table stores, for each user being managed, a user ID for identifying the user, a user name of the user, an organization ID for identifying an organization to which the user belongs, and a password, in association. The organization ID may be represented as a domain name assigned to an organization such as a group for managing a plurality of computers on the communication network.

Access Management Table:

FIG. 11B is an illustration of an example data structure of an access management table. The storage unit 6000 stores an access management DB 6002, which is implemented by the access management table as illustrated in FIG. 11B. The access management table stores an organization ID, and an access ID and an access password required for authentication in accessing the schedule management server 8, in association. The access ID and the access password are needed for the sharing assistant server 6 to use a service (function) provided by the schedule management server 8 via such as the web API, using a protocol such as HTTP (Hypertext Transfer Protocol) or HTTPS (Hypertext Transfer Protocol Secure). Since the schedule management server 8 manages a plurality of schedulers, which may differ among the organizations, the access management table is provided to manage the schedulers.

Schedule Management Table:

FIG. 11C is an illustration of an example data structure of a schedule management table. The storage unit 6000 stores a schedule management DB 6003, which is implemented by the schedule management table as illustrated in FIG. 11C. The schedule management table stores, for each set of a scheduled event ID and a conducted event ID of an event, an organization ID and a user ID of a user as a reservation holder, participation of the reservation holder, a name of the reservation holder, a scheduled start time of the event, a scheduled end time of the event, a name of the event, a user ID(s) of one or more other users (other participants) in the event, participation of each other participant, names of one or more other users, and file data, in association.

The scheduled event ID is identification information for identifying an event that has been scheduled. The scheduled event ID is an example of scheduled event identification information for identifying an event to be conducted. The conducted event ID is identification information for identifying an event that has been conducted, from among one or more scheduled events. The conducted event ID is an example of conducted event identification information (conducted event ID) for identifying an event that has been conducted or being conducted. The name of the reservation holder is a name of the user who has reserved to use a particular resource. For example, assuming that the resource is a conference room, a name of the user who made the reservation is a name of an organizer who has organized a meeting (an example of event) to be held in that conference room. In case where the resource is a vehicle, a name of the user who made the reservation is a name of a driver who will drive the vehicle. The scheduled start time indicates a time when the user plans to start using the reserved resource. The scheduled end time indicates a time when the user plans to end using the reserved resource. That is, with the scheduled start time and the scheduled end time, a scheduled time period for the event is defined. The event name is a name of the event to be held by the user who has reserved the resource, using the reserved resource. The user ID of other participant is identification information for identifying any participant other than the reservation holder. As a participant other than the reservation holder, any resource to be used for the event may be included. In other words, the user scheduled to attend the event, managed by the schedule management table, includes a user as a reservation holder, other user as a participant of the event, and the resource reserved by the reservation holder. The file data is data of an electronic data file, which has been registered by a user in relation to the event. For example, the user A may register the file data to be used for the event identified with the scheduled event ID, through a schedule input screen 550 described below (see FIG. 23). In this example, the file data may be generated in any desired format, using any desired application. Examples of file format of the file data include, but not limited to, a PowerPoint file and an Excel file.

Figure 28:
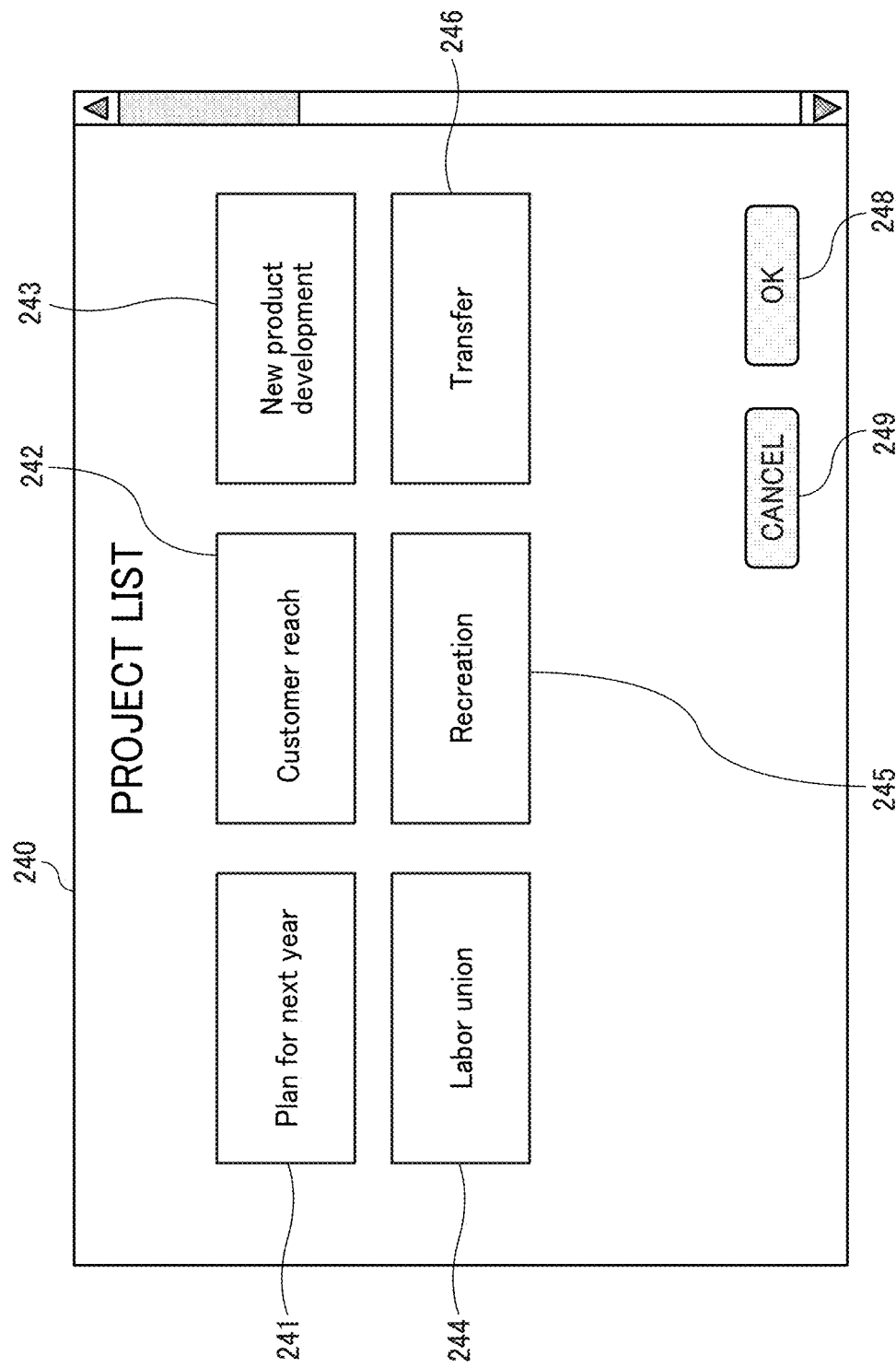
FIG. 28 is an illustration of an example of a project list screen, according to an embodiment of the present disclosure.

Conducted Event Management Table:

FIG. 12A is an illustration of an example data structure of a conducted event management table. The storage unit 6000 stores a conducted event management DB 6004, which is implemented by the conducted event management table as illustrated in FIG. 12A. The conducted event management table stores, for each project, a project ID of the project and a conducted event ID of each of one or more events that have been performed in relation to the project, in association. The project ID is identification information for identifying a project. The project ID is an example of project identification information. The project is any undertaking, possibly involving research or design, that is planned to achieve a particular aim. The project is carried out by a team or a group of members, called project members. In this embodiment, the project members of a particular project can share event records such as minutes of an event for the particular project associated with the project ID. As illustrated in FIG. 28 described below, a project ID is assigned to each project, such as to the project "Plan for next year" and the project "Customer reach". The project ID may be alternatively referred to as a group ID or a team ID, for identifying a group or team of project members.

Content Management Table:

FIG. 12B is an illustration of an example data structure of a content management table. The storage unit 6000 stores a content management DB 6005, which is implemented by the content management table as illustrated in FIG. 12B. The content management table stores, for each conducted event ID, a content processing ID, a type of content processing, content data, start date and time of content processing, and end date and time of content processing, in association. The content is any data or information that has been generated or that has been referred to, during the event held in relation to a particular project. For example, in case the event is a meeting, content being referred to may be any meeting materials such as data of presentation slides. Examples of type of content processing ("content processing type") include audio recording ("recording"), taking screenshots ("screenshot"), reception of voice text data ("voice text reception"), generation of action item ("action item"), and transmission of a data file ("file transmission"). The content processing ID is identification information for identifying processing to be performed in relation to content generated or used during the event.

Examples of content data include information or data ("record information") that helps to describe how the event has been progressed, and information or data that has been generated as the event is being held. In case the event is a meeting, the record information could be recorded voice data, screenshots, text data converted from voice, and meeting materials. The information or data generated during the meeting could be an action item. Screenshot is processing to capture a display screen, at any time during when the event is being held, to record as screen data. The screenshot may be alternatively referred to as capturing or image recognition.

When the content processing type is "recording", the "content data" field includes a URL of a storage destination of audio data that has been recorded. When the content processing type is "screenshot", the "content data" field includes a URL of a storage destination of image data generated by capturing a screen. In this disclosure, capturing is processing to store an image (still image or video image) being displayed on the display 220 of the electronic whiteboard 2 in a memory, as image data. When the content processing type is "voice text reception", the "content data" field includes a URL of a storage destination of text data of voice text that has been received.

One or more action items may occur during the event, such as the meeting, in relation to a particular project. The action item indicates an action to be taken by a person related to the event or the particular project. When the content processing type is "action item", the "content data" field includes a user ID of an owner of the action item, a due date of such action item, and a URL indicating a storage destination of image data describing the action item.

Functional Unit of Sharing Assistant Server:

Next, each functional unit of the sharing assistant server 6 are described in detail, according to the embodiment'. In the following description of the functional configuration of the sharing assistant server 6, relationships of one or more hardware elements in FIG. 6 with each functional unit of the sharing assistant server 6 in FIG. 9 will also be described.

The transmission/reception unit 61 of the sharing assistant server 6 illustrated in FIG. 9, which is implemented by the instructions of the CPU 601 illustrated in FIG. 6 and by the network I/F 609 illustrated in FIG. 6, transmits or receives various types of data (or information) to or from another terminal, device, or system through the communication network 10.

The authentication unit 62, which is implemented by instructions of the CPU 601 illustrated in FIG. 6, determines whether data (user ID, organization ID, and password) transmitted from the shared terminal matches any data previously registered in the user authentication management DB 6001, to perform authentication.

Figure 26:
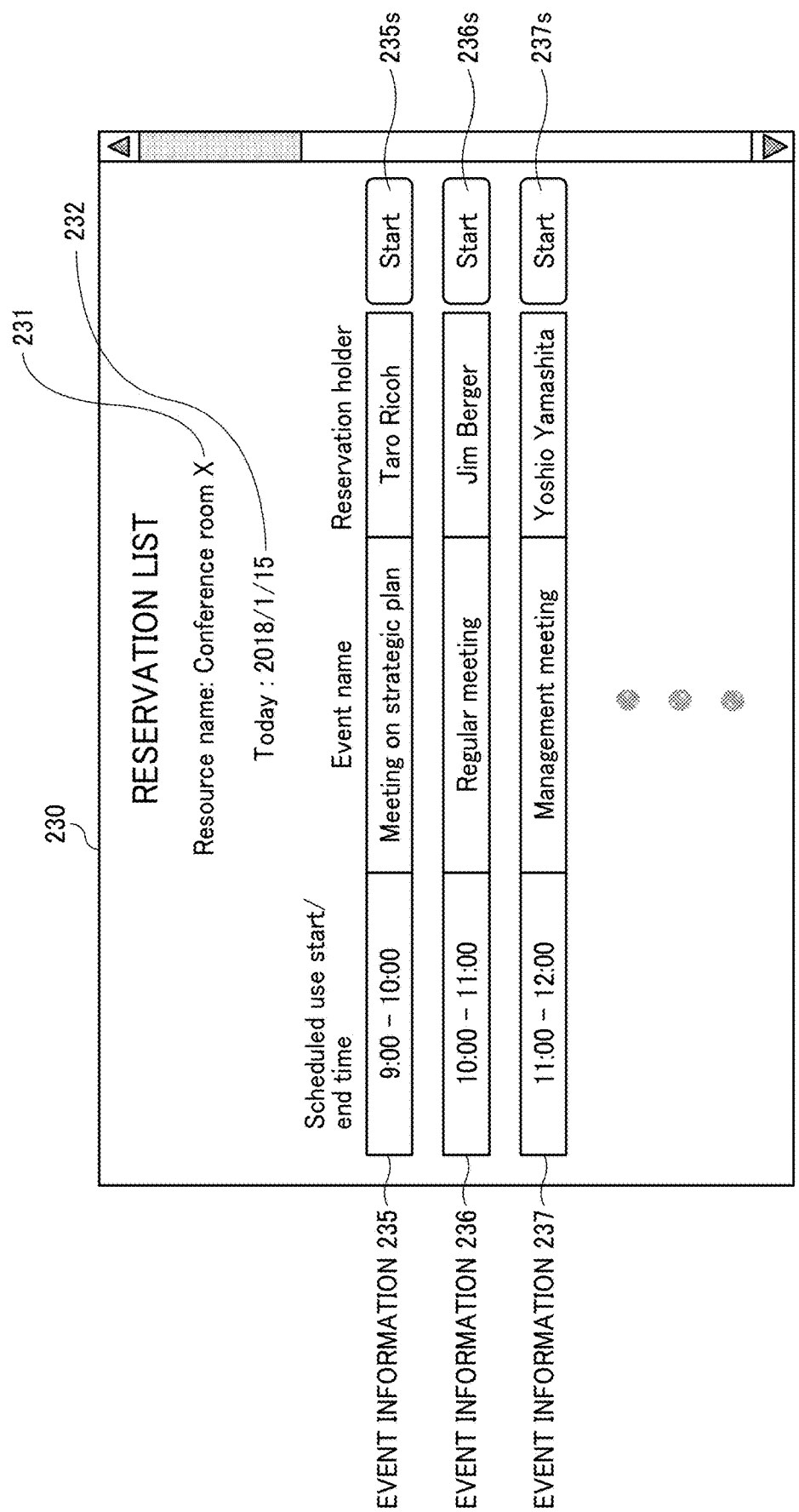
FIG. 26 is an illustration of an example of a reservation list screen of a resource, according to an embodiment of the present disclosure.

The creation unit 63, which is implemented by instructions of the CPU 601 illustrated in FIG. 6, generates a reservation list screen 230 as illustrated in FIG. 26 described below, based on reservation information and schedule information transmitted from the schedule management server 8.

The generation unit 64, which is implemented by instructions of the CPU 601 illustrated in FIG. 6, generates, or obtains, a conducted event ID, a content processing ID, and a URL of a storage destination of content.

The determination unit 65, which is implemented by instructions of the CPU 601 illustrated in FIG. 6, makes various determinations to output determination results. A detailed description is given later of the determinations by the determination unit 65.

The storing/reading processing unit 69, which is implemented by the instructions of the CPU 601 illustrated in FIG. 6 and by the HDD controller 605 illustrated in FIG. 6, performs processing to store various types of data in the storage unit 6000 or read various types of data stored in the storage unit 6000.

Functional Configuration of Schedule Management Server:

The schedule management server 8 includes a transmission/reception unit 81, an authentication unit 82, a generation unit 83, and a storing/reading processing unit 89. These units are functions that are implemented by or that are caused to function by operating any of the elements illustrated in FIG. 6 in cooperation with the instructions of the CPU 801 according to the schedule management program expanded from the HD 804 to the RAM 803. The schedule management server 8 further includes a storage unit 8000 implemented by the HD 804 illustrated in FIG. 6.

User Authentication Management Table:

FIG. 13A is an illustration of an example data structure of a user authentication management table. The storage unit 8000 stores a user authentication management DB 8001, which is implemented by the user authentication management table as illustrated in FIG. 13A. The user authentication management table of FIG. 13A stores, for each user being managed, a user ID for identifying the user, an organization ID for identifying an organization to which the user belongs, and a password, in association.

User Management Table:

FIG. 13B is an illustration of an example data structure of a user management table. The storage unit 8000 stores a user management DB 8002, which is implemented by the user management table as illustrated in FIG. 13B. The user management table stores, for each organization ID, one or more user IDs each identifying the user belonging to that organization, and names of the one or more users, in association.

Resource Management Table:

FIG. 13C is an illustration of an example data structure of a resource management table. The storage unit 8000 stores a resource management DB 8003, which is implemented by the resource management table as illustrated in FIG. 13C. The resource management table stores, for each organization ID, one or more resource IDs each identifying the resource managed by that organization, and names of the one or more resources, in association.

Resource Reservation Management Table:

FIG. 14A is an illustration of an example data structure of a resource reservation management table. The storage unit 8000 stores a resource reservation management DB 8004, which is implemented by the resource reservation management table illustrated in FIG. 14A. The resource reservation management table manages, for each organization, reservation information in which various data items relating to a reserved resource are associated. The reservation information includes, for each organization ID, a resource ID and a resource name of a reserved resource, a user ID of a communication terminal, a user ID of a reservation holder who made reservation, a scheduled use start date/time, a scheduled use end date/time, and an event name. The scheduled use start date/time indicates a date and time when the user plans to start using the reserved resource. The scheduled use end date/time indicates a date and time when the user plans to end using the reserved resource. In this example, while the date and time is expressed in terms of year, month, date, hour, minute, second, and time zone, FIG. 14A only illustrates year, month, date, hour, and minute for simplicity.

Event Management Table:

FIG. 14B is an illustration of an example data structure of an event management table. The storage unit 8000 stores an event management DB 8005, which is implemented by the event management table as illustrated in FIG. 14B. The event management table manages, for each event, event schedule information in which various data items relating to an event are associated. Specifically, the event management table stores, for each scheduled event ID, an organization ID, a user ID, and a name of each user who is scheduled to attend the event, a scheduled start date and time of the event, a scheduled end date and time of the event, and a name of the event, in association. The scheduled start date and time of the event indicates a date and time of the event that the user plans to participate starts. The scheduled end date and time of the event indicates a date and time of the event that the user plans to participate ends. In this example, while the date and time is expressed in terms of year, month, date, hour, minute, second, and time zone, FIG. 14B only illustrates year, month, date, hour, and minute for simplicity. The event management table further stores, for each scheduled event ID, a memo, and file data such as data of meeting materials used in the event indicated by the schedule information.

Server Authentication Management Table:

FIG. 15A is an illustration of an example data structure of a server authentication management table. The storage unit 8000 stores a server authentication management DB 8006, which is implemented by the server authentication management table as illustrated in FIG. 15A. The server authentication management table stores an access ID and an access password in association. The same description described above as to the access ID and the access password stored in the access management DB 6002 of the sharing assistant server 6 applies to the access ID and the access password stored in the server authentication table.

Project Member Management Table:

FIG. 15B is an illustration of an example data structure of a project member management table. The storage unit 8000 stores a project member management DB 8007, which is implemented by the project member management table as illustrated in FIG. 15B. The project member management table stores, for each organization ID, a project ID, a project name, and a user ID of each project member, in association.

Conducted Event Record Management Table:

FIG. 16A is an illustration of an example data structure of a conducted event record management table. The storage unit 8000 stores a conducted event record management DB 8008, which is implemented by the conducted event record management table as illustrated in FIG. 16A. The conducted event record management table stores, for each set of project ID and conducted event ID, a content processing ID, a type of content processing, content data, a start date and time of content processing, and an end date and time of content processing, in association. A part of data stored in the conducted event record management DB 8008 is the same as the data stored in the content management DB 6005. That is, the conducted event ID, content processing ID, type of content processing, start date and time of content processing, and end date and time of content processing, are the same between the content management DB 6005 and the conducted event record management DB 8008. The data in the "content data" field, that is, the storage destination of content, is managed using a different expression format, while the actual storage location is the same. Specifically, the storage destination is described in c:// (local drive) for the content management table (FIG. 12B), and in http:// for the conducted event record management table (FIG. 16A).

Conducted Event Management Table:

FIG. 16B is an illustration of an example data structure of a conducted event management table. The storage unit 8000 stores a conducted event management DB 8009, which is implemented by the conducted event management table as illustrated in FIG. 16B. The conducted event management table stores, for each conducted event ID, an event name, an event start date and time, and an event end date and time, in association. From among the schedule information stored in the event management DB 8005, information related to one or more events that have been actually held (called "conducted event") are managed using the conducted event management DB 8009.

Related Information Management Table:

FIG. 17 is an illustration of an example data structure of a related information management table. The storage unit 8000 stores a related information DB 8010, which is implemented by the related information management table as illustrated in FIG. 17. The related information management table stores, for each set of the project ID and the conducted event ID, related information in which various data items related to an event for a project are associated. Specifically, the related information associates a time when content is generated ("content generation time"), audio data, voice text data, and image data, in association. The content generation time is represented by an elapsed time counted from the event start date and time, until the time when content is generated during the event. The content generation time is an example of time information. The "audio data" field includes content processing ID, and content processing type. The "voice text data" field and the "image data" field each include content processing ID, content processing type, and a sequence number. The sequence number is assigned to each content processing ID, based on the content generation time. Accordingly, the sequence number indicates a temporal order in which each content processing is being performed during the event.

Functional Unit of Schedule Management Server:

Next, each functional unit of the schedule management server 8 is described in detail, according to the embodiment. In the following description of the functional configuration of the schedule management server 8, relationships of one or more hardware elements in FIG. 6 with each functional unit of the schedule management server 8 in FIG. 9 will also be described.

The transmission/reception unit 81 of the schedule management server 8 illustrated in FIG. 9, which is implemented by instructions of the CPU 801 illustrated in FIG. 6 and by the network I/F 809 illustrated in FIG. 6, transmits or receives various types of data (or information) to or from another terminal, device, or system through the communication network 10.

The authentication unit 82, which is implemented by instructions of the CPU 801 illustrated in FIG. 6, determines whether data (user ID, organization ID, and password) transmitted from the resource matches any data previously registered in the user authentication management DB 8001, to perform authentication. The authentication unit 82 determines whether data (access ID and access password) transmitted from the sharing assistant server 6 matches any data previously registered in the server authentication management DB 8006, to authenticate the sharing assistant server 6.

The generation unit 83, which is implemented by instructions of the CPU 801 illustrated in FIG. 6, generates related information to be registered to the related information management DB 8010.

The storing/reading processing unit 89, which is implemented by instructions of the CPU 801 illustrated in FIG. 6 and by the HDD controller 805 illustrated in FIG. 6, performs processing to store various types of data in the storage unit 8000 or read various types of data stored in the storage unit 8000.

Functional Configuration of Voice-to-Text Conversion Server:

The voice-to-text conversion server 9 includes a transmission/reception unit 91, a conversion unit 93, and a storing/reading processing unit 99. These units are functions that are implemented by or that are caused to function by operating any of the elements illustrated in FIG. 6 in cooperation with instructions of the CPU 901 according to the control program expanded from the HD 904 to the RAM 903. The voice-to-text conversion server 9 includes a storage unit 9000, implemented by the HD 904 illustrated in FIG. 6.

Functional Unit of Voice-to-Text Conversion Server:

Next, each functional unit of the voice-to-text conversion server 9 is described in detail, according to the embodiment. In the following description of the functional configuration of the voice-to-text conversion server 9, relationships of one or more hardware elements in FIG. 6 with each functional unit of the voice-to-text conversion server 9 in FIG. 9 will also be described.

The transmission/reception unit 91 of the voice-to-text conversion server 9 illustrated in FIG. 9, which is implemented by instructions of the CPU 901 illustrated in FIG. 6 and by the network I/F 909 illustrated in FIG. 6, transmits or receives various types of data (or information) to or from another terminal, device, or system through the communication network 10. The transmission/reception unit 91 is an example of second receiving means. Further, the transmission/reception unit 91 is an example of second transmitting means.

The conversion unit 93, which is implemented by instructions of the CPU 901 illustrated in FIG. 6, converts voice data (audio data) received at the transmission/reception unit 91 via the communication network 10, into text data (voice text data). The conversion unit 93 is an example of conversion means.

The storing/reading processing unit 99, which is implemented by instructions of the CPU 901 illustrated in FIG. 6 and by the HDD controller 905 illustrated in FIG. 6, performs processing to store various types of data in the storage unit 9000 or read various types of data stored in the storage unit 9000.

Functional Configuration of Communication Management Server:

Referring to FIG. 10, the communication management server 7A includes a transmission/reception unit 71A, an authentication unit 72A, and a storing/reading processing unit 79A. These units are functions that are implemented by or that are caused to function by operating any of the elements illustrated in FIG. 6 in cooperation with instructions of the CPU 701 according to the control program expanded from the HD 704 to the RAM 703. The communication management server 7A further includes a storage unit 7000A implemented by the HD 704 illustrated in FIG. 6.

Authentication Management Table:

FIG. 18A is an illustration of an example data structure of an authentication management table. The storage unit 7000A stores an authentication management DB 7001A, which is implemented by the authentication management table as illustrated in FIG. 18A. The authentication management table stores, for each communication IDs managed by the communication management server 7A, the communication ID and a password for authentication, in association.

The communication ID is information for identifying a communication destination in the sharing system 1. Examples of the communication ID include identification information (terminal ID) of the electronic whiteboard 2, which is an example of a communication terminal, identification information (user ID) for identifying a user of the electronic whiteboard 2, and an account name of the user. In the example of the authentication management table illustrated in FIG. 18A includes the communication ID configured as a set of the terminal ID, the user ID, and the account name. In another example, at least one of the terminal ID, the user ID, and the account name will suffice. The following description is given on an example in which the identification information (terminal ID) of the communication terminal is used as information for identifying a communication destination. Further, in the following description, the communication ID corresponding to the electronic whiteboard 2a is "01aa" and the communication ID corresponding to the electronic whiteboard 2b is "01bb".

Status Management Table:

FIG. 18B is an illustration of an example data structure of a status management table. The storage unit 7000A stores a status management DB 7002A, which is implemented by the status management table as illustrated in FIG. 18B. The status management table stores, for each of the communication IDs of the communication terminals, an operating status of the communication terminal, a reception date and time when login request information described later is received at the communication management server 7A, and an IP address of the communication terminal, in association. Note that the communication ID is stored when the communication terminal is registered in the communication management server 7A such that the communication terminal performs communication using the communication management server 7A.

Destination List Management Table:

FIG. 19A is an illustration of an example data structure of a destination list management table. The storage unit 7000A stores a destination list management DB 7003A, which is implemented by the destination list management table as illustrated in FIG. 19A. The destination list management table stores a communication ID of a communication terminal (request source terminal) that sends a request for the start of communication in association with the terminal IDs of all terminals registered as destination terminal candidates. The destination terminal candidates are updated by addition or deletion in response to an addition or deletion request transmitted from any request source terminal to the communication management server 7A.

Session Management Table:

FIG. 19B is an illustration of an example data structure of a session management table. The storage unit 7000A further stores a session management DB 7004A, which is implemented by the session management table as illustrated in FIG. 19B. The session management table stores a relay device ID of the relay device 7B used in communication data (image data and voice data), the communication ID of the request source terminal, the communication ID of the destination terminal, a delay time (ms) in receiving image data at the destination terminal, and a reception date/time ("delay information reception date/time") at which delay information indicating this delay time transmitted from the destination terminal is received by the communication management server 7A, in association.

In another example, in a case where communication is performed between two communication terminals, the delay information reception date/time can be managed based on delay information transmitted from the request source terminal instead of the one transmitted from the destination terminal. However, in a case where communication is performed between three or more communication terminals, the delay information reception date/time is managed based on the delay information transmitted from the communication terminal that received the image data and the audio data.

Functional Unit of Communication Management Server:

Next, each functional unit of the communication management server 7A is described in detail, according to the embodiment. In the following description of the functional configuration of the communication management server 7A, relationships of one or more hardware elements in FIG. 6 with each functional unit of the communication management server 7A in FIG. 10 will also be described.

The transmission/reception unit 71A of the communication management server 7A illustrated in FIG. 10, which is implemented by instructions of the CPU 701 illustrated in FIG. 6 and by the network I/F 709 illustrated in FIG. 6, transmits or receives various types of data (or information) to or from another terminal, device, or system through the communication network 10.

The authentication unit 72A, which is implemented by instructions of the CPU 701 illustrated in FIG. 6, authenticates a login request source terminal, which sends a request for login to the communication management server 7A. Specifically, in response to receiving login request information at the transmission/reception unit 71A, the authentication unit 72A authenticates the login request source terminal using information registered in advance in the authentication management table stored in the authentication management DB 7001A.

The storing/reading processing unit 79A, which is implemented by instructions of the CPU 701 illustrated in FIG. 6 and by the HDD controller 705 illustrated in FIG. 6, performs processing to store various types of data in the storage unit 7000A or read various types of data stored in the storage unit 7000A.

Functional Configuration of Relay Device:

Referring to FIG. 10, the relay device 7B includes a transmission/reception unit 71B, a determination unit 72B, and a storing/reading processing unit 79B. These units are functions that are implemented by or that are caused to function by operating any of the elements illustrated in FIG. 6 in cooperation with instructions of the CPU 701 according to the control program expanded from the HD 704 to the RAM 703. The relay device 7B further includes a storage unit 7000B implemented by the HD 704 illustrated in FIG. 6.

Functional Unit of Relay Device:

Next, each functional unit of the relay device 7B is described in detail, according to the embodiment. In the following description of the functional configuration of the relay device 7B, relationships of one or more hardware elements in FIG. 6 with each functional unit of the relay device 7B in FIG. 10 will also be described.

The transmission/reception unit 71B of the relay device 7B illustrated in FIG. 10, which is implemented by instructions of the CPU 701 illustrated in FIG. 6 and by the network I/F 709 illustrated in FIG. 6, transmits or receives various types of data (or information) to or from another terminal, device, or system through the communication network 10.

The determination unit 72B, which is implemented by instructions of the CPU 701 illustrated in FIG. 6, makes various determinations to output determination results.

The storing/reading processing unit 79B, which is implemented by instructions of the CPU 701 illustrated in FIG. 6 and by the HDD controller 705 illustrated in FIG. 6, performs processing to store various types of data in the storage unit 7000B or read various types of data stored in the storage unit 7000B.

In this disclosure, any one of the IDs described above is an example of identification information identifying the device or terminal, or the user operating the device or terminal. Examples of the organization ID include, but not limited to, a name of a company, a name of a branch, a name of a business unit, a name of a department, and a name of a region. In alternative to the user ID identifying a specific user, an employee number, a driver license number, and an individual number called "My Number" under the Japan's Social Security and Tax Number System, may be used as identification information for identifying the user.

Operation:

The following describes one or more operations to be performed by the sharing system 1, according to one or more embodiments.

Figure 20:
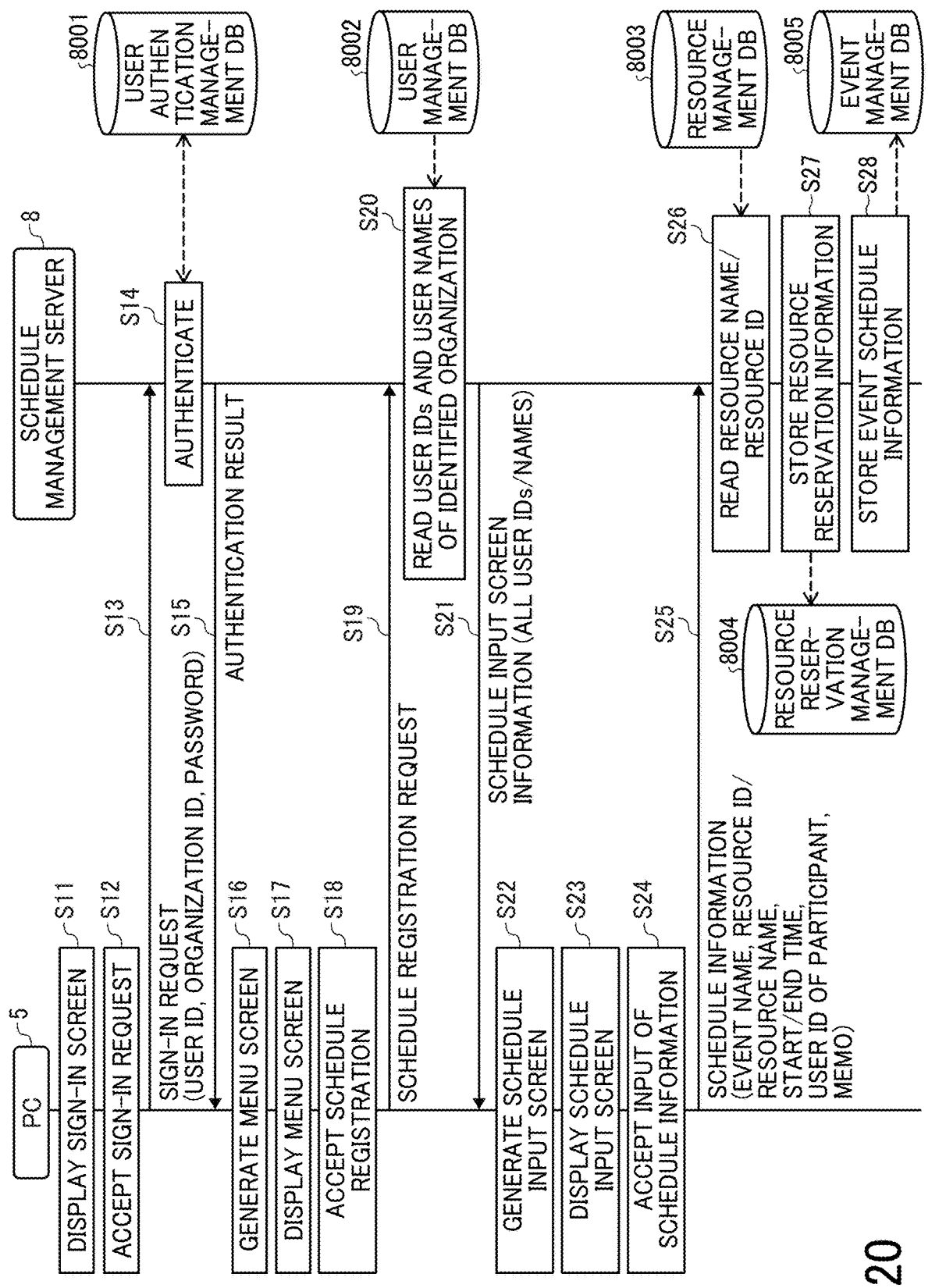
FIG. 20 is a sequence diagram illustrating operation of registering a schedule, according to an embodiment of the present disclosure.
Figure 21:
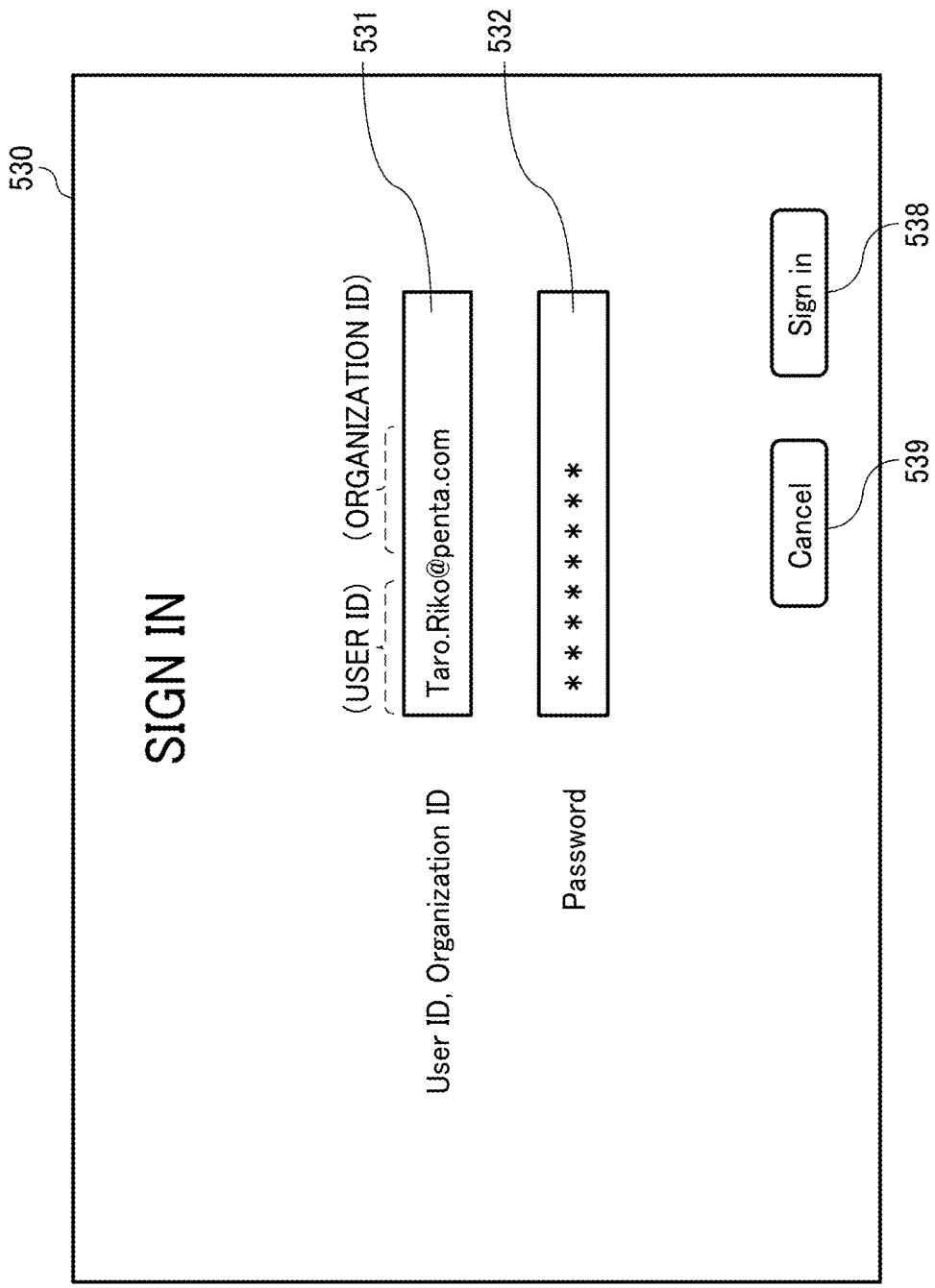
FIG. 21 is an illustration of an example of a sign-in screen, according to an embodiment of the present disclosure.
Figure 22:
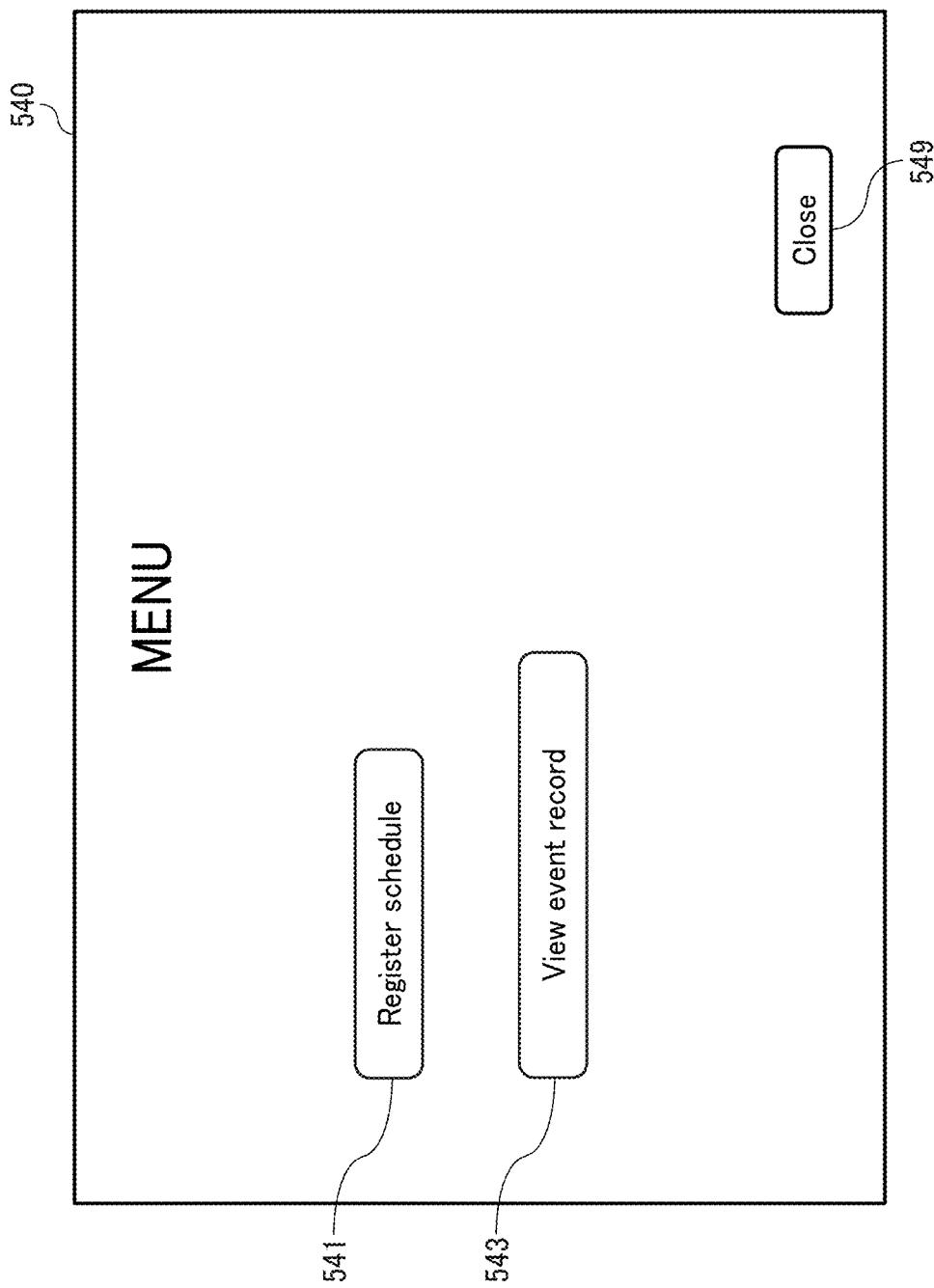
FIG. 22 is an illustration of an example of a menu screen displayed by the PC, according to an embodiment of the present disclosure.
Figure 23:
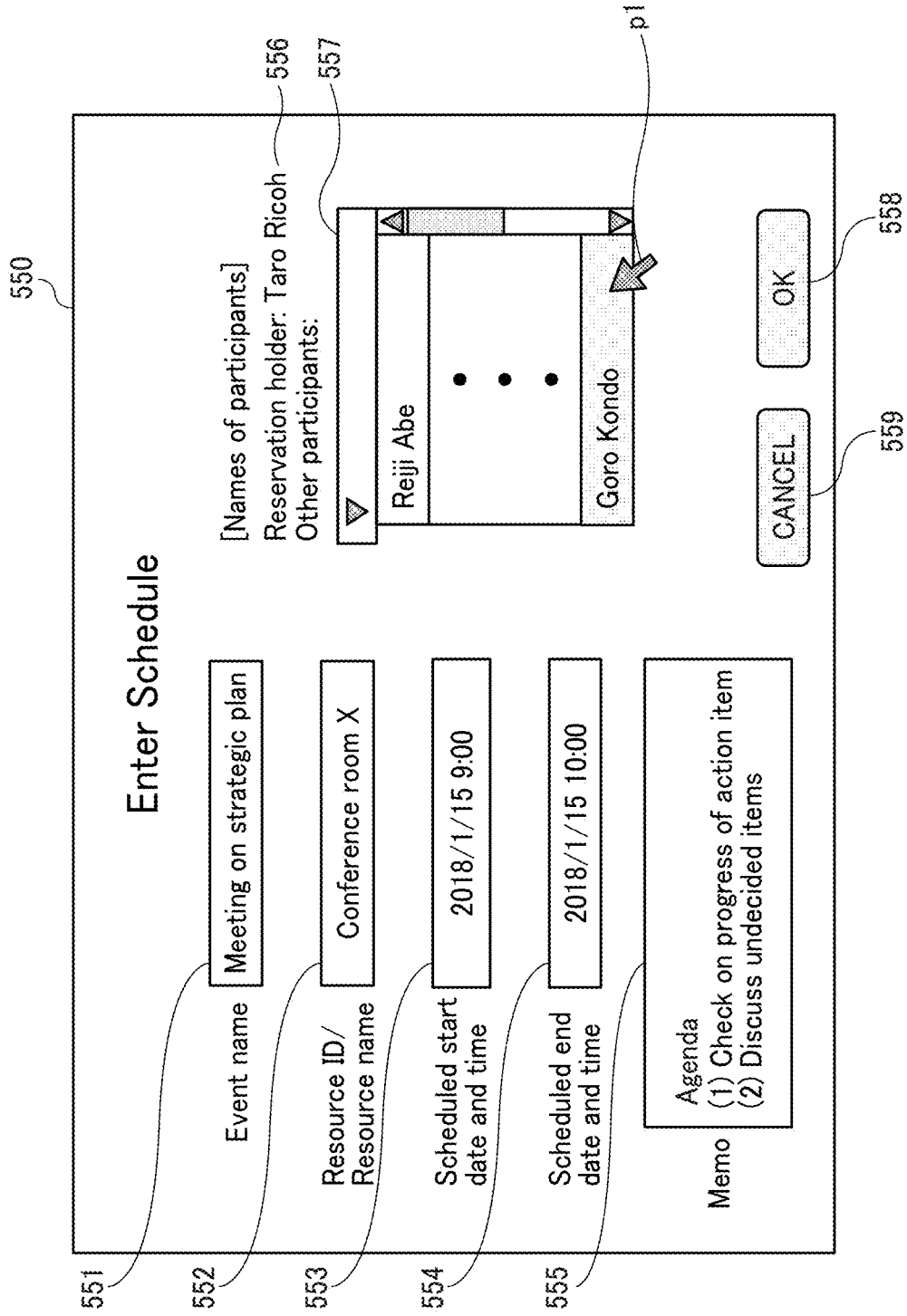
FIG. 23 is an illustration of an example of a schedule input screen, according to an embodiment of the present disclosure.

Processing to Register Schedule:

Referring to FIG. 20 to FIG. 23, operation of registering a schedule of a user A (Taro Ricoh) to the schedule management server 8, using the PC 5, is described according to an example. FIG. 20 is a sequence diagram illustrating operation of registering schedule, according to an embodiment. FIG. 21 is an illustration of an example of a sign-in screen. FIG. 22 is an illustration of an example of a menu screen displayed by the PC 5. FIG. 23 is an illustration of an example of a schedule input screen.

In response to an operation to the keyboard 511, for example, of the PC 5 by the user A, the display control unit 54 of the PC 5 displays a sign-in screen 530 on the display 508 as illustrated in FIG. 21 (S11). The sign-in screen 530 allows the user to sign (log) into the schedule management server 8. The sign-in screen 530 includes an entry field 531 for entering a user ID and an organization ID of a user, an entry field 532 for entering a password, a sign-in button 538 to be pressed when executing sign-in processing, and a cancel button 539 to be pressed when canceling the sign-in processing. In this case, the user ID and the organization ID are each extracted from an e-mail address of the user A. Specifically, a user name of the email address represents the user ID, and a domain name of the email address represents the organization ID. While only one entry field 531 for entering the email address is illustrated in FIG. 21, an entry field may be provided for each of the user ID and the organization ID.

Through the sign-in screen 530, the user enters the user ID and the organization ID of his/her own into the entry field 531, enters the password of his/her own into the entry field 532, and presses the sign-in button 538. In response to such user operation, the acceptance unit 52 of the PC 5 accepts a request for sign-in processing (S12). The transmission/reception unit 51 of the PC 5 transmits sign-in request information indicating a request for sign-in to the schedule management server 8 (S13). The sign-in request information includes the user ID, organization ID, and password, which are accepted at S12. Accordingly, the transmission/reception unit 81 of the schedule management server 8 receives the sign-in request information.

Next, the authentication unit 82 of the schedule management server 8 authenticates the user A using the user ID, the organization ID, and the password (S14). Specifically, the storing/reading processing unit 89 determines whether a set of the user ID, the organization ID, and the password, which is obtained from the sign-in request information received at S13, has been registered in the user authentication management DB 8001 (FIG. 13A). When there is the set of the user ID, the organization ID, and the password in the user authentication management DB 8001, the authentication unit 82 determines that the user A who has sent the sign-in request is an authorized user. When there is no such set of the user ID, the organization ID, and the password in the user authentication management DB 8001, the authentication unit 82 determines that the user A is an unauthorized (illegitimate) user. When the authentication unit 82 determines that the user A is an illegitimate user, the transmission/reception unit 81 sends to the PC 5 a notification indicating that the user A is the illegitimate user. In the following, it is assumed that the user A is identified as an authorized user.

The transmission/reception unit 81 transmits an authentication result to the PC 5 (S15). The transmission/reception unit 51 of the PC 5 receives the authentication result.

When the authentication result is received at S15, the generation unit 56 of the PC 5 generates data of a menu screen 540 for display as illustrated in FIG. 22 (S16). The display control unit 54 of the PC 5 controls the display 508 to display the menu screen 540 as illustrated in FIG. 22 (S17). In this example, the menu screen 540 includes a "Register schedule" button 541 for registering a schedule, and an "View event record" button 543 for viewing a conducted event record. In response to pressing of the "Register schedule" button 541 by the user, the acceptance unit 52 accepts a request for schedule registration (S18). The transmission/reception unit 51 of the PC 5 transmits a schedule registration request to the schedule management server 8 (S19). Accordingly, the transmission/reception unit 81 of the schedule management server 8 receives the schedule registration request.

Next, the storing/reading processing unit 89 of the schedule management server 8 searches the user management DB 8002 (FIG. 13B), using the organization ID received at S13 as a search key, to read out all user IDs and all user names that are associated with the received organization ID (S20). The transmission/reception unit 81 transmits schedule input screen information to the PC 5 (S21). The schedule input screen information includes all user IDs and all user names read out at S20. Here, all user names include the name of the user A who has entered various information at S12 to request for sign-in processing to input schedule information. The transmission/reception unit 51 of the PC 5 receives the schedule input screen information.

The generation unit 56 of the PC 5 generates data of a schedule input screen 550 for display, based on the schedule input screen information received at S21 (S22). The display control unit 54 of the PC 5 controls the display 508 to display the schedule input screen 550 as illustrated in FIG. 23 (S23).

The schedule input screen 550 includes an entry field 551 for an event name, an entry field 552 for a resource ID or a resource name, and an entry field 553 for a scheduled start date and time of the event (use of the resource), an entry field 554 for a scheduled end date and time of the event (use of the resource), an entry field 555 for entering memo such as agenda, a display field 556 for displaying a name of a reservation holder (in this example, the user A) who is making a reservation, a selection menu 557 for selecting one or more participants other than the reservation holder by name, an "OK" button 558 to be pressed when requesting for registration of reservation, and a "CANCEL" button 559 to be pressed when cancelling any content being entered or has been entered. The name of the reservation holder is a name of the user who has entered various information using the PC 5 to request for sing-in processing at S12. FIG. 23 further illustrates a mouse pointer p1.

The user may enter an email address of the resource in the entry field 552, as an identifier of the resource to be reserved. Further, the selection menu 557 may allow the reservation holder to select one or more resources by name. When a name of a particular resource is selected from the selection menu 557, that selected resource is added as one of participants in the event.

The user A enters items as described above in the entry fields 551 to 555, selects the name of each user participating in the event from the selection menu 557 by moving the pointer p1 with the mouse, and presses the "OK" button 558. In response to pressing of the "OK" button 558, the acceptance unit 52 of the PC 5 accepts input of schedule information (S24). The transmission/reception unit 51 transmits the schedule information, which has been accepted, to the schedule management server 8 (S25). The schedule information includes an event name, a resource ID (or a resource name), a scheduled start date and time, a scheduled end date and time, a user ID of each participant, and information on memo. When a resource ID is entered in the entry field 552 on the schedule input screen 550, the PC 5 transmits the entered resource ID as part of schedule information. When a resource name is entered in the entry field 552, the PC 5 transmits the entered resource name as part of schedule information. Here, only the user name is selected from the selection menu 557 on the schedule input screen 550. However, since the PC 5 has received the user IDs at S21, the PC 5 transmits the user ID corresponding to each of the user names that have been selected as part of schedule information. Accordingly, the transmission/reception unit 81 of the schedule management server 8 receives the schedule information.

Next, the storing/reading processing unit 89 of the schedule management server 8 searches the resource management DB 8003 (FIG. 13C) using the resource ID (or resource name) received at S25 as a search key, to obtain the corresponding resource name (or resource ID) (S26).

The storing/reading processing unit 89 stores the reservation information in the resource reservation management DB 8004 (FIG. 14A) (S27). In this case, the storing/reading processing unit 89 adds one record of reservation information to the resource reservation management table in the resource reservation management DB 8004 managed by a scheduler previously registered (that is, the scheduler managed for a particular organization). The reservation information is generated based on the schedule information received at S25 and the resource name (or resource ID) read out at S26. The scheduled use start date/time in the resource reservation management DB 8004 corresponds to the scheduled start date and time in the schedule information. The scheduled use end date/time in the resource reservation management DB 8004 corresponds to the scheduled end date and time in the schedule information.

The storing/reading processing unit 89 stores the schedule information in the event management DB 8005 (FIG. 14B) (S28). In this case, the storing/reading processing unit 89 adds one record of schedule information (that is, event schedule information) to the event management table in the event management DB 8005 managed by the scheduler that is previously registered (that is, the scheduler managed for a particular organization). The schedule information is generated based on the schedule information received at S25. The scheduled start date and time of the event in the event management DB 8005 corresponds to the scheduled start date and time in the schedule information. The scheduled end date and time of the event in the event management DB 8005 corresponds to the scheduled end date and time in the schedule information.

As described above, the user A registers his or her schedule to the schedule management server 8.

Figure 24:
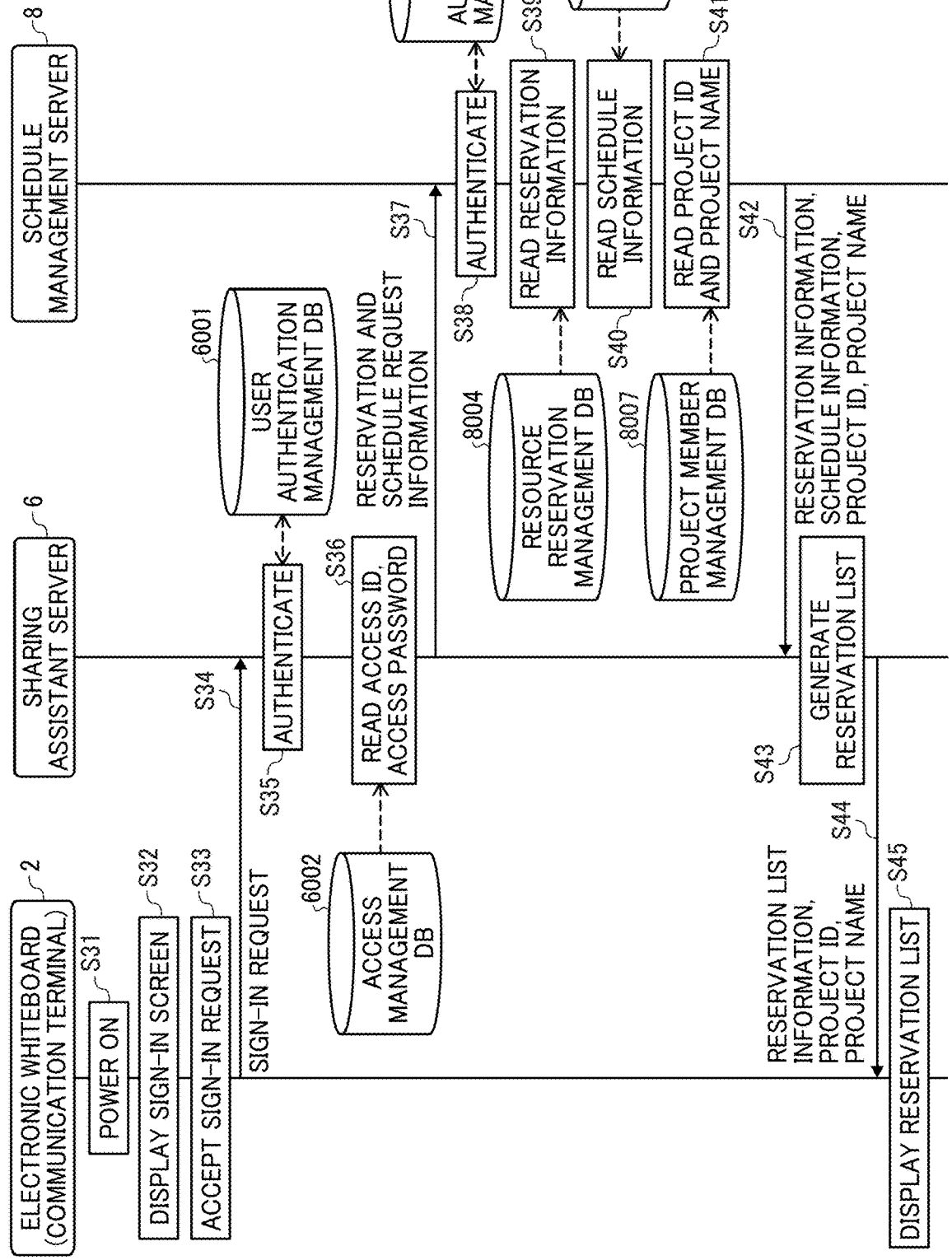
FIG. 24 is a sequence diagram illustrating operation of controlling processing to start an event, according to an embodiment of the present disclosure.
Figure 25:
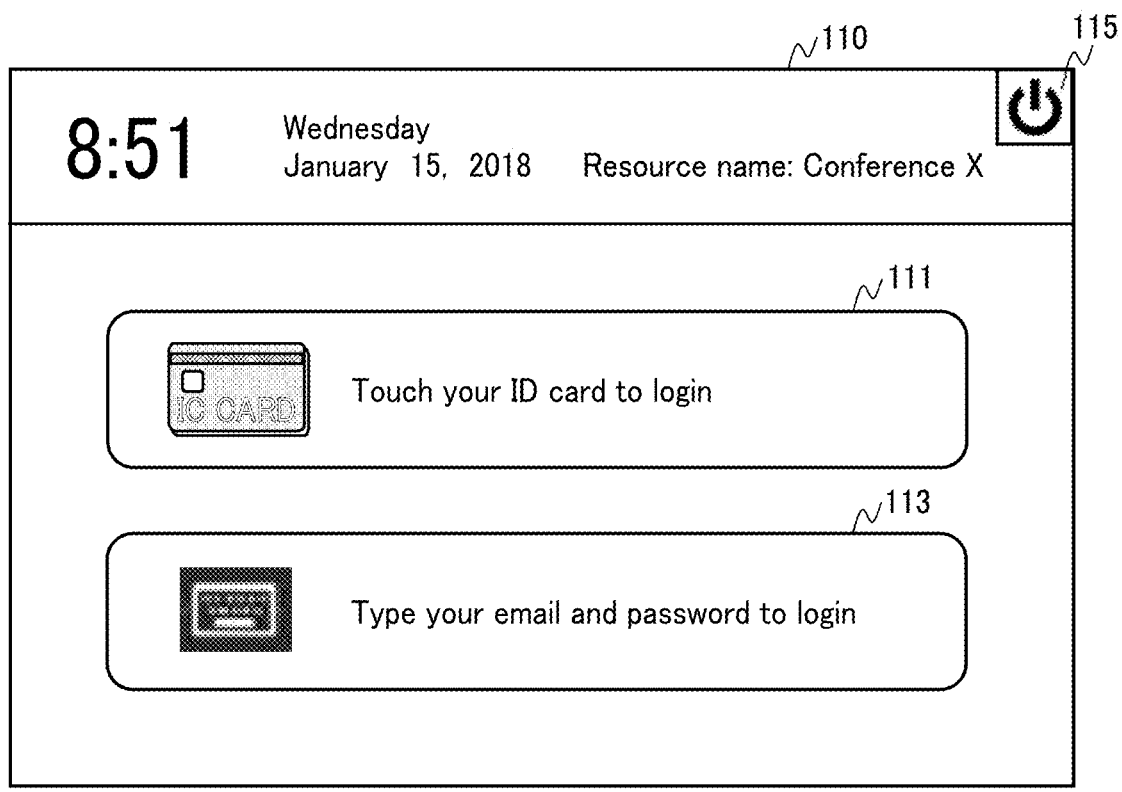
FIG. 25 is an illustration of an example of a sign-in screen displayed on the electronic whiteboard, according to an embodiment of the present disclosure.
Figure 27:
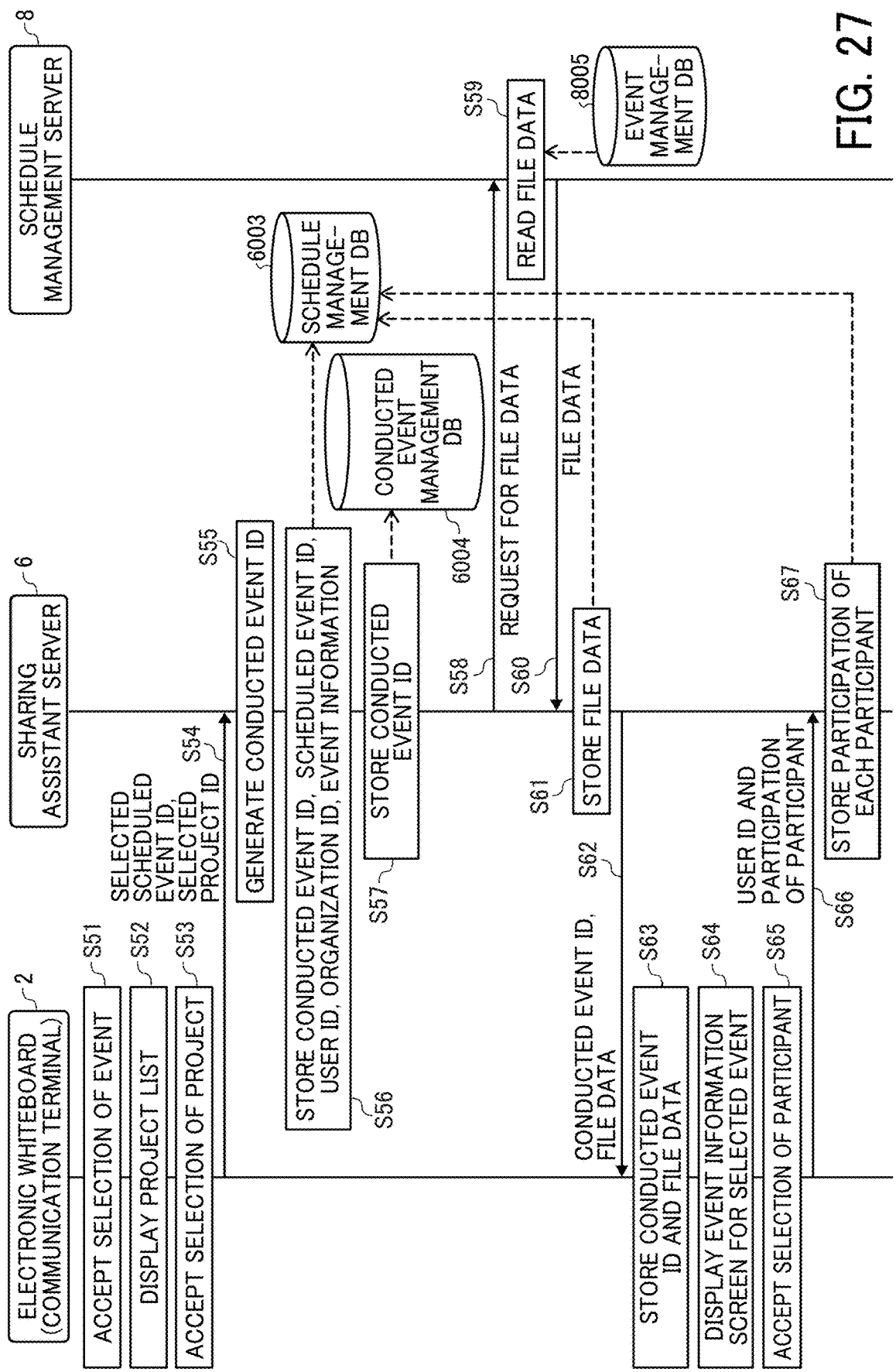
FIG. 27 is a sequence diagram illustrating operation of controlling processing to start an event, according to an embodiment of the present disclosure.
Figure 29:
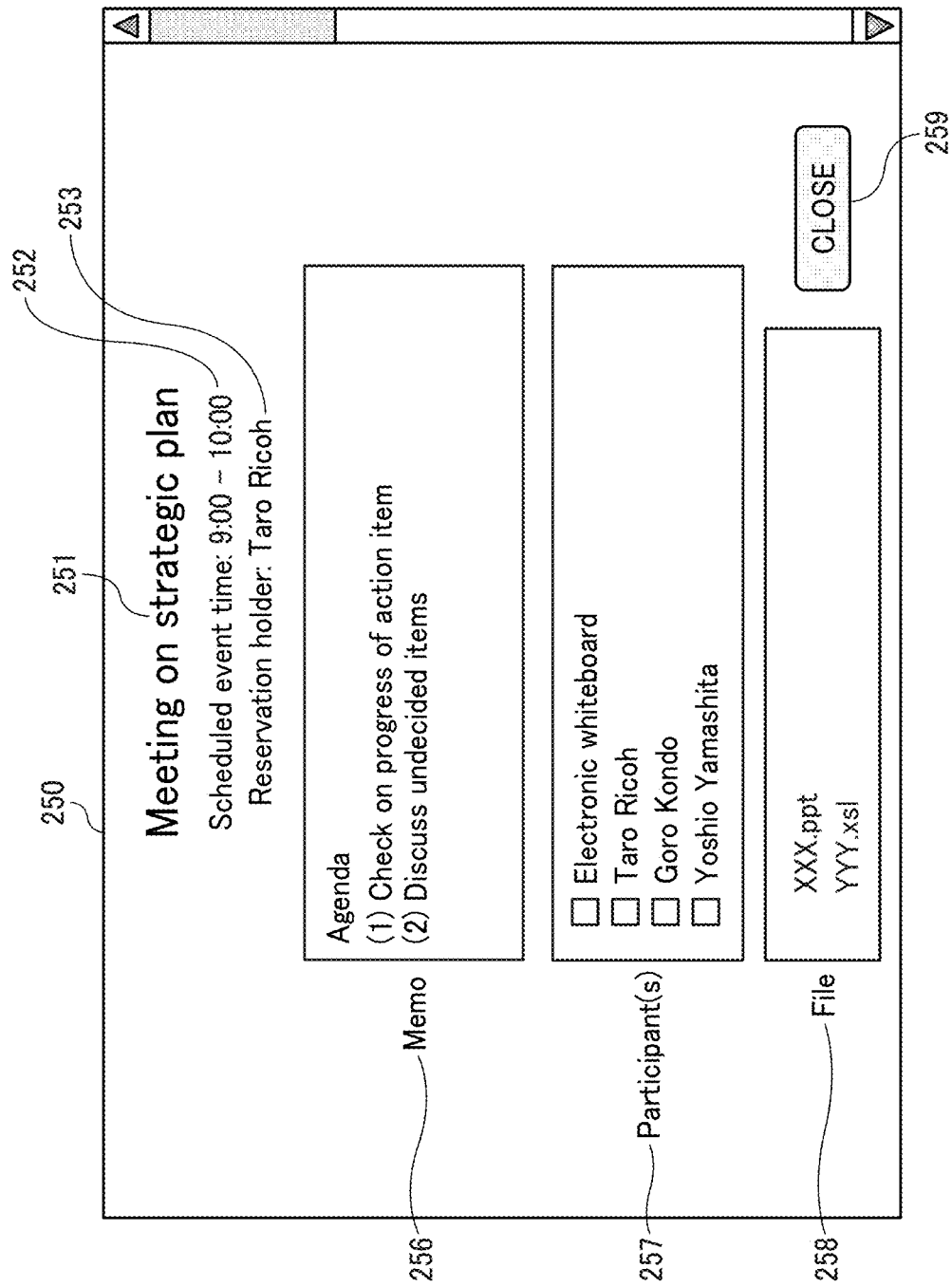
FIG. 29 is an illustration of an example of an event information screen, according to an embodiment of the present disclosure.
Figure 30:
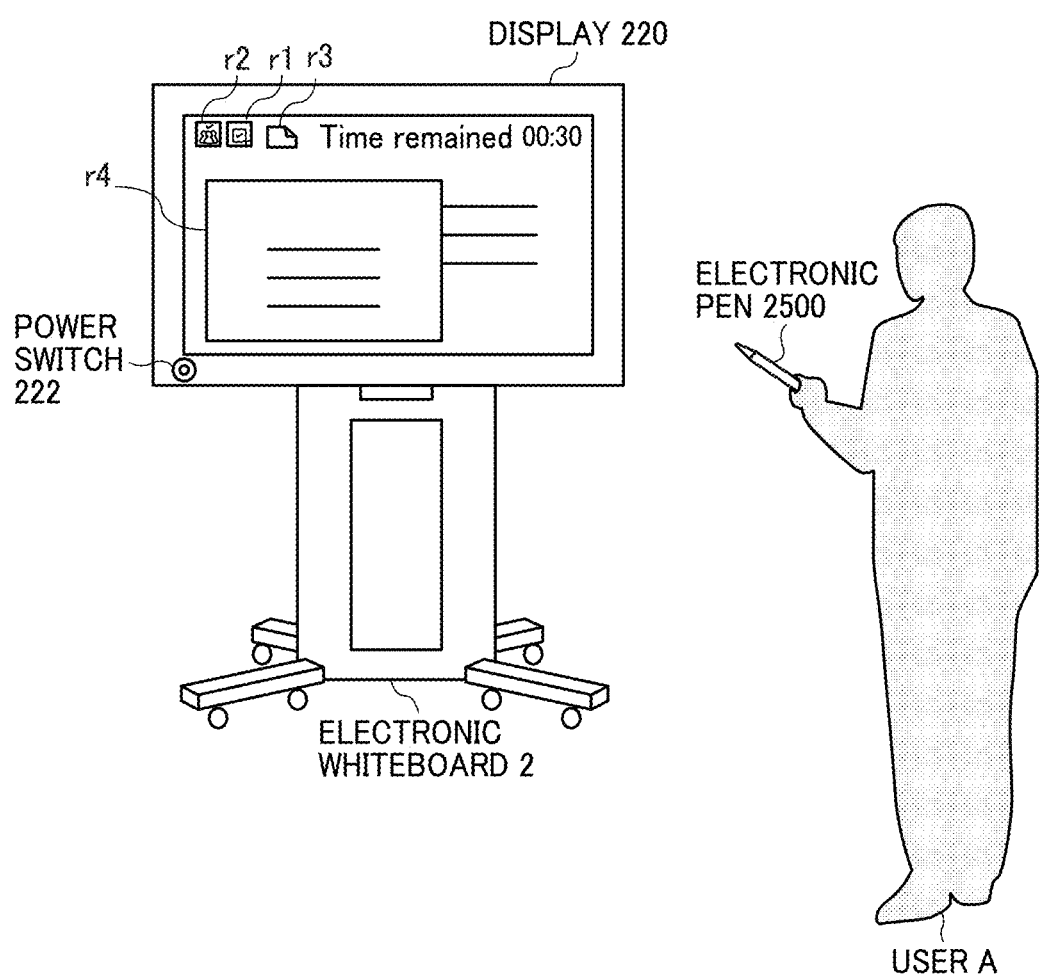
FIG. 30 is an illustration for explaining a use scenario of the electronic whiteboard, according to an embodiment of the present disclosure.

Processing to Start Event:

Referring to FIG. 24 to FIG. 30, operation of conducting a meeting with meeting participants using the electronic whiteboard 2, in the conference room X that has been reserved by the user A (Taroh Ricoh), is described according to an embodiment. FIG. 24 and FIG. 27 are sequence diagrams illustrating a processing to start an event, such as a meeting, according to the embodiment. FIG. 25 is an illustration of an example of a sign-in screen, displayed by the electronic whiteboard 2. FIG. 26 is an illustration of an example of a resource reservation list screen. FIG. 28 is an illustration of an example of a project list screen. FIG. 29 is an illustration of an example of an event information screen. FIG. 30 is an illustration for explaining a use scenario of the electronic whiteboard 2 by a user, according to the embodiment.

As the power switch 222 of the electronic whiteboard 2 is turned on by the user, the acceptance unit 22 of the electronic whiteboard 2 accepts a turn-on operation by the user (S31). In response to accepting the turn-on operation by the acceptance unit 22, the Launcher 102 illustrated in FIG. 7 is activated. The display control unit 24 of the electronic whiteboard 2 controls the display 220 to display a sign-in screen 110 as illustrated in FIG. 25 (S32). The sign-in screen 110 includes a selection icon 111, a selection icon 113, and a power-on icon 115. In this example, the selection icon 111 is pressed by the user A to request for sign-in using the IC card of the user A. The selection icon 113 is pressed by the user A to request for sign-in using an email address and a password of the user A. The power-on icon 115 is pressed to turn off the electronic whiteboard 2, without performing sign-in operation.

In response to pressing of the selection icon 111 or the selection icon 113, the acceptance unit 22 accepts a request for sign-in (S33). In one example, the user A presses the selection icon 111, and brings his or her IC card into close contact with the short-range communication circuit 219 (such as an IC card reader). In another example, the user A presses the selection icon 113, and enters the email address and password of the user A. The transmission/reception unit 21 of the electronic whiteboard 2 transmits sign-in request information indicating a sign-in request to the sharing assistant server 6 (S34). The sign-in request information includes information on a time zone of a country or a region where the electronic whiteboard 2 is located, and the user ID, organization ID, and password of the user using the electronic whiteboard 2, which is one example of the communication terminal. Accordingly, the transmission/reception unit 61 of the sharing assistant server 6 receives the sign-in request information.

Next, the authentication unit 62 of the sharing assistant server 6 authenticates the user A using the user ID, the organization ID, and the password (S35). Specifically, using a set of the user ID, the organization ID and the password received at S35 as a search key, the storing/reading processing unit 69 searches the user authentication management DB 6001 (FIG. 11A) for a set of the user ID, the organization ID and the password corresponding to the received set of the user ID, the organization ID and the password. When there is the set of the user ID, the organization ID, and the password in the user authentication management DB 6001, the authentication unit 62 determines that the user A who has sent the sign-in request is an authorized (legitimate) user. When there is no such set of the user ID, the organization ID, and the password in the user authentication management DB 6001, the authentication unit 62 determines that the user A is an unauthorized (illegitimate) user. When the authentication unit 62 determines that the user A is illegitimate, the transmission/reception unit 61 sends to the electronic whiteboard 2 a notification indicating the illegitimate user. In the following, it is assumed that the user A is identified as an authorized user.

Next, the storing/reading processing unit 69 of the sharing assistant server 6 searches the access management DB 6002

(FIG. 11B) using the organization ID received at S34 as a search key to obtain the access ID and access password that correspond to the received organization ID (S36).

The transmission/reception unit 61 of the sharing assistant server 6 transmits, to the schedule management server 8, reservation request information indicating a request for reservation information of a resource, and schedule request information indicating a request for schedule information of a user (S37). The reservation request information and the schedule request information each include the time zone information, and the user ID and organization ID of a user of the communication terminal received at S34. The reservation request information and the schedule request information each further includes the access ID and the password that are read at S36. Accordingly, the transmission/reception unit 81 of the schedule management server 8 receives the reservation request information and the schedule request information.

Next, the authentication unit 82 of the schedule management server 8 authenticates the sharing assistant server 6 using the access ID and the access password (S38). Specifically, the storing/reading processing unit 89 searches the server authentication management DB 8006 (FIG. 15A) using a set of the access ID and the password received at S37 as a search key, to determine whether the same set of the access ID and the password have been registered. When there is the set of the access ID and the password in the server authentication management DB 8006, the authentication unit 82 determines that the sharing assistant server 6 that has sent the request is an authorized entity. When there is no such set of the access ID and the password in the server authentication management DB 8006, the authentication unit 82 determines that the sharing assistant server 6 that has sent the request is an unauthorized (illegitimate) entity. When the authentication unit 82 determines that the sharing assistant server 6 is illegitimate, the transmission/reception unit 81 sends to the sharing assistant server 6 a notification indicating the illegitimate entity. In the following, it is assumed that the sharing assistant server 6 is identified as an authorized entity.

The storing/reading processing unit 89 of the schedule management server 8 searches information stored in the resource reservation management DB 8004 (FIG. 14A) managed by the above specified scheduler, using the user ID of the user of the communication terminal received at S37 as a search key, to read the reservation information having the user ID in its record (S39). In this case, the storing/reading processing unit 89 reads the reservation information whose scheduled use start date/time is today.

Further, the storing/reading processing unit 89 of the schedule management server 8 searches the event management DB 8005 (FIG. 14B), which is specified in the above, using the user ID of the user of the communication terminal received at S37 as a search key, to read schedule information having the user ID in its record (S40). In this case, the storing/reading processing unit 89 reads the schedule information whose scheduled start date and time of the event is today. When the schedule management server 8 is located in a country or region having a time zone that differs from a time zone applied to the communication terminal such as the electronic whiteboard 2, the electronic whiteboard 2 adjusts the time zone according to a local time zone applicable to a place where the communication terminal is provided.

Next, the storing/reading processing unit 89 searches the project member management DB 8007 (FIG. 15B) using the user ID of the user of the communication terminal received at S37, to obtain project IDs and project names of all projects having the user ID of the user of the communication terminal in their records (S41).

The transmission/reception unit 81 transmits, to the sharing assistant server 6, the reservation information obtained at S39, the schedule information obtained at S40, and the project IDs and project names of all projects that are obtained at S41 (S42). Accordingly, the transmission/reception unit 61 of the sharing assistant server 6 receives the reservation information, the schedule information, and the project IDs and project names.

Next, the creation unit 63 of the sharing assistant server 6 generates a reservation list based on the reservation information and the schedule information received at S42 (S43). The transmission/reception unit 61 transmits reservation list information indicating the contents of the reservation list, and the project IDs and project names of all projects, to the electronic whiteboard 2 (S44). Accordingly, the transmission/reception unit 21 of the electronic whiteboard 2 receives the reservation list information, and the project IDs and project names.

Next, the display control unit 24 of the electronic whiteboard 2 controls the display 220 to display a reservation list screen 230 as illustrated in FIG. 26 (S45). The reservation list screen 230 includes a display area 231 for displaying a resource name (in this case, a name of a conference room) and a display area 232 for displaying the current (today's) date and time. The reservation list screen 230 further includes event information 235, 236, 237, etc. each indicating an event in which the target resource (in this case, the conference room X) is used. Each item of event information includes a scheduled start time and a scheduled end time for using the target resource, an event name, and a name of a user who has reserved the target resource. Along with the event information 235, 236, and 237, corresponding start buttons 235s, 236s, and 237s are displayed, each of which is pressed by the user when an event is started.

Referring to FIG. 27, when the user A presses the start button 235s with the electronic pen 2500 or the like, the acceptance unit 22 accepts a selection of the event indicated by the event information 235 (S51). Further, the display control unit 24 of the electronic whiteboard 2 controls the display 220 to display a project list screen 240 as illustrated in FIG. 28, based on the project IDs and project names that are received at S44 (S52). The project list screen 240 includes a plurality of project icons 241 to 246 each representing a particular project indicated by the project ID or project name that is received. The project list screen 240 further includes an "OK" button 248 to be pressed to confirm the selected project icon, and a "CANCEL" button 249 to be pressed to cancel selection of the project icon.

For example, referring to FIG. 28, when the user A presses the project icon 241 with the electronic pen 2500 or the like, the acceptance unit 22 accepts a selection of the project indicated by the project icon 241 (S53). The screen of FIG. 26 and the screen of FIG. 28 may be displayed in various ways, for example, in a predetermined order one by one, or together on the same display screen.

The transmission/reception unit 21 of the electronic whiteboard 2 transmits, to the sharing assistant server 6, a scheduled event ID identifying the scheduled event selected at S51, and a project ID identifying the project selected at S53 (S54). Processing of S54 may be referred to as processing to transmit a request for conducted event identification information. Accordingly, the transmission/reception unit 61 of the sharing assistant server 6 receives the scheduled event ID of the selected event, and the project ID of the selected project.

Next, the generation unit 64 of the sharing assistant server 6 generates a conducted event ID, which can uniquely identify the conducted event (S55). Next, the storing/reading processing unit 69 of the sharing assistant server 6 stores, in the schedule management DB 6003 (FIG. 11C), as a record for the conducted event ID generated at S55 and the scheduled event ID received at S54, the user ID and organization ID of the reservation holder, and other data items related to the event in association (S56). The user ID and organization ID of the reservation holder, and the other data items related to the event, are obtained from the reservation information and/or the schedule information received at S42. At this point, there is no entry in the "participation" field in the schedule management table (FIG. 11C).

Next, the storing/reading processing unit 69 of the sharing assistant server 6 stores, in the conducted event management DB 6004 (FIG. 12A), the project ID received at S54, and the conducted event ID generated at S55, in association (S57).

The transmission/reception unit 61 of the sharing assistant server 6 transmits, to the schedule management server 8, a file data transmission request information indicating a request for transmitting file data that has been registered in the schedule management server 8 (S58). The file data transmission request information includes the scheduled event ID received at S54, the user ID and organization ID of the user of the communication terminal received at S34, and the access ID and access password read at S36. Accordingly, the transmission/reception unit 81 of the schedule management server 8 receives the file data transmission request information.

Next, the storing/reading processing unit 89 of the schedule management server 8 searches the event management DB 8005 (FIG. 14B), using the scheduled event ID received at S58 as a search key, to obtain file data associated with the scheduled event ID (S59). The transmission/reception unit 81 transmits the file data read at S59 to the sharing assistant server 6 (S60). Accordingly, the transmission/reception unit 61 of the sharing assistant server 6 receives the file data.

Next, the storing/reading processing unit 69 of the sharing assistant server 6 stores, in the schedule management DB 6003, the file data received at S60, in association with the scheduled event ID received at S54 and the conducted event ID generated at S55 (S61).

The transmission/reception unit 61 transmits the conducted event ID generated at S55 and the file data received at S60, to the electronic whiteboard 2 (S62). Accordingly, the transmission/reception unit 21 of the electronic whiteboard 2 receives the conducted event ID and the file data.

Next, at the electronic whiteboard 2, the storing/reading processing unit 29 stores the conducted event ID and the file data in the storage unit 2000 (S63). The file data transmitted from the sharing assistant server 6 is stored in a specific storage area of the storage unit 2000. The electronic whiteboard 2 accesses the specific storage area to read the file data, and the display control unit 24 controls the display 220 to display an image based on the file data during the event being conducted.

Next, the display control unit 24 controls the display 220 to display an event information screen 250 for the selected event as illustrated in FIG. 29 (S64). The event information screen 250 includes a display area 251 for an event name, a display area 252 for a scheduled event time (scheduled start time and scheduled event time), and a display area 253 for a reservation holder name. The event information screen 250 further includes a display area 256 for memo, a display area 257 for names of registered participants, and a display area 258 for displaying identification information (such as a file name) of file data stored in the specific storage area in the storage unit 2000. The display area 257 displays the name of the reservation holder, and the name of each participant, which are entered through the screen of FIG. 23. The display area 257 further includes a check box to be marked to indicate whether the corresponding participant actually participate in the event (meeting). The display area 258 further displays a name of file data stored in the specific storage area of the storage unit 2000. Specifically, the display area 258 displays a file name of file data that has been downloaded from the sharing assistant server 6 and/or being downloaded from the sharing assistant server 6. The event information screen 250 further includes a "CLOSE" button 259 to be pressed to close the event information screen 250, at its lower right.

After each participant is checked for presence (participation) using the checkbox, and the "CLOSE" button 259 is selected by the user, the acceptance unit 22 accepts a selection of each participant (S65). The transmission/reception unit 21 of the electronic whiteboard 2 transmits, to the sharing assistant server 6, the user ID of each participant and participation (presence) of each participant (S66). Accordingly, the transmission/reception unit 61 of the sharing assistant server 6 receives the user ID and participation of each participant.

At the sharing assistant server 6, the storing/reading processing unit 69 enters information on participation, in the "participation" field, in which no information was entered, in the schedule management table (FIG. 11C) in the schedule management DB 6003 (S67).

Thus, the user A starts an event (a meeting on a strategy) using the resource (the conference room X) and the communication terminal (the electronic whiteboard 2 located in the conference room X). Specifically, as illustrated in FIG. 30, the user A uses the electronic whiteboard 2 to carry out a meeting in the conference room X. The display control unit 24 displays, at an upper right portion of the display 220, the remaining time during which the resource can be used. In this embodiment, the display control unit 24 calculates a time period between the current time and the scheduled end time indicated by the event information of the event selected at S51, and displays the calculated time period as the remaining time.

The display control unit 24 further displays, on the display 220, an icon r1 to be pressed to register an action item, an icon r2 to be pressed to view an event record, and an icon r3 to be pressed to view a document file (meeting materials) stored in the specific storage area of the storage unit 2000. The display control unit 24 further displays, in the on-going event screen R, an image r4 based on the file data of meeting materials. The icon r3 is an example of a selectable image, which is selected to display an image based on the file data stored in the specific storage area. For example, when the user of the electronic whiteboard 2 presses the icon r3, the acceptance unit 22 receives a selection of the icon r3. The display control unit 24 then controls the display 220 to display the image r4 based on the file data of meeting materials, which is stored in the specific storage area of the storage unit 2000.

Figure 31:
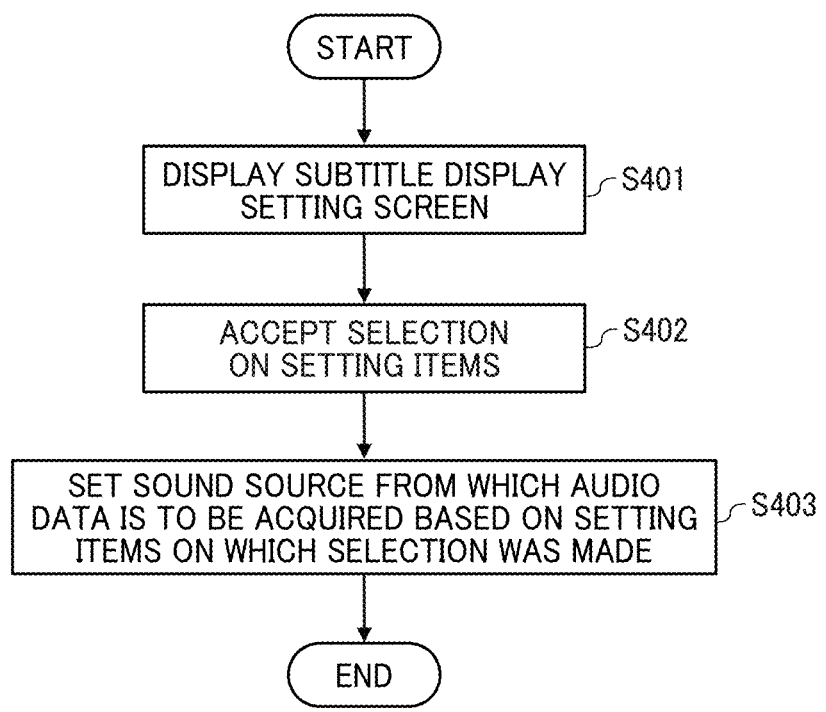
FIG. 31 is a flowchart illustrating operation of configuring settings of a subtitle display to be displayed on an on-going-event screen, according to an embodiment of the present disclosure.

Processing to Display On-Going-Event Screen:

Referring to FIG. 31 to FIG. 40, a description is given of operation of displaying an on-going-event screen displayed during an event, which is started by the event start processing described above. FIG. 31 is a flowchart illustrating operation of configuring settings of a subtitle display to be displayed on the on-going-event screen. In another example, the operation illustrated in FIG. 31 is performed in the middle of the event start processing described above referring to FIG. 24 and FIG. 27.

Figure 32:
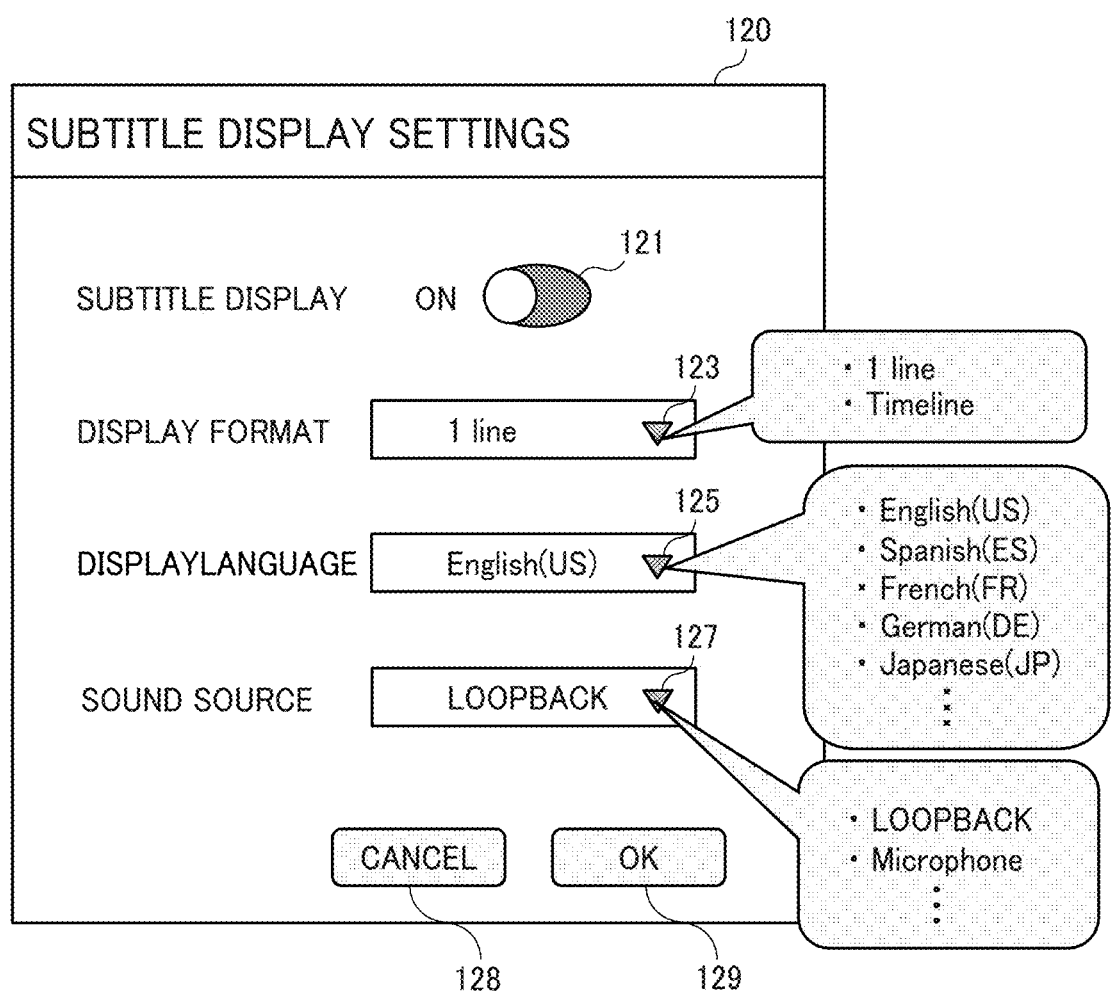
FIG. 32 is an illustration of an example of a subtitle display setting screen displayed on the electronic whiteboard at the start of an event, according to an embodiment of the present disclosure.

First, at S401, when an event is started by the event start processing, the display control unit 24 controls the display 220 to display a subtitle display setting screen 120 as illustrated in FIG. 32. FIG. 32 is an illustration of an example of the subtitle display setting screen 120 displayed on the electronic whiteboard 2 at the start of an event. The subtitle display setting screen 120 illustrated in FIG. 32 is a screen for receiving an input for configuring settings for displaying text data converted from audio data relating to content generated by an event being conducted on the on-going-event screen 170 described later. The subtitle display setting screen 120 includes a subtitle display switching button 121, a display format selection button 123, a display language selection button 125, a sound source selection button 127, a "CANCEL" button 128, and an "OK" button 129. The subtitle display switching button 121 is a button to pressed to switch whether to display text on the on-going-event screen 170. In other word, the subtitle display switching button is a button to set the presence of text based on text data. The display format selection button 123 is a button to be pressed to select the display format of text (subtitle). The display language selection button 125 is a button to be pressed to select a language in which text is to be displayed. The sound source selection button 127 is a button to be pressed to select a desired sound source from which audio data is to be obtained. The audio data obtained from the selected sound source is converted to text data. The "CANCEL" button 128 is a button to be pressed to cancel the configured settings for subtitle display. The "OK" button 129 is a button to be pressed to confirm the configured settings for subtitle display.

Examples of items selectable by the display format selection button 123 include a line-by-line display format ("1 line") and a timeline display format ("Timeline"). When the line-by-line display format ("1 line") is selected, text (subtitles) is displayed line by line based on text data. When the timeline display format ("Timeline") is selected, text (subtitles) is displayed in a chronological order. Example of items selectable by the display language selection button 125 include "English (US)", "Spanish (ES)", "French (FR)", "German (DE)", and "Japanese (JP)". Further, example of items selectable by the sound source selection button 127 include "LOOPBACK" and "Microphone". When "LOOPBACK" is selected, text (subtitles) is displayed based on text data converted from audio data representing sound that is to be output from the speaker 2300, which is an example of a sound output device. When "Microphone" is selected, text (subtitles) is displayed based on text data converted from audio data representing sound that is collected by the microphone 2200, which is an example of a sound collecting device.

In the embodiment, "Microphone" is an example of a first mode in which audio data generated based sound collected by the microphone 2200, which is an example of a sound collecting device, is converted into text data. "LOOPBACK" is an example of a second mode in which audio data generated based on sound that is to be output from the speaker 2300, which is an example of a sound output device, is converted into text data. Examples of the sound that is to be output from the speaker 2300, which is an example of a sound output device, include sound data collected and transmitted by another communication terminal that communicates with the electronic whiteboard 2 used in the event being conducted. For example, when a user wants to the electronic whiteboard 2 to display text based on voice text data according to voice of a participant participating in the event at the site where the electronic whiteboard 2 is provided, the user selects "Microphone". On the other hand, for example, when a user wants to the electronic whiteboard 2 to display text based on voice text data according to voice of a participant participating in the event at a remote site where another communication terminal that communicates with the electronic whiteboard 2 is provided, the user selects "LOOPBACK". Each item described above as being selectable by each selection button on the subtitle display setting screen 120 is just an example. In another example, any other suitable items are selectable.

Next, at S402, when the user selects desired setting items using the selection buttons included in the subtitle display setting screen 120, the acceptance unit 22 accepts selection of the setting items included in the subtitle display setting screen 120. Specifically, in the example of FIG. 32, the acceptance unit 22 accepts selection of the subtitle display "ON", the display format "1 line", the display language "English (US)", and the sound source "LOOPBACK".

At S403, the setting unit 27 sets a target sound source from which audio data to be converted to text data is to be acquired, based on the setting item of which selection is accepted by the acceptance unit 22. In the example of FIG. 32, since the acceptance unit 22 accepts the selection of "LOOPBACK", the setting unit 27 sets the speaker 2300 or the loopback device 2350 as the target sound source.

With the processes described heretofore referring to FIG. 31 and FIG. 32, the electronic whiteboard 2 configures settings for displaying text to be displayed on the on-going-event screen 170 at the start of an event. In another example, the electronic whiteboard 2 adopts setting items that are configured in advance at the start of an event.

Figure 33:
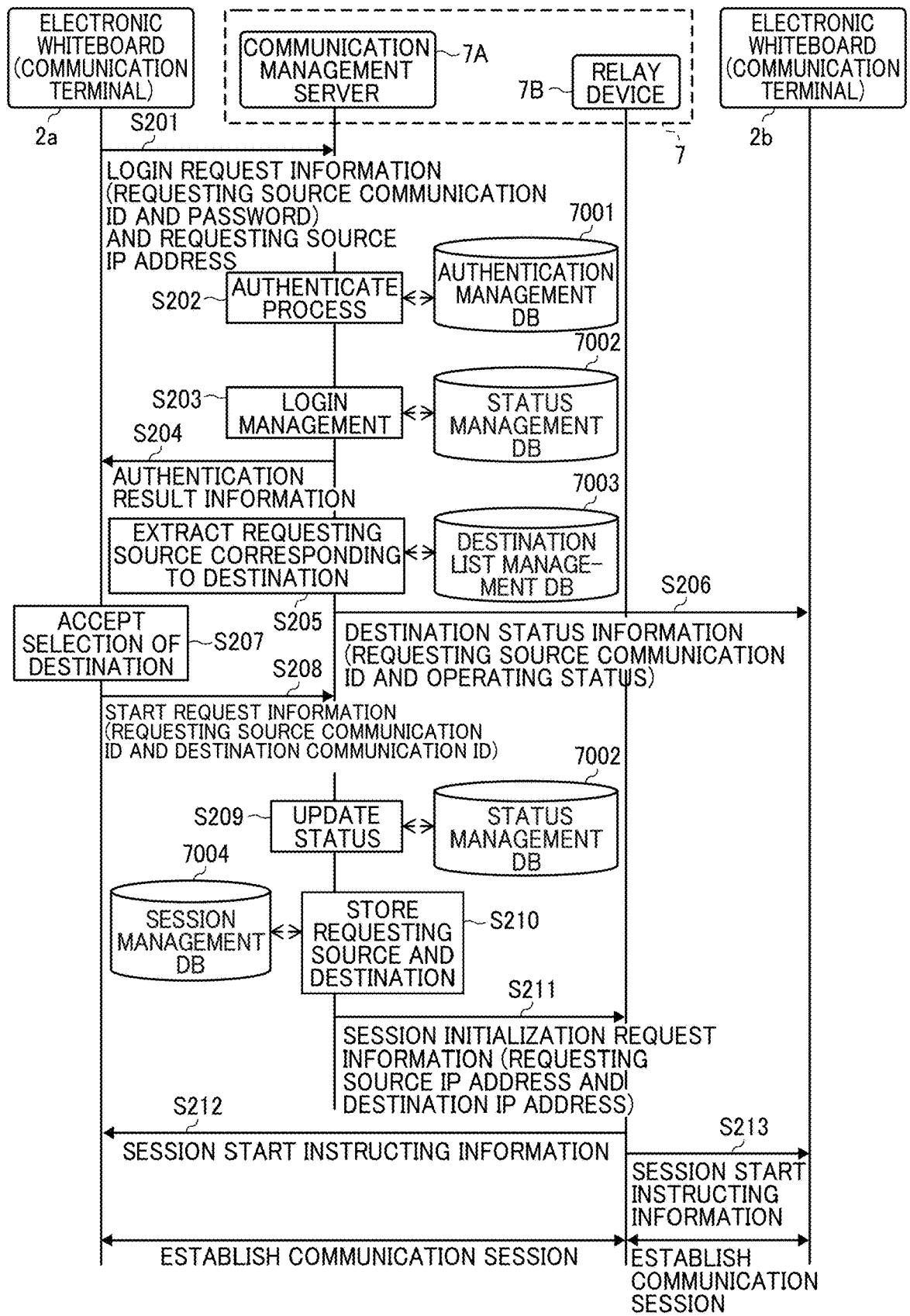
FIG. 33 is a sequence diagram illustrating operation of preparing for starting communication between the communication terminals and establishing a session, according to an embodiment of the present disclosure.

Referring to FIG. 33, operation of conducting an event such as a remote conference using the electronic whiteboard 2 that communicates with another communication terminal. FIG. 33 is a sequence diagram illustrating operation of preparing for starting communication between the communication terminals and establishing a session. Specifically, referring to FIG. 33, an example is described in which the electronic whiteboard 2a that has performed the above-described event start processing sends a communication start request to the electronic whiteboard 2b, which is an example of another communication terminal.

First, at S201, in response to an instruction input by a user, the transmission/reception unit 21a of the electronic whiteboard 2a transmits login request information indicating a login request to the communication management server 7A via the communication network 10. This login request information includes a terminal ID identifying the electronic whiteboard 2a, which is a login request source terminal, and a password. The terminal ID and the password are data that have been read via the storing/reading processing unit 29a from the storage unit 2000a and sent to the transmission/reception unit 21a. When the login request information is transmitted from the request source terminal (electronic whiteboard 2a) to the communication management server 7A, the communication management server 7A on the receiving side recognizes the IP address of the electronic whiteboard 2a on the transmitting side. In another example, a user enters the terminal ID and the password to the request source terminal. In still another example, the login request is transmitted in response to the turn on of the power, instead of the instruction input by the user as described above.

At S202, the authentication unit 72A of the communication management server 7A searches the authentication management DB 7001A (FIG. 18A) using the terminal ID and the password included in the login request information received by the transmission/reception unit 71A as search keys. The authentication unit 72A determines whether the authentication management DB 7001A stores a terminal ID and a password identical to the terminal ID and the password included in the login request information, to perform an authentication process of the electronic whiteboard 2a. Specifically, when such identical terminal ID and password are stored in the authentication management DB 7001A, the authentication unit 72A determines that the login request is sent from an authorized (legitimate) communication terminal. Thus, the authentication unit 72A authenticates the electronic whiteboard 2a.

When the authentication unit 72A determines that the identical terminal ID and password are stored in the authentication management DB 7001A, the storing/reading processing unit 79A stores, in the status management DB 7002A (FIG. 18B), for each record indicated by the terminal ID of the electronic whiteboard 2a, terminal type, and destination name, an operating status, a reception date/time at which the login request information is received, and the IP address of the electronic whiteboard 2a, in association (S203).

At S204, the transmission/reception unit 71A of the communication management server 7A transmits authentication result information indicating an authentication result obtained by the authentication unit 72A to the request source terminal (electronic whiteboard 2a), which has sent the above-mentioned login request, via the communication network 10. The transmission/reception unit 21a of the electronic whiteboard 2a receives the authentication result information. At S205, the storing/reading processing unit 79A of the communication management server 7A further searches the destination list management DB 7003A (FIG. 19A) using the terminal ID "01aa" of the request source terminal (electronic whiteboard 2a), which has sent the login request, as a search key, to extract the terminal ID of another request source terminal that registers the terminal ID "01aa" of the request source terminal (electronic whiteboard 2a) as a communication counterpart candidate. In the embodiment, to simplify the description, an example case is described in which the terminal ID extracted at S205 is a terminal ID "01bb" of the electronic whiteboard 2b.

Next, at S206, the transmission/reception unit 71A of the communication management server 7A transmits, to the electronic whiteboard 2b, terminal status information including the terminal ID "01aa" of the request source terminal (electronic whiteboard 2a) and operating status information indicating the operating status of the request source terminal (electronic whiteboard 2a). The transmission/reception unit 21b of the electronic whiteboard 2b receives the status information of the electronic whiteboard 2a.

Thereafter, the electronic whiteboard 2a sends a request for the destination terminal ID registered in the destination list management DB 7003A (FIG. 19A) of the communication management server 7A, to acquire destination list information (the terminal ID and the destination name) and the operating status of each terminal. The display control unit 24a of the electronic whiteboard 2a controls the display 220 to display a destination list screen that displays a destination terminal list. At S207, when the user selects a desired destination terminal with which communication is to be started from the destination terminal list, the acceptance unit 22 receives a request to start communication with the selected destination terminal (electronic whiteboard 2b).

At S208, the transmission/reception unit 21a of the request source terminal (electronic whiteboard 2a) transmits, to the communication management server 7A, start request information indicating a request to start communication. The start request information includes the terminal ID "01aa" of the request source terminal (electronic whiteboard 2a) and the terminal ID "01bb" of the destination terminal (electronic whiteboard 2b). The transmission/reception unit 71A of the communication management server 7A receives the start request information and the IP address "1.2.1.3" of the request source terminal (electronic whiteboard 2a), which is the transmission source.

At S209, the storing/reading processing unit 79A of the communication management server 7A changes, in the status management DB 7002A (FIG. 18B), the operating status from "Online (ready)" to "Online (busy)" in the operating status field in the record corresponding to the terminal ID "01aa" of the request source terminal (electronic whiteboard 2a) included in the start request information. In substantially the same manner, the storing/reading processing unit 79A changes the operating status from "Online (ready)" to "Online (busy)" in the operating status field in the record corresponding to the terminal ID "01bb" of the destination terminal (electronic whiteboard 2b) included in the start request information. Next, at S210, the storing/reading processing unit 79A stores, in the session management DB 7004A (FIG. 19B), the relay device ID "111a" of the relay device 7B to be used, the terminal ID "01aa" of the request source terminal (electronic whiteboard 2a), and the terminal ID "01bb" of the destination terminal (electronic whiteboard 2b) in association. In this case, as the relay device 7B to be used, a relay device having an IP address close to the IP address of the request source terminal (electronic whiteboard 2a) is selected, for example.

At S211, the transmission/reception unit 71A of the communication management server 7A transmits session initialization request information to the relay device 7B. Accordingly, the relay device 7B receives the session initialization request information. The session initialization request information is an instruction for initializing a communication session of the relay device 7B. The session initialization request information includes the IP address "1.2.1.3" of the request source terminal (electronic whiteboard 2a) and the IP address "1.3.2.3" of the destination terminal (electronic whiteboard 2b). The IP addresses are IP addresses that are respectively associated with the terminal ID of the request source terminal (electronic whiteboard 2a) and the terminal ID of the destination terminal (electronic whiteboard 2b) received at S208 in the status management DB 7002A.

At S212, the transmission/reception unit 71B of the relay device 7B transmits session start instruction information to the request source terminal (electronic whiteboard 2a) based on the IP address "1.2.1.3" of the request source terminal (electronic whiteboard 2a) received at S211. This session start instruction information is an instruction to start a communication session to the request source terminal (electronic whiteboard 2a). The relay device 7B also transmits the IP address "1.2.1.2" of the relay device 7B to the request source terminal (electronic whiteboard 2a).

At S213, the relay device 7B transmits session start instruction information to the destination terminal (electronic whiteboard 2b) based on the IP address "1.3.2.3" of the destination terminal (electronic whiteboard 2b) received at S211. This session start instruction information is an instruction to start a communication session to the destination terminal (electronic whiteboard 2b). The relay device 7B also transmits the IP address "1.2.1.2" of the relay device 7B to the destination terminal (electronic whiteboard 2b).

Thus, a first session sed 1 is established between the request source terminal (electronic whiteboard 2a) and the relay device 7B. Further, a second session sed 2 is established between the destination terminal (electronic whiteboard 2b) and the relay device 7B. Accordingly, communication is started between the request source terminal (electronic whiteboard 2a) and the destination terminal (electronic whiteboard 2b), and thereby a communication screen is displayed on the display 220 of the request source terminal (electronic whiteboard 2a) and the destination terminal (electronic whiteboard 2b).

Through the processes described heretofore with reference to FIG. 33, the electronic whiteboard 2a that starts an event communicates with the electronic whiteboard 2b that is provided in a remote location, and whereby allows a participant who is in the remote place to participate in the event such as a remote conference that is conducted using the electronic whiteboard 2a. The electronic whiteboard 2b provided in the remote place is just an example, and any other suitable communication terminal can be used instead of the electronic whiteboard.

Figure 34:
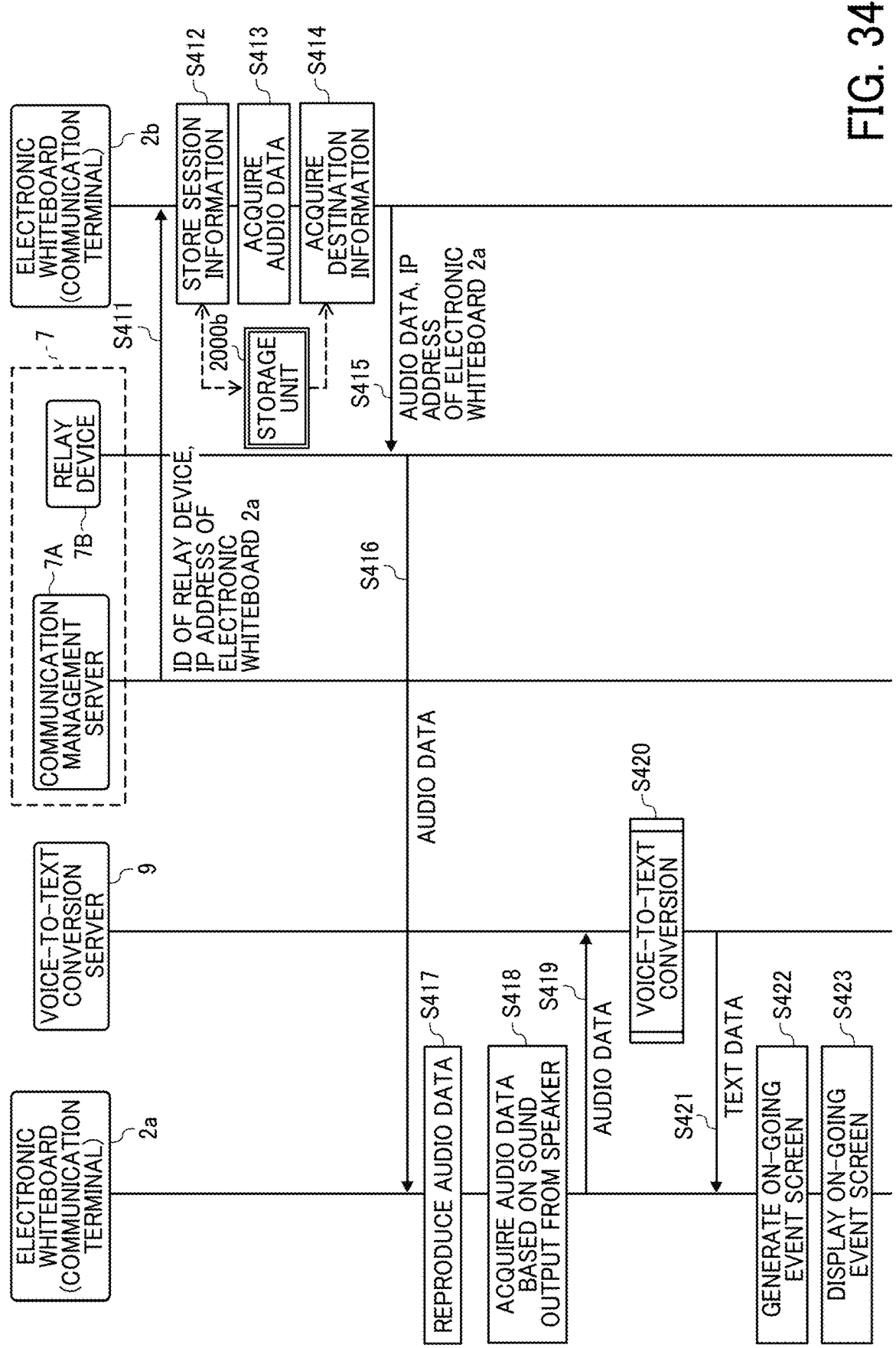
FIG. 34 is a sequence diagram illustrating operation of displaying the on-going-event screen on the electronic whiteboard, according to an embodiment of the present disclosure.
Figure 35:
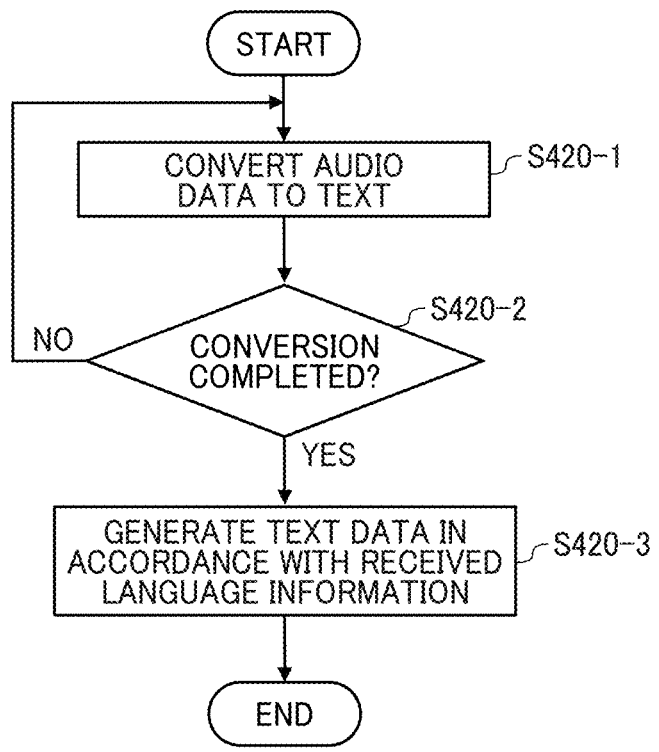
FIG. 35 is a flowchart illustrating operation of converting audio data to text data, according to an embodiment of the present disclosure.
Figure 36:
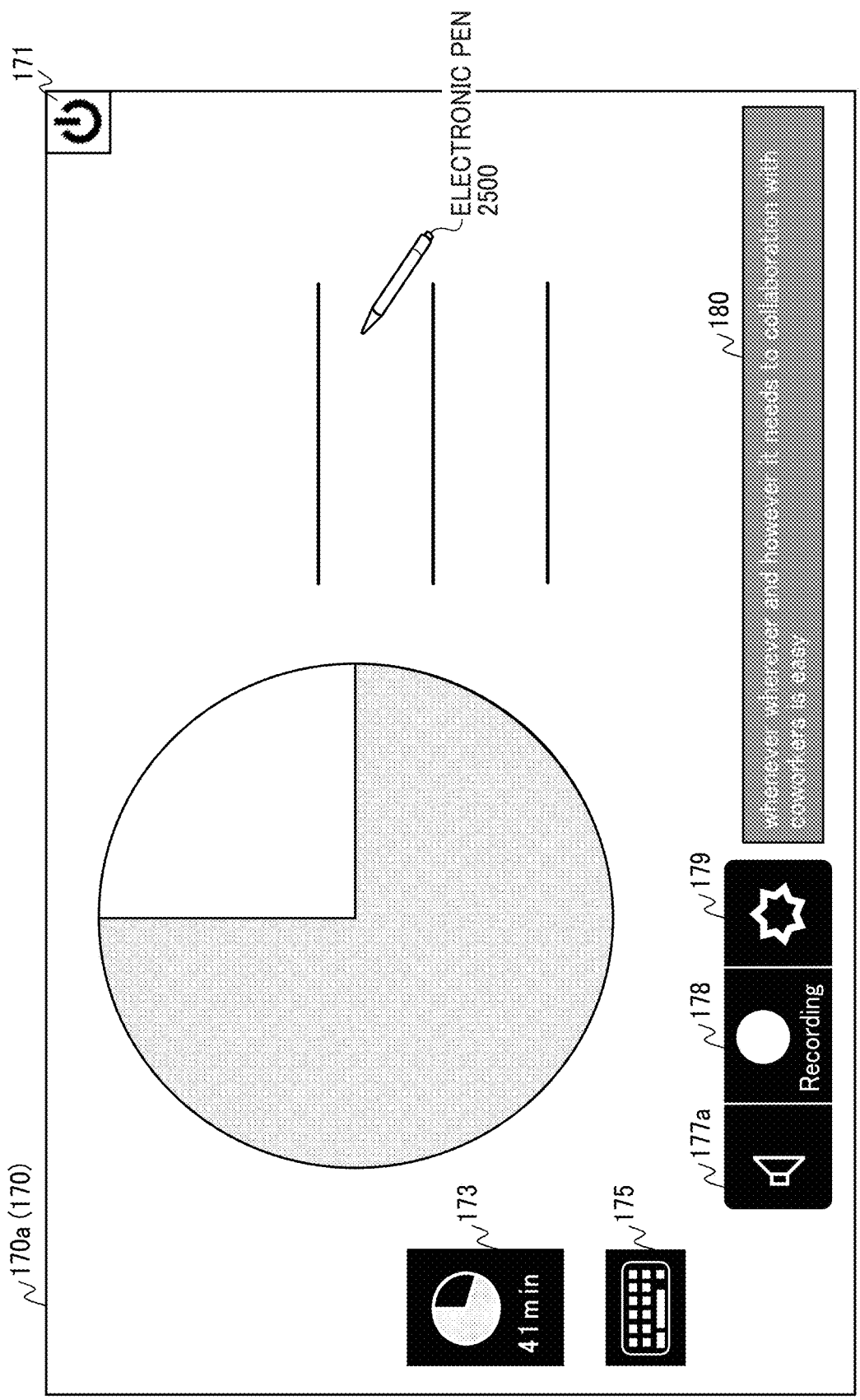
FIG. 36 is an illustration of an example of the on-going-event screen, displayed by the electronic whiteboard, according to an embodiment of the present disclosure.
Figure 37:
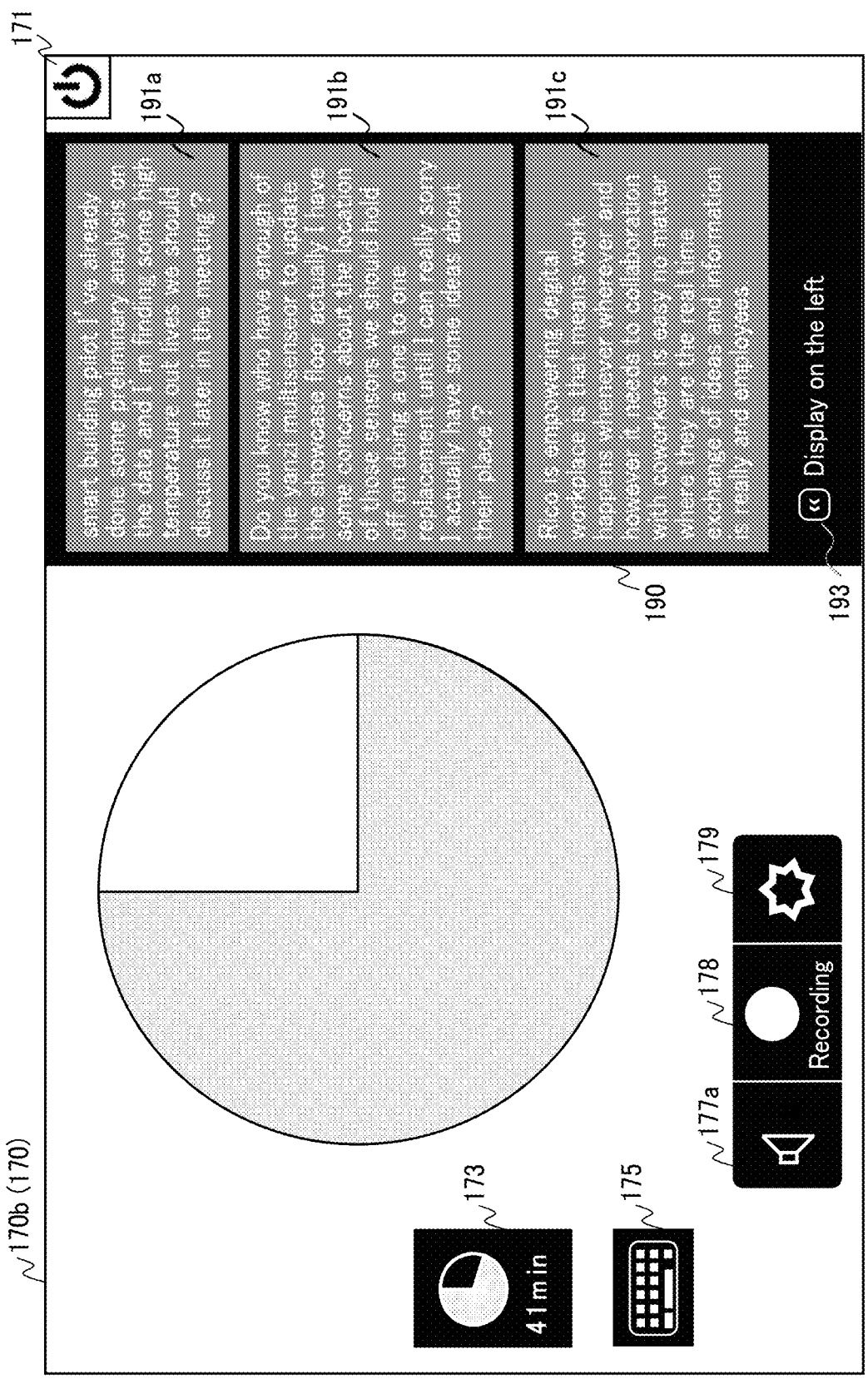
FIG. 37 is an illustration of an example of the on-going-event screen, displayed by the electronic whiteboard, according to an embodiment of the present disclosure.

Next, referring to FIG. 34 to FIG. 40, operation of displaying the on-going-event screen 170 on the electronic whiteboard 2 based on the setting items configured by the operation illustrated in FIG. 31. FIG. 34 is a sequence diagram illustrating operation of displaying the on-going-event screen 170 on the electronic whiteboard 2a. FIG. 36 and FIG. 37 are illustrations of examples of the on-going-event screen 170a and the on-going-event screen 170b displayed on the electronic whiteboard 2. The operation illustrated in FIG. 34 is operation performed in an example case where an event is being conducted through communication between one communication terminal (electronic whiteboard 2a, in this example) and the other communication terminal (electronic whiteboard 2b, in this example) established by the operation illustrated in FIG. 33. Further, the operation illustrated in FIG. 34 is operation performed in an example case where "LOOPBACK" is selected as the sound source on the subtitle display setting screen 120 illustrated in FIG. 32.

First, at S411, when the relay device 7B is determined in the operation illustrated in FIG. 33, the transmission/reception unit 71A of the communication management server 7A transmits the relay device ID "111a" and the IP address "1.2.1.3" of the request source terminal (electronic whiteboard 2a) to the electronic whiteboard 2b. Accordingly, the transmission/reception unit 21b of the electronic whiteboard 2b receives the relay device ID and the IP address of the request source terminal transmitted from the communication management server 7A. At S412, the storing/reading processing unit 29b of the electronic whiteboard 2b stores, in the storage unit 2000b, the relay device ID "111a" and the IP address "1.2.1.3" of the request source terminal (electronic whiteboard 2a), which are received by the transmission/reception unit 21b.

At S413, the audio processing unit 23-2b of the electronic whiteboard 2b converts sound collected by the microphone 2200 into an audio signal, to acquire audio data based on the converted audio signal. The microphone 2200 is an example of a sound collecting device. At S414, the storing/reading processing unit 29b of the electronic whiteboard 2b reads from the storage unit 2000 the relay device ID "111a" and the IP address "1.2.1.2" of the request source terminal (electronic whiteboard 2a), which is a destination.

At S415, the transmission/reception unit 21b of the electronic whiteboard 2b transmits the audio data acquired at S413 and the IP address of the request source terminal (electronic whiteboard 2a) to the relay device 7B identified by the relay device ID "111a" that is read out at S414. Accordingly, the transmission/reception unit 71B of the relay device 7B receives the audio data and the IP address of the electronic whiteboard 2a, which are transmitted from the electronic whiteboard 2b.

At step S416, the transmission/reception unit 71B of the relay device 7B transmits the received audio data to the electronic whiteboard 2a. Accordingly, the transmission/reception unit 21a of the electronic whiteboard 2a receives the audio data that is acquired by the electronic whiteboard 2b and transmitted via the relay device 7B.

At S417, the audio processing unit 23-2a of the electronic whiteboard 2a converts the audio data received by the transmission/reception unit 21a into an audio signal, and outputs sound based on the converted audio signal to the speaker 2300, which is an example of a sound output device, to reproduce sound based on the audio data.

At S418, the audio processing unit 23-2a acquires audio data based on the sound to be output from the speaker 2300, which is an example of a sound output device. Specifically, the audio processing unit 23-2a acquires an audio signal related to the sound to be output from the speaker 2300 by loopback processing using the loopback device 2350, whereby acquires audio data based on the acquired audio signal.

At S419, the transmission/reception unit 21a of the electronic whiteboard 2a transmits the audio data acquired by the audio processing unit 23-2a and the language information indicating the display language selected at step S402 to the voice-to-text conversion server 9. Accordingly, the transmission/reception unit 91 of the voice-to-text conversion server 9 receives the audio data and the language information.

At S420, the conversion unit 93 of the voice-to-text conversion server 9 converts the audio data received by the transmission/reception unit 91 to text data. Referring to FIG. 35, processing of voice-to-text conversion, performed by the voice-to-text conversion server 9, is described, according to an embodiment. FIG. 35 is a flowchart illustrating operation of converting audio data to text data, according to an embodiment.

First, the conversion unit 93 converts the audio data, which is received by the transmission/reception unit 91, to text data (S420-1). When the conversion of the audio data to text data by the conversion unit 93 is completed ("YES" at S420-2), the operation proceeds to S433. By contrast, when the conversion of the audio data to text data is not completed ("NO" at S420-2), the conversion unit 93 repeats the process of S420-2 until the conversion is completed. Then, the conversion unit 93 generates text data according to the language information received at S419 (step S420-3). Thus, the voice-to-text conversion server 9 converts the audio data transmitted from the electronic whiteboard 2a into text data. The voice-to-text conversion server 9 repeatedly performs operation of FIG. 35, every time audio data is received from the electronic whiteboard 2a.

Referring again to FIG. 34, description of operation to display the on-going-event screen continues. At S421, the transmission/reception unit 91 of the voice-to-text conversion server 9 transmits the text data generated by the conversion unit 93 to the electronic whiteboard 2a. At S422, the image processing unit 23-1a of the electronic whiteboard 2a generates data of the on-going-event screen 170 using the text data received at S421 and the setting items selected at step S402. At S423, the display control unit 24a of the electronic whiteboard 2a controls the display 220 to display the on-going-event screen 170 based on the data generated by the image processing unit 23-1a.

Referring to FIG. 36, the on-going-event screen 170a displayed on the display 220 of the electronic whiteboard 2a by the operation of FIG. 34 is described. FIG. 36 illustrates an example of the on-going-event screen 170a, which is displayed when the subtitle display "ON", the display format "1 line", the display language "English (US)", and the sound source "LOOPBACK" are selected on the subtitle display setting screen 120. The on-going-event screen 170a includes an end button 171, time information 173, an input button 175, recording information 178, and a subtitle display setting button 179. The end button 171 is a button to pressed to end an event being conducted. The time information 173 indicates an elapsed time from the start of the event or the remaining time until the end of the event. The input button 175 is a button to be pressed to display on the display 220 an input component such as a software keyboard, through which characters, numerical values, various instructions, and the like are input. The recording information 178 indicates that audio data generated by the event being conducted is being recorded. The subtitle display setting button 179 is a button to be pressed to configure subtitle display settings. The above descriptions of the end button 171, the time information 173, the input button 175, the recording information 178, and the subtitle display setting button 179 apply to different on-going-event screens 170 described below. When the acceptance unit 22 accepts a selection of the subtitle display setting button 179 in response to pressing of the subtitle display setting button 179 by a user, the display control unit 24 displays the subtitle display setting screen 120 illustrated in FIG. 32. The electronic whiteboard 2 can change the subtitle display settings even during the event by using the subtitle display setting screen 120 that is displayed in response to the selection of the subtitle display setting button 179.

The on-going-event screen 170a further includes sound source information 177a indicating a target sound source from which audio data to be converted to text data is acquired, and a text data display area 180 in which text data is displayed. In the example of FIG. 36, the sound source information 177a includes an image representing a speaker, which indicates that "LOOPBACK" is selected as the target sound source on the subtitle display setting screen 120. In addition, text is displayed in the text data display area 180 line by line or any other suitable form. For example, as illustrated in FIG. 36, one sentence of the text can be displayed in the text data display area 180.

As described heretofore, on the on-going-event screen 170a illustrated in FIG. 36, text is displayed in the text data display area 180 based on the text data that is converted from the audio data corresponding to the sound to be output from the speaker 2300, according to the setting items selected on the subtitle display setting screen 120. In other words, voice of a participant who participates in the event at a remote site is displayed in text (subtitles) on the on-going-event screen 170a. This helps conducting an event through communication with another communication terminal provided in a remote location, for example. Further, the text (subtitles) is displayed in a language corresponding to the display language selected on the subtitle display setting screen 120. In other words, the electronic whiteboard 2a displays text that is translated (converted) into a language suitable for the participant(s) participating in the event at the site where the electronic whiteboard 2a is located.

Referring to FIG. 37, another example of the on-going-event screen 170 is described. FIG. 37 illustrates an example of the on-going-event screen 170b, which is displayed when the subtitle display "ON", the display format "Timeline", the display language "English (US)", and the sound source "LOOPBACK" are selected on the subtitle display setting screen 120. Different from the on-going-event screen 170a illustrated in FIG. 36, the on-going-event screen 170b of FIG. 37 includes a text data display area 190 in which text is displayed in a timeline format (in a chronological order). In the text data display area 190, text data 191a, text data 191b and text data 191c are displayed in a chronological order from the top to the bottom. The text data display area 190 further includes a switch button 193 to be pressed to switch the display position of the text data display area 190.

As illustrated in FIG. 36 and FIG. 37, text is displayed on the on-going-event screen 170 in different formats according to the items that are set through the subtitle setting operation, even when the text is based on text data converted from audio data acquired from the same target sound source. For example, when the user wants to understand the details of remarks made by a participant in a remote place, the user configures settings based on which the on-going-event screen 170b as illustrated in FIG. 37 is displayed, such that the electronic whiteboard 2 displays text data including past remarks in a chronological order. This prevents the user of the electronic whiteboard 2a (participant in the event) from missing what the other participant in the remote place speaks. On the other hand, for example, when the user wants to preferentially check the content of a document image (presentation material) generated during the event, the user configures settings based on which the on-going-event screen 170a as illustrated in FIG. 36 is displayed, such that the electronic whiteboard 2a displays minimum information.

Figure 38:
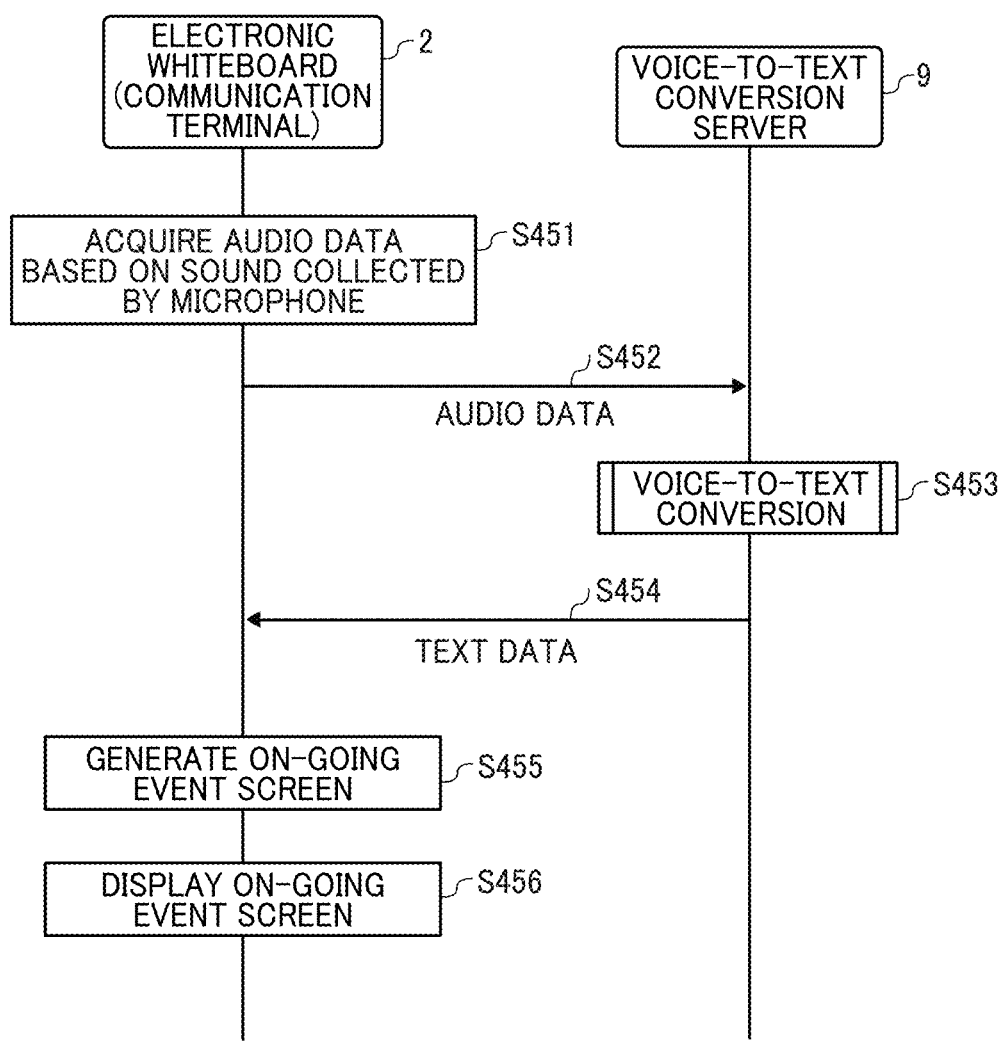
FIG. 38 is a sequence diagram illustrating operation of displaying the on-going-event screen by the electronic whiteboard, according to an embodiment of the present disclosure.
Figure 39:
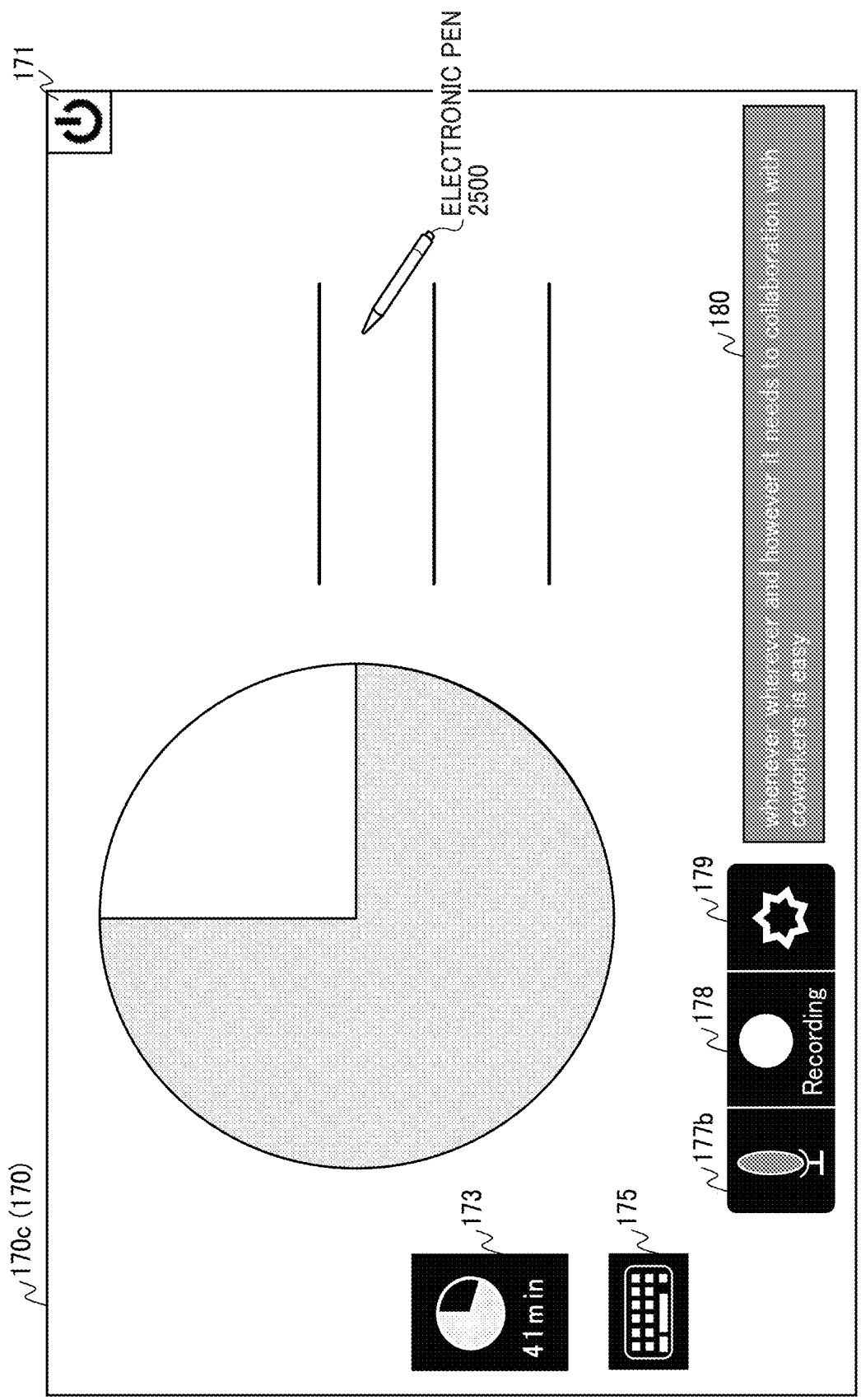
FIG. 39 is an illustration of an example of the on-going-event screen, displayed by the electronic whiteboard, according to an embodiment of the present disclosure.
Figure 40:
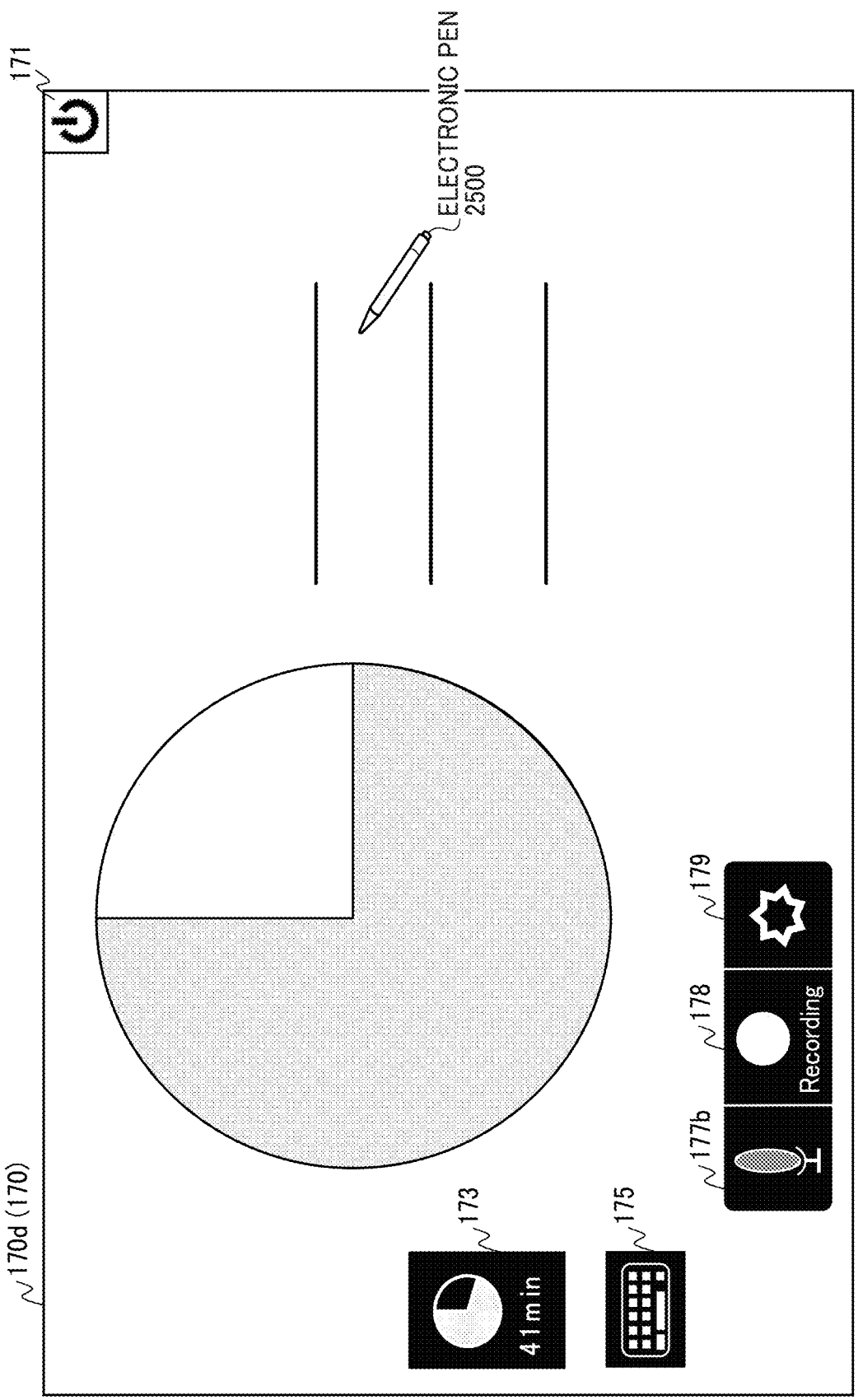
FIG. 40 is an illustration of an example of the on-going-event screen, displayed by the electronic whiteboard, according to an embodiment of the present disclosure.

Next, referring to FIG. 38 to FIG. 40, an example case in which text is displayed based on text data that is converted from audio data according to sound collected by the microphone 2200, which is an example of a sound collecting device, on the on-going-event screen 170. FIG. 38 is a sequence diagram illustrating operation of displaying the on-going-event screen 170 on the electronic whiteboard 2. FIG. 39 and FIG. 40 are illustrations of examples of the on-going-event screen 170c and the on-going-event screen 170d displayed on the electronic whiteboard 2. Specifically, the operation illustrated in FIG. 38 is operation performed in an example case where "Microphone" is selected as the sound source on the subtitle display setting screen 120 illustrated in FIG. 32. In the following, referring to FIG. 38, an example case is described in which an event is conducted using the electronic whiteboard 2 without performing communication with another communication terminal. However, in another example, the event can be conducted through communication between the electronic whiteboard 2 and another communication terminal in substantially the same manner as described with reference to FIG. 34.

At S451, the audio processing unit 23-2 of the electronic whiteboard 2 converts sound collected by the microphone 2200 into an audio signal, to acquire audio data based on the converted audio signal. The microphone 2200 is an example of a sound collecting device. At S452, the transmission/reception unit 21 of the electronic whiteboard 2 transmits the audio data acquired by the audio processing unit 23-2 and the language information indicating the display language selected at step S402 to the voice-to-text conversion server 9. Accordingly, the transmission/reception unit 91 of the voice-to-text conversion server 9 receives the audio data and the language information transmitted from the electronic whiteboard 2.

At S453, the conversion unit 93 of the voice-to-text conversion server 9 converts the audio data received by the transmission/reception unit 91 to text data. Operation performed by the conversion unit 93 is the same or substantially the same as the operation illustrated in FIG. 35, and therefore the redundant description thereof is omitted below. At S454, the transmission/reception unit 91 of the voice-to-text conversion server 9 transmits the text data generated by the conversion unit 93 to the electronic whiteboard 2. Accordingly, the transmission/reception unit 21 of the electronic whiteboard 2 receives the text data.

At S455, the image processing unit 23-1 of the electronic whiteboard 2 generates data of the on-going-event screen 170 using the text data received at S454 according to the setting items selected at step S402. At S456, the display control unit 24 of the electronic whiteboard 2 controls the display 220 to display the on-going-event screen 170 based on the data generated by the image processing unit 23-1.

Referring to FIG. 39, the on-going-event screen 170c displayed on the display 220 of the electronic whiteboard 2 by the operation of FIG. 38 is described. FIG. 39 illustrates an example of the on-going-event screen 170c, which is displayed when the subtitle display "ON", the display format "1 line", the display language "English (US)", and the sound source "Microphone" are selected on the subtitle display setting screen 120. The on-going-event screen 170c includes sound source information 177b indicating a target sound source from which audio data to be converted to text data is acquired, and the text data display area 180 in which text data is displayed. In the example of FIG. 39, the sound source information 177b includes an image representing a microphone, which indicates that "Microphone" is selected as the target sound source on the subtitle display setting screen 120. In addition, as described above, text is displayed in the text data display area 180 line by line or any other suitable form. For example, as illustrated in FIG. 36, one sentence of the text can be displayed in the text data display area 180.

As described heretofore, on the on-going-event screen 170c illustrated in FIG. 39, text is displayed in the text data display area 180 based on the text data that is converted from the audio data corresponding to the sound collected by the microphone 2200, according to the setting items selected on the subtitle display setting screen 120. On the on-going-event screen 170c, text (subtitles) is displayed based on voice collected by microphone 2200. This helps conducting a local event in a single location, for example. Note that the electronic whiteboard 2 can also display text in a chronological order as illustrated in FIG. 37 according to selection of the display format "Timeline" and the sound source "Microphone" on the subtitle display setting screen 120.

Referring to FIG. 40, still another example of the on-going-event screen 170 is described. FIG. 40 illustrates an example of the on-going-event screen 170d, which is displayed when the subtitle display "OFF" is selected on the subtitle display setting screen 120. Different from the on-going-event screens 170a to 170c described above, no text is displayed on the on-going-event screen 170d. For example, when a local event is being conducted in a single location and there is no need to display subtitles, the ser sets the subtitle setting to "OFF" so that no subtitle (text) is displayed, whereby the minimum information is displayed on the on-going-event screen 170d.

With the configurations and operations as described heretofore, the electronic whiteboard 2 switches whether to display subtitles (text) and in which display format the subtitles (text) are to be displayed on the on-going-event screen 170 according to the setting items selected on the subtitle display setting screen 120. This enables to perform subtitle display according to types of an event. Further, when the electronic whiteboard 2 conducts an event such as a remote conference through communication with another communication terminal, the electronic whiteboard 2 can switch whether to display text based on voice collected by the electronic whiteboard 2 itself or to display text based on voice collected by another communication terminal according to settings configured by a user.

In the above, referring to FIG. 36, FIG. 37, FIG. 39, and FIG. 40, the on-going-event screen 170 corresponding to the setting items selected on the subtitle display setting screen 120 is described. However, the display format of the on-going-event screen 170 is not limited to the one described above. In another example, the display control unit 24 of the electronic whiteboard 2 displays the on-going-event screen 170 in a different display format according to the setting items selected on the subtitle display setting screen 120.

Figure 41:
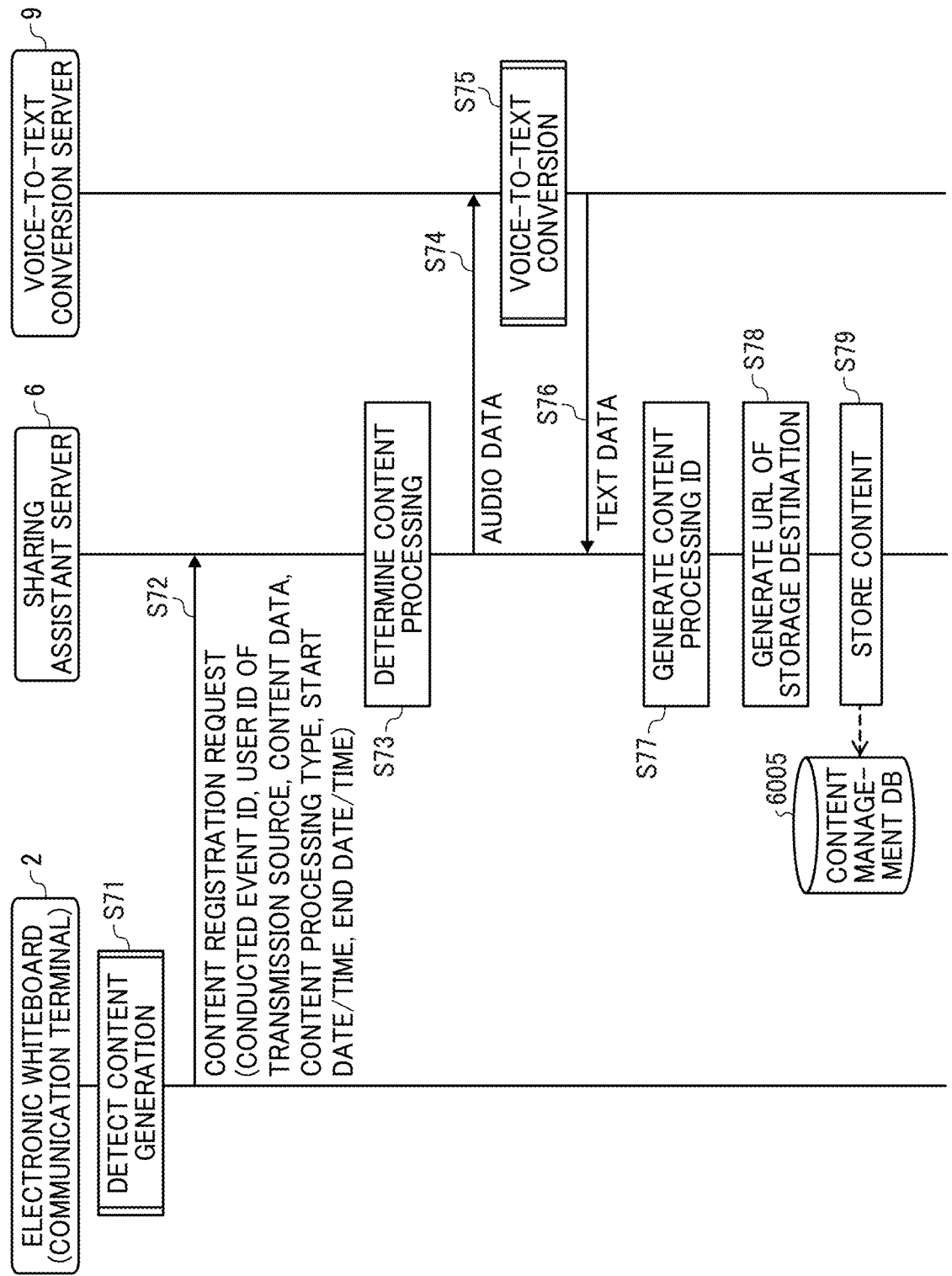
FIG. 41 is a sequence diagram illustrating operation of registering a record of an event that has been started, according to an embodiment of the present disclosure.
Figure 42:
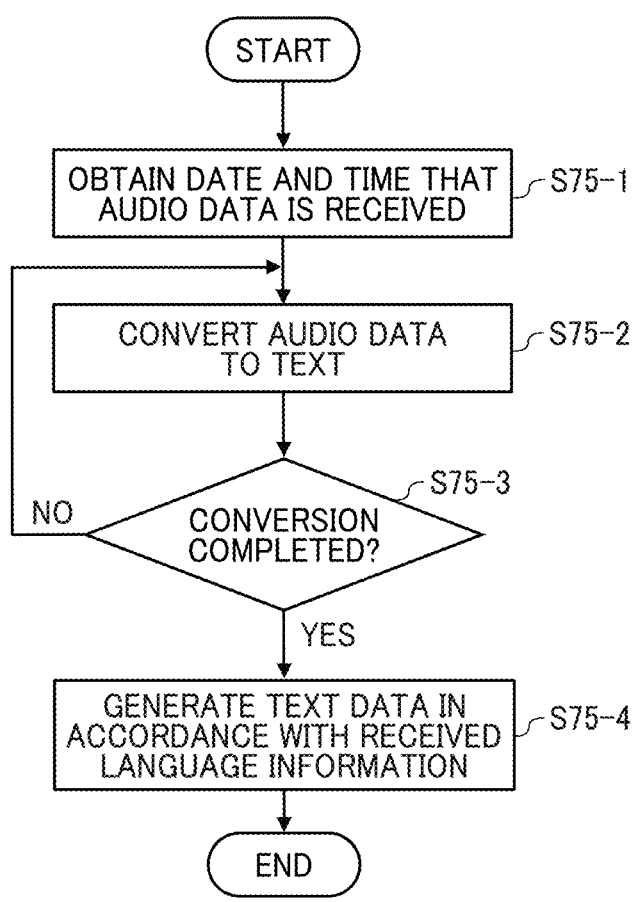
FIG. 42 is a flowchart illustrating operation of converting audio data to text data, according to an embodiment of the present disclosure.
Figure 43:
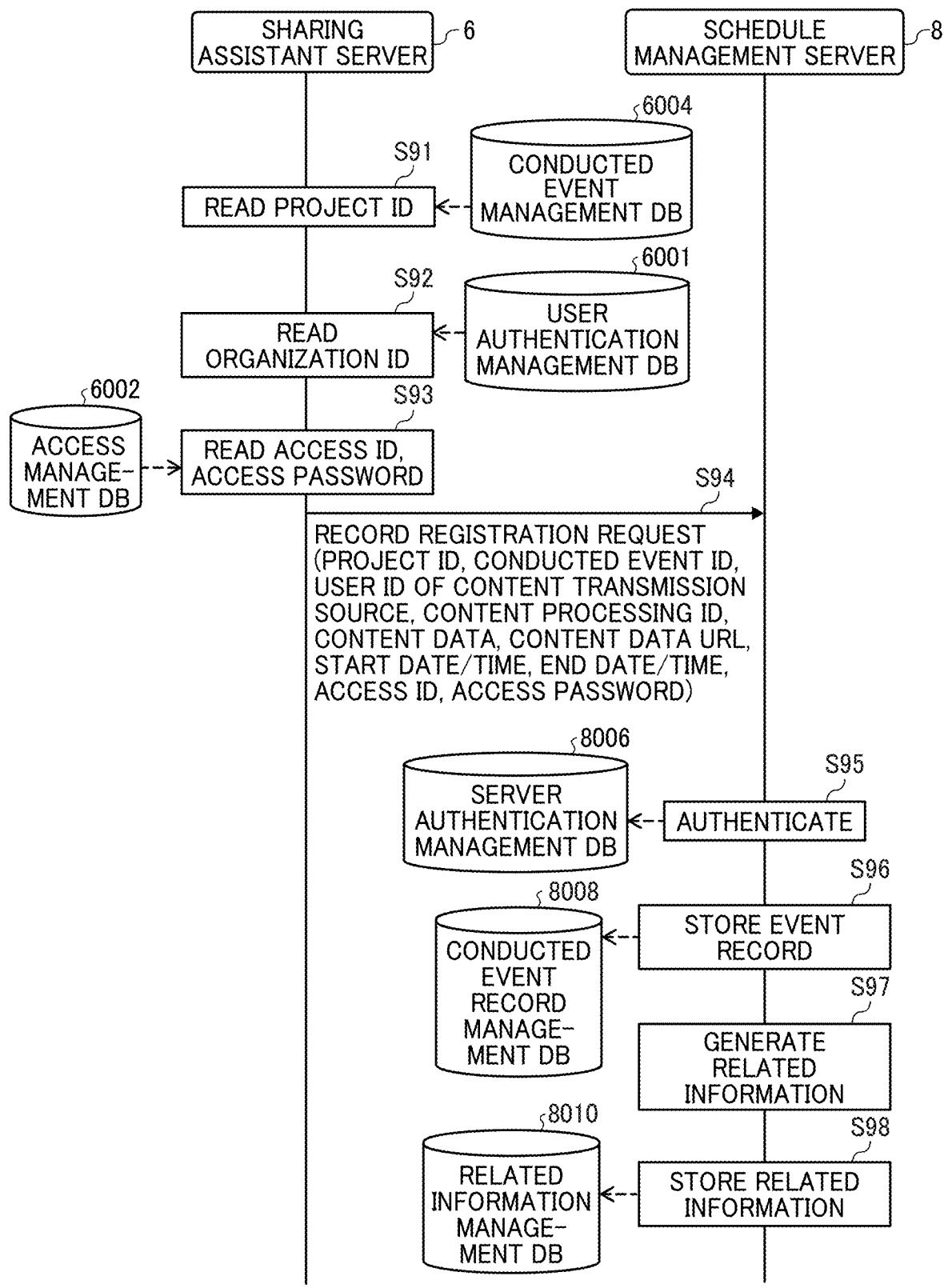
FIG. 43 is a sequence diagram illustrating operation of registering a record of an event that has been started, according to an embodiment of the present disclosure.

Registration of Event Record:

Referring now to FIG. 41 to FIG. 47, operation to register an event record is described, according to an embodiment. FIG. 41 and FIG. 43 are sequence diagrams illustrating operation of registering a record of the event that has been started, according to an embodiment.

The determination unit 25 of the electronic whiteboard 2 detects content generation. Specifically, the determination unit 25 determines a type of content processing being performed during the event that has been started (S71). For example, when the content is audio data generated through recording by the audio processing unit 23-2, the determination unit 25 determines a type of content processing as "recording". In another example, when the content is image data obtained through screenshot (capturing) by the image processing unit 23-1, the determination unit 25 determines that a type of content processing is "screenshot". In another example, when the content is document file data (such as data of meeting materials), which is transmitted by the transmission/reception unit 21, the determination unit 25 determines that a type of content processing is "file transmission".

Next, the transmission/reception unit 21 transmits content registration request information indicating a request for registering the content being generated, to the sharing assistant server 6 (S72). In this example, the transmission/reception unit 21 automatically transmits the content registration request information, every time generation of the content is detected. The content registration request information includes the conducted event ID, the user ID of a transmission source of the content, content data, and content processing type (recording, screenshot, file transmission). The content registration request information further includes information on the start date/time and end date/time of content processing. Accordingly, the transmission/reception unit 61 of the sharing assistant server 6 receives the content registration request information.

The determination unit 65 of the sharing assistant server 6 determines a type of content processing, based on the content processing type included in the content registration request information that is received at the transmission/reception unit 61 (S73). In one example, when the determination unit 65 determines that the content processing type is "recording", the transmission/reception unit 61 of the sharing assistant server 6 transmits the audio data, which is received as content data, to the voice-to-text conversion server 9 (S74). Accordingly, the transmission/reception unit 91 of the voice-to-text conversion server 9 receives the audio data. When the content type processing is other than "recording", the sharing assistant server 6 does not perform the processes of S74 to S76. In this case, the operation proceeds to S77.

The conversion unit 93 of the voice-to-text conversion server 9 converts the audio data received at the transmission/reception unit 91 to text data (S75). Referring to FIG. 42, processing of voice-to-text conversion, performed by the voice-to-text conversion server 9, is described, according to an embodiment. FIG. 42 is a flowchart illustrating operation of converting audio data to text data, according to an embodiment. The conversion unit 93 obtains information indicating date and time when the audio data is received at the transmission/reception unit 91 (S75-1). The information obtained at S75-1 may indicate the date and time when the sharing assistant server 6 receives the audio data at S72, or the date and time when the sharing assistant server 6 sends the audio data at S74. In this example, the transmission/reception unit 91 of the voice-to-text conversion server 9 receives the audio data and information on the date and time that the audio data is received at S74, from the sharing assistant server 6.

Next, the conversion unit 93 converts the audio data, received at the transmission/reception unit 91, to text data (S75-2). When the conversion of the audio data to text data by the conversion unit 93 is completed ("YES" at S75-3), the operation proceeds to S75-4. By contrast, when the conversion of the audio data to text data by the conversion unit 93 is not completed ("NO" at S75-3), the operation repeats S75-2. Further, the conversion unit 93 generates text data converted from the audio data according to the language information received at S419 (step S75-4). Thus, the voice-to-text conversion server 9 converts the audio data transmitted from the sharing assistant server 6 into text data. The voice-to-text conversion server 9 repeatedly performs operation of FIG. 42, every time the audio data is received from the sharing assistant server 6.

Referring again to FIG. 41, description of registration of the event record continues. The transmission/reception unit 91 transmits the text data converted by the conversion unit 93, to the sharing assistant server 6 (S76). With the text data, the transmission/reception unit 91 transmits the information indicating the date and time that the audio data is received, which is obtained at S75-1, to the sharing assistant server 6. In one example, with the text data, the transmission/reception unit 91 transmits information indicating the date and time that the text data is generated by the conversion unit 93, to the sharing assistant server 6. Accordingly, the transmission/reception unit 61 of the sharing assistant server 6 receives the text data.

The generation unit 64 generates a content processing ID for identifying the content processing, which is detected during the event (S77). The generation unit 64 further generates a URL of content data being generated (S78). The storing/reading processing unit 69 stores, in the content management DB 6005 (FIG. 12B), the content processing type, the start date and time of content processing, the end date and time of content processing, the content processing ID generated at S77, and the URL of the content data generated at S78, for the conducted event ID that is received at S72 (S79). In one example, when the content processing type is "voice text reception", the start date and time and the end date and time of the content processing is the information indicating the date end time that is received at S76. In another example, when the content processing type is "voice text reception", the start date and time and the end date and time of the content processing is information indicating the date and time when the sharing assistant server 6 receives the text data at S76.

The operation now proceeds to S91 of FIG. 43. The storing/reading processing unit 69 of the sharing assistant server 6 searches the conducted event management DB 6004 (FIG. 12A) using the conducted event ID received at S72 as a search key, to obtain corresponding project ID. The storing/reading processing unit 69 searches the user authentication management DB 6001 (FIG. 11A) using the user ID of the content transmission source as a search key, to obtain the corresponding organization ID (S92).

The storing/reading processing unit 69 searches the access management DB 6002 (FIG. 11B) using the organization ID read at S92 as a search key to obtain the access ID and access password that correspond to the organization ID obtained at S92 (S93).

Next, the transmission/reception unit 61 transmits record registration request information indicating a request for registering an event record, to the schedule management server 8 (S94). The record registration request includes the project ID read at S91, and the conducted event ID, the user ID of the content transmission source, the content data, the start date and time of content processing, and the end date and time of content processing, which are received at S72. The record registration request further includes the content processing ID generated at S77, the URL of content data generated at S78, and the access ID and password read at S93. The transmission/reception unit 81 of the schedule management server 8 receives the record registration request.

Next, the authentication unit 82 of the schedule management server 8 authenticates the sharing assistant server 6 using the access ID and the access password (S95). Since the authentication processing of S95 is performed in the same or substantially the same manner as described above referring to S36, redundant description thereof is omitted below. The following describes the case where the authentication result indicates that authentication is successful.

The storing/reading processing unit 89 stores various types of data or information, received at S94, in the conducted event record management DB 8008 (FIG. 16A) (S96). Specifically, the storing/reading processing unit 89 stores, in the conducted event record management DB 8008 (FIG. 16A), various data (or information) including information on the file data, in association with a set of the project ID and the conducted event ID received at S94. Accordingly, the schedule management server 8 is able to manage information regarding the content, in substantially the similar manner as the sharing assistant server 6 manages the content.

The generation unit 83 of the schedule management server 8 generates related information, in which the content data received at S94 is organized by the content generation time (S97). The storing/reading processing unit 89 of the schedule management server 8 stores the related information generated by the generation unit 83 in the related information management DB 8010 (FIG. 17) (S98). Accordingly, the schedule management server 8 is able to manage various types of content data according to the content generation time, by content processing type.

As described above, the electronic whiteboard 2 transmits the event ID of an event related to a particular project, and any content that is generated during the event, to the schedule management server 8. The schedule management server 8 stores, for each event ID associated with the project ID, information on the content in the conducted event record management DB 8008. That is, the sharing system 1 allows a user to designate information indicating association between the event that has been started and the project, whereby content data generated during the event can be stored for each project.

Figure 44:
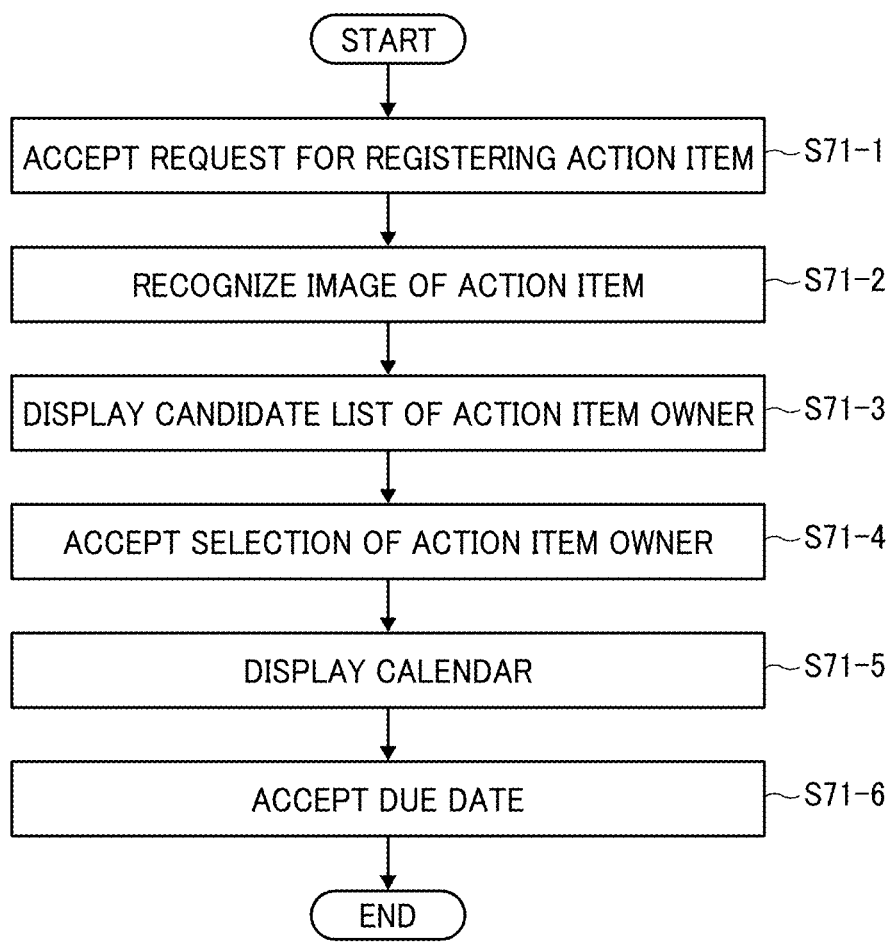
FIG. 44 is a flowchart illustrating operation of registering an action item, according to an embodiment of the present disclosure.
Figure 46:
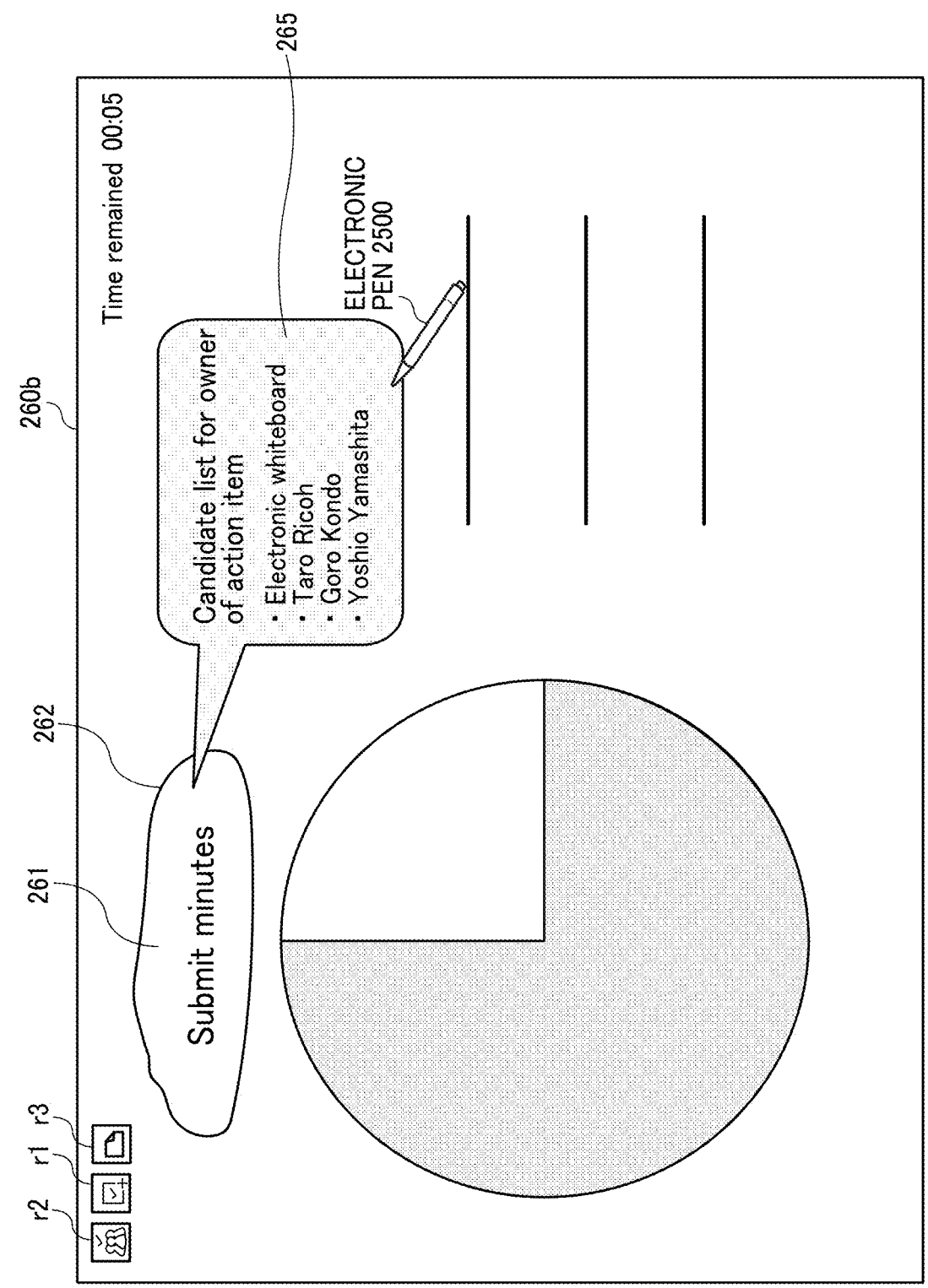
FIG. 46 is an illustration of an example of a screen including a list of candidates of owner of the action item, according to an embodiment of the present disclosure.
Figure 47:
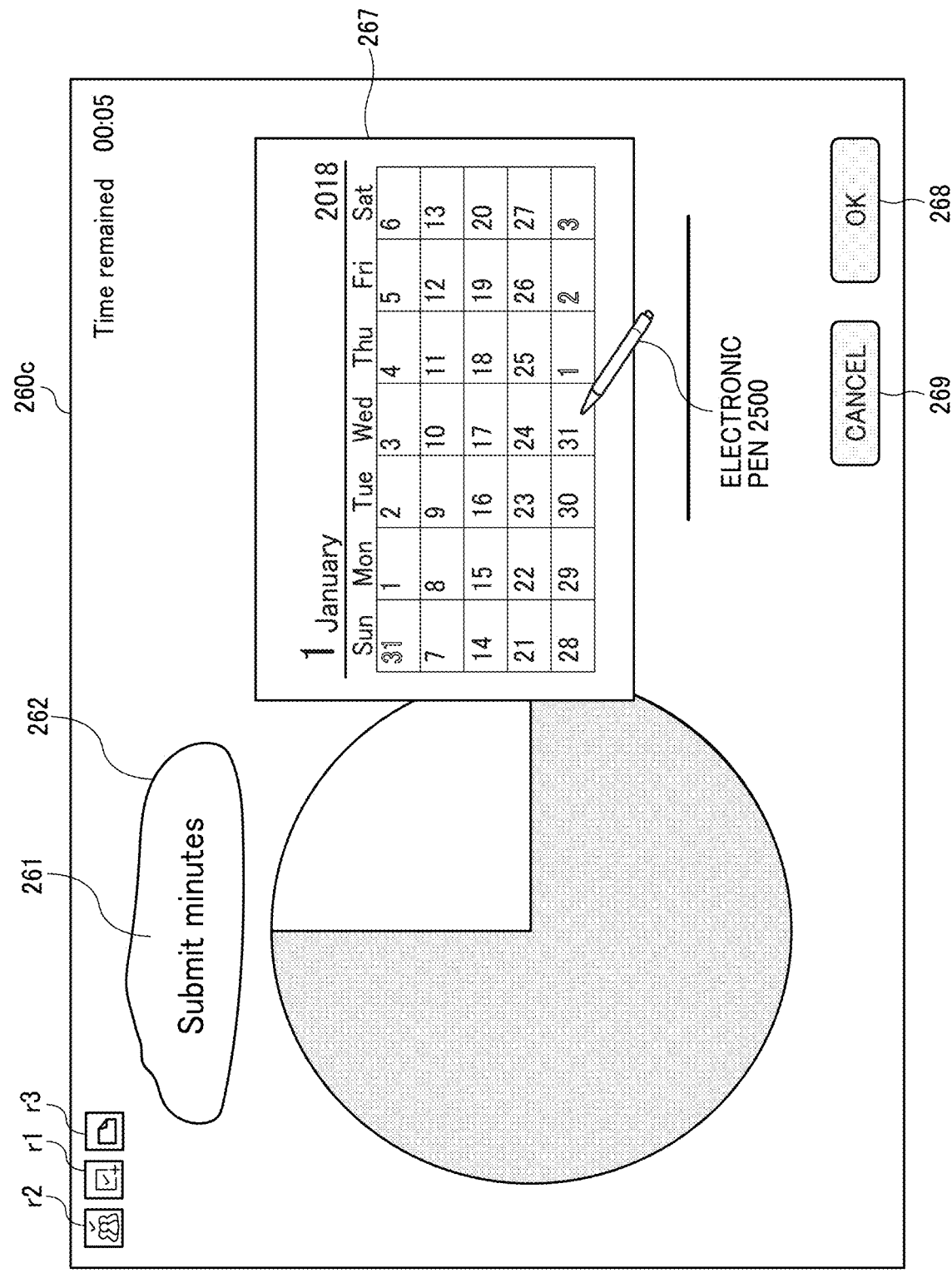
FIG. 47 is an illustration of an example of a screen including a calendar for selecting the due date of the action item, according to an embodiment of the present disclosure.

Registration of Action Item:

Referring now to FIG. 44 to FIG. 47, operation of processing an action item, as an example of content, is described according to an embodiment. FIG. 44 is a flowchart illustrating operation of registering an action item, according to an embodiment. FIG. 45 is an illustration of an example screen in which an action item is designated. FIG. 46 is an illustration of an example screen including a list of candidates of owner of the action item. FIG. 47 is an illustration of an example screen including a calendar for selecting the due date of the action item.

Referring to FIG. 44, as the user presses the icon r1 illustrated in FIG. 30, the acceptance unit 22 receives a request for registering an action item (S71-1). As illustrated in FIG. 45, it is assumed that the user writes an action item ("Submit minutes") on a drawing screen 260a of the electronic whiteboard 2 using the electronic pen 2500, and circles the drawing image 261. In such case, the electronic whiteboard 2 recognizes the circled area as a designated area 262, which includes a drawing image 261. The acceptance unit 22 accepts input of the designated area 262 including the drawing image 261. The identifying unit 26 identifies the drawing image 261, included in the designated area 262, as an image of the action item (S71-2). The description given above with reference to FIG. 45 is of an example in which the identifying unit 26 identifies the drawing image 261, which is circled by the line of the designated area 262. Alternatively, the identifying unit 26 may identify the drawing image 261, which is determined by a line that is apart from the designated area 262 at a predetermined distance. As described above, the designated area 262 may be determined based on the user's drawing of a certain figure, such as a circle or a polygon, with the electronic pen 2500.

Next, as illustrated in FIG. 46, the display control unit 24 displays a candidate list 265, which lists candidates of an owner of the action item, on the drawing screen 260b (S71-3). As the user selects a particular name from the candidate list 265 with the electronic pen 2500, the acceptance unit 22 receives a selection of the owner of the action item (S71-4). The user names to be displayed in the candidate list 265 may be obtained from the names of participants, or from the project members.

Next, as illustrated in FIG. 47, the display control unit 24 displays, on the drawing image 260c, a calendar 267 for receiving a selection of a particular date (S71-5). As the user selects a particular date from the calendar 267 with the electronic pen 2500, the acceptance unit 22 accepts a selection of the due date for the action item (S71-6). The calendar 267 is an example of a due date input screen. The due date input screen may be a list of dates, without indication of a day.

After the above-described operation, the electronic whiteboard 2 sends a content registration request, which requests to register the action item, to the sharing assistant server 6. The content registration request information includes a conducted event ID for identifying the event in which the action item is generated, a user ID of the owner of the action item that is selected at S71-4, image data of the action item (in this case, "Submit minutes") identified at S71-2, and the due date of the action item input at S71-6. As an example of content, the transmission/reception unit 21 transmits image data, which is a part of the image being displayed for the currently-held event, as image data representing the action item generated in that event. Accordingly, the transmission/reception unit 61 of the sharing assistant server 6 receives the content registration request information. The processing after the sharing assistant server 6 receives the content registration request information is performed in substantially the manner as the processing described above referring to FIG. 41 and FIG. 43, such that description thereof is omitted.

Figure 48:
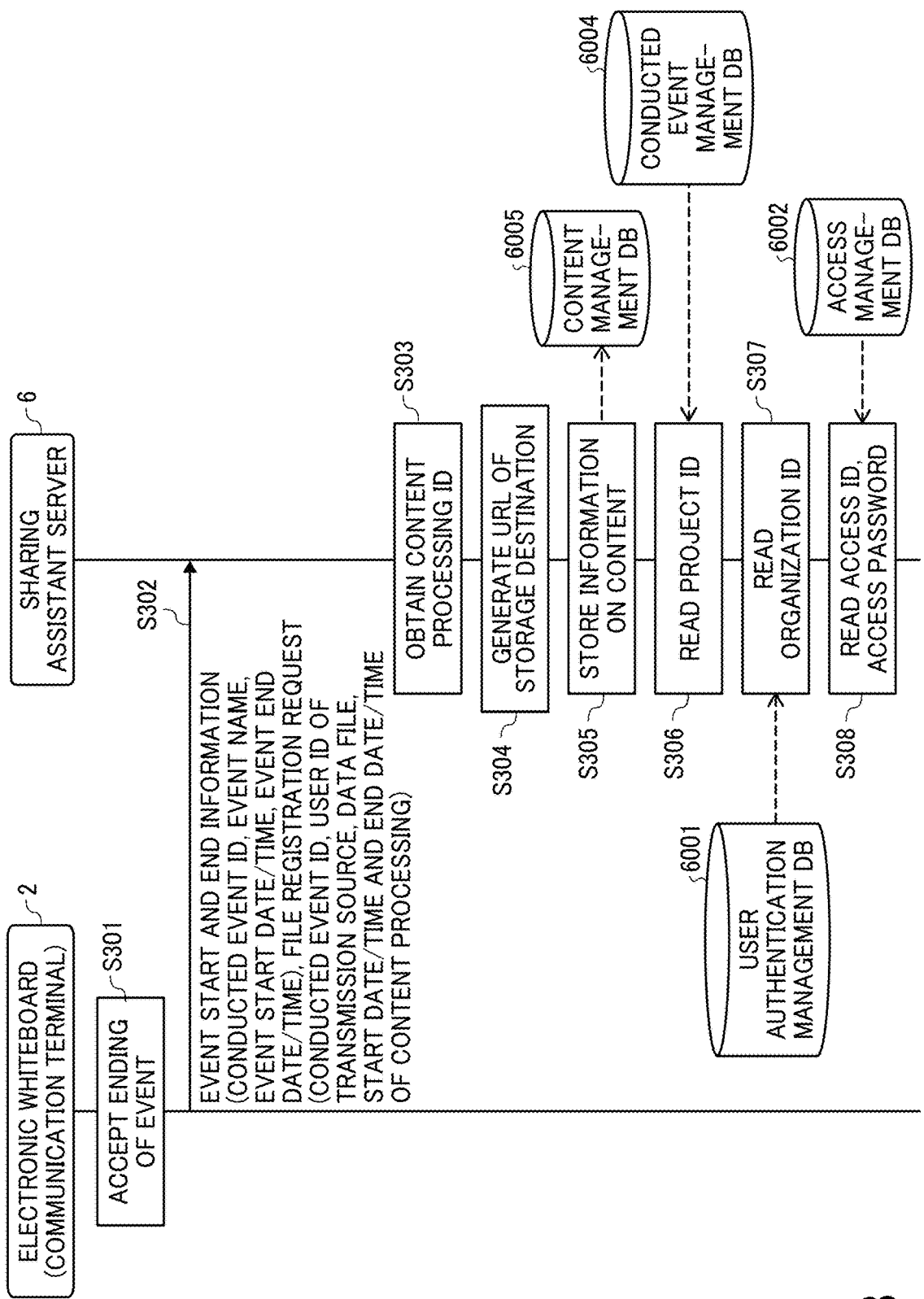
FIG. 48 is a sequence diagram illustrating operation of controlling processing to end an event, according to an embodiment of the present disclosure.
Figure 49:
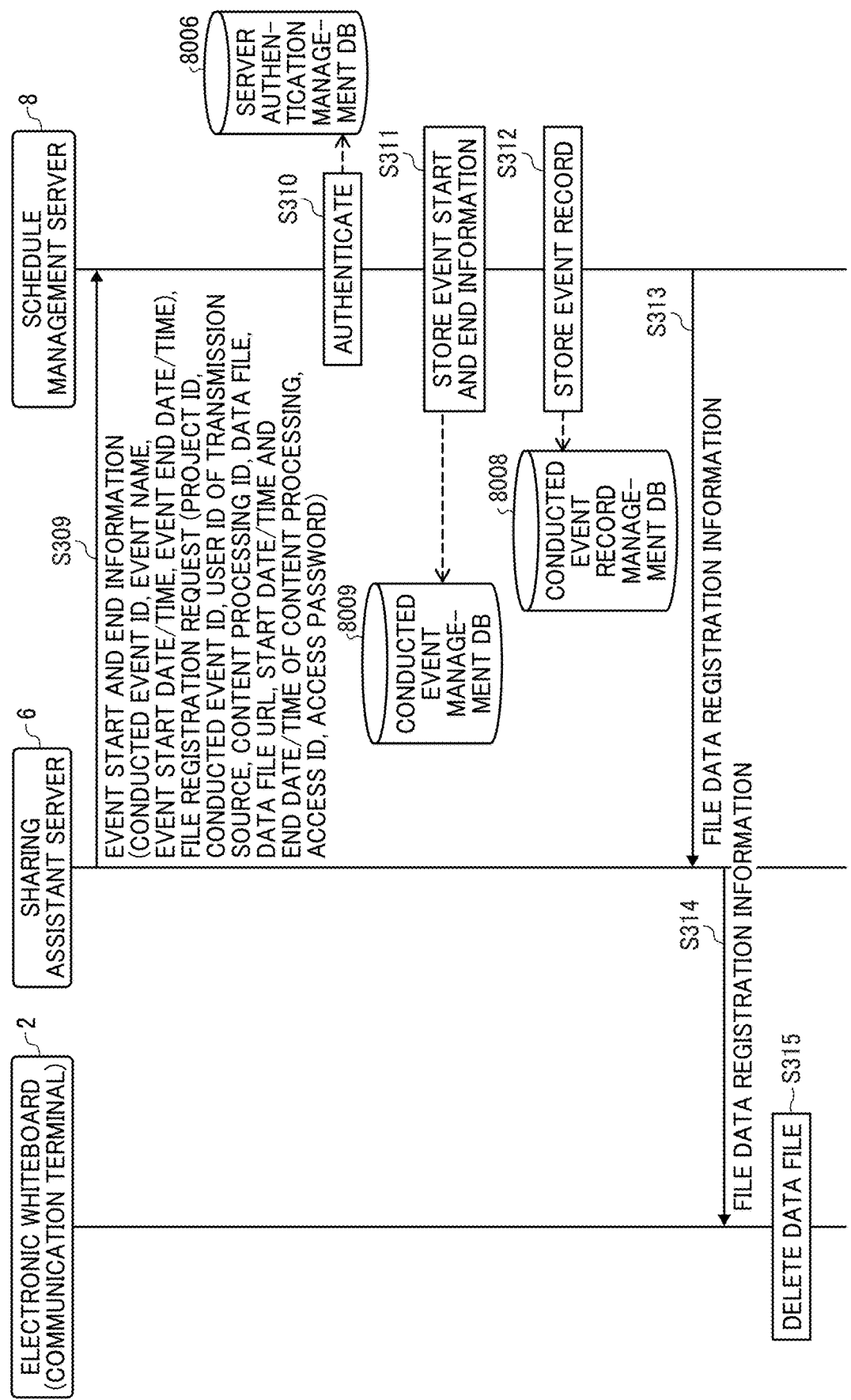
FIG. 49 is a sequence diagram illustrating operation of controlling processing to end an event, according to an embodiment of the present disclosure.
Figure 50:
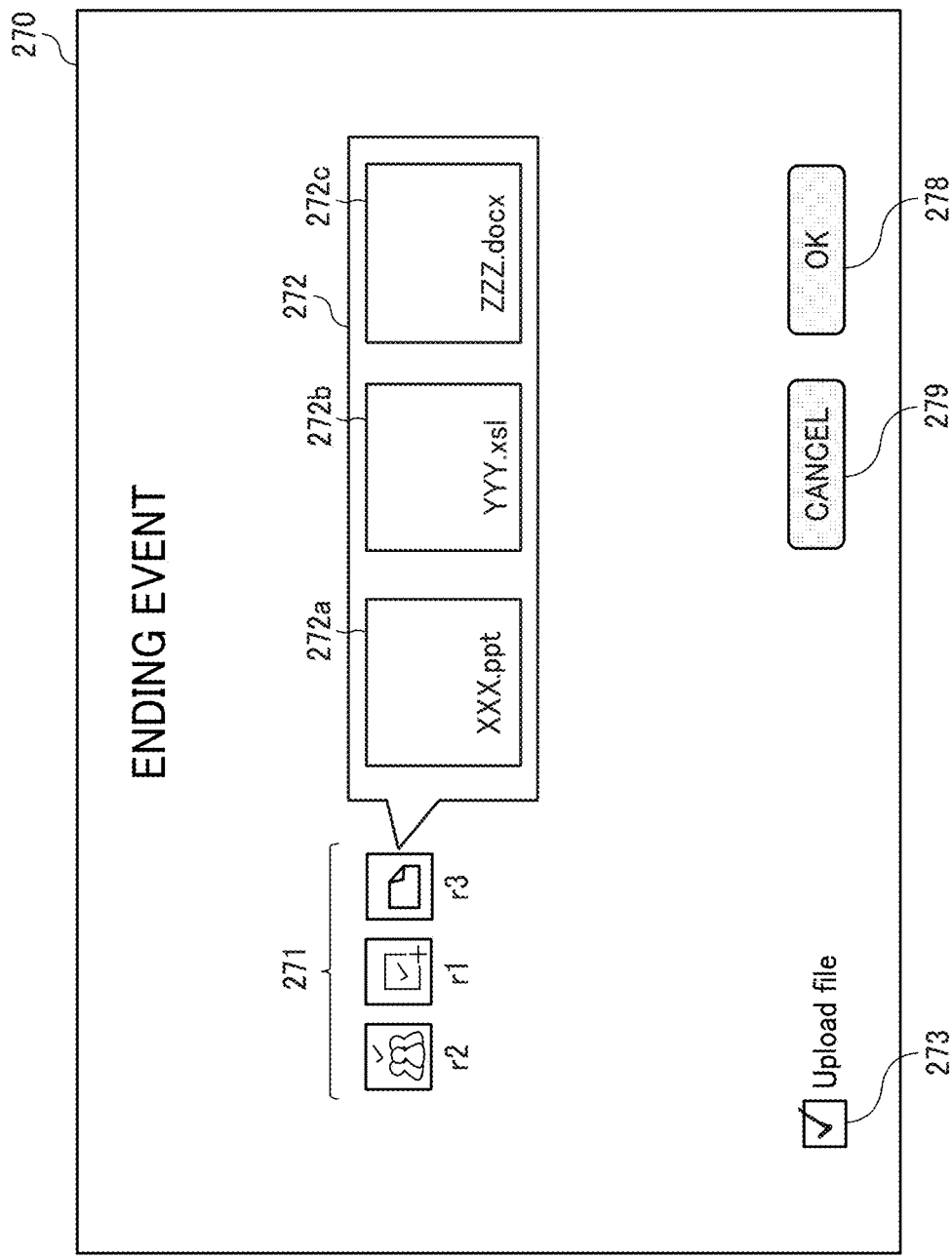
FIG. 50 is an illustration of an example of an event end screen, displayed by the electronic whiteboard, according to an embodiment of the present disclosure.
Figure 51:
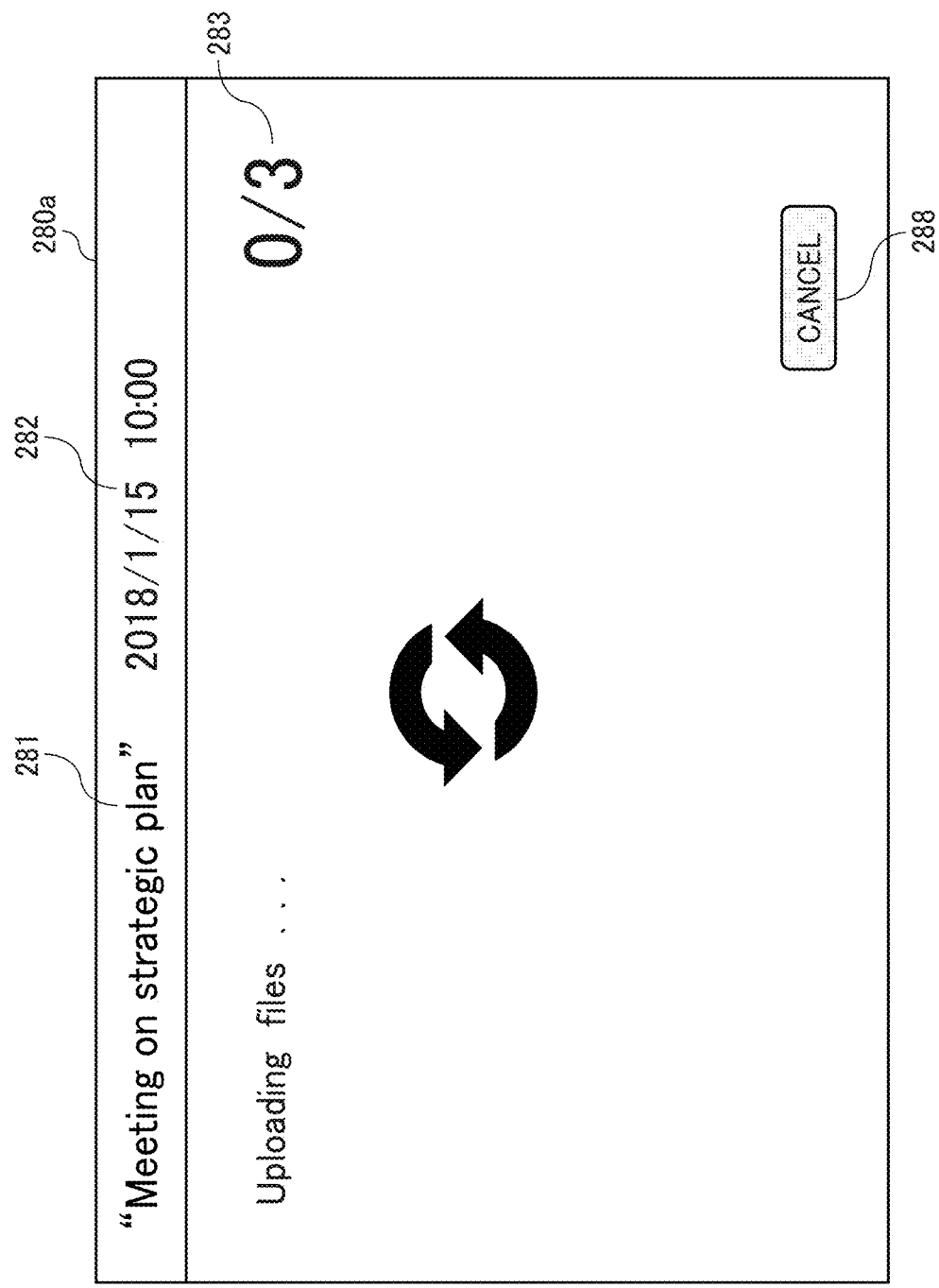
FIG. 51 is an illustration of an example of a file data uploading screen, displayed by the electronic whiteboard, according to an embodiment of the present disclosure.
Figure 52:
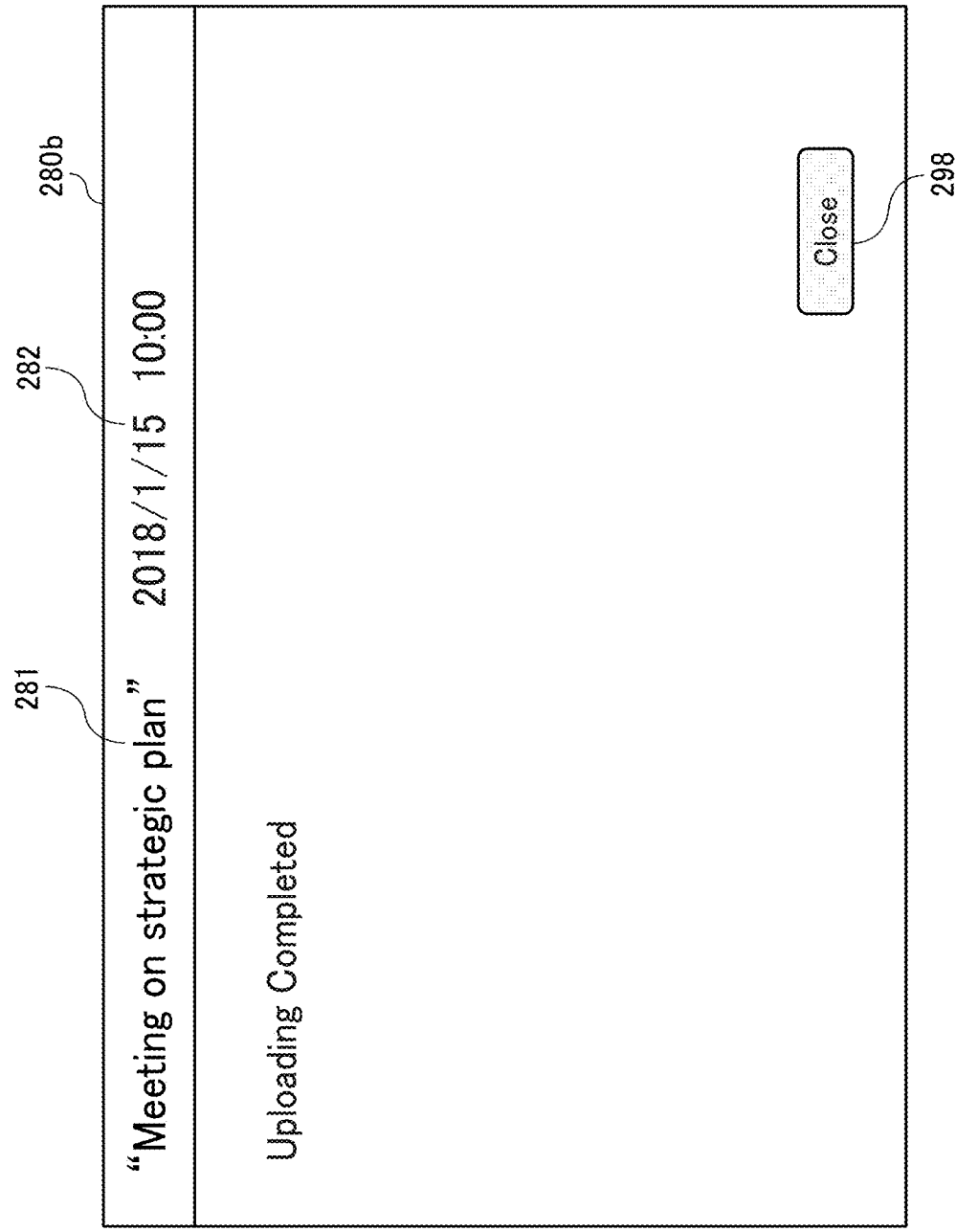
FIG. 52 is an illustration of an example of a file data uploading completion screen, displayed by the electronic whiteboard, according to an embodiment of the present disclosure.

Processing to End Event:

Next, referring to FIG. 48 to FIG. 52, operation of controlling processing to end an event being conducted, is described according to an embodiment. FIG. 48 and FIG. 49 are sequence diagrams illustrating operation of controlling processing to end an event, according to the embodiment. FIG. 50 is an illustration of an example of an event end screen, displayed by the electronic whiteboard 2. FIG. 51 is an illustration of an example of a file data uploading screen, displayed by the electronic whiteboard 2. FIG. 52 is an illustration of an example of a file data uploading completion screen, displayed by the electronic whiteboard 2.

Referring to FIG. 48, in response to a user instruction to close the screen being displayed on the display 220, the acceptance unit 22 accepts an instruction to end the event being conducted (S301).

The transmission/reception unit 21 transmits, to the sharing assistant server 6, event start and end information, and file data registration request information indicating a request for registering file data (S302). The event start and end information includes the conducted event ID, the event name, the event start date and time, and the event end date and time. The file data registration request information includes the conducted event ID, the user ID of a transmission source, the file data, the start date and time of content processing, and the end date and time of content processing. The transmission/reception unit 61 of the sharing assistant server 6 receives the event start and end information, and the file data registration request information.

The generation unit 64 of the sharing assistant server 6 generates, for each content that has been generated during the event, a content processing ID identifying the content. (S303). The generation unit 64 further generates a URL of content data that has been generated during the event (S304). The storing/reading processing unit 69 stores, in the content management DB 6005 (FIG. 12B), the content processing type, the start date and time of content processing, the end date and time of content processing, the content processing ID generated at S303, and the URL of the content data generated at S304, for the conducted event ID that is received at S302 (S305).

The storing/reading processing unit 69 of the sharing assistant server 6 searches the conducted event management DB 6004 (FIG. 12A) using the conducted event ID received at S72 as a search key, to obtain the corresponding project ID (S306). The storing/reading processing unit 69 searches the user authentication management DB 6001 (FIG. 11A) using the user ID of the content transmission source as a search key, to obtain the corresponding organization ID (S307).

The storing/reading processing unit 69 searches the access management DB 6002 (FIG. 11B) using the organization ID read at S92 as a search key to obtain the corresponding access ID and access password (S308).

Next, referring to FIG. 47, the transmission/reception unit 61 transmits, to the schedule management server 8, the event start and end information and the file data registration request information indicating a request for registering file data received at S302 (S309). The file data registration request information includes the project ID read at S306, the conducted event ID, the user ID of a transmission source, the file data, the start date and time of content processing, and the end date and time of content processing (received at S302), the content processing ID generated at S303, the URL of file data generated at S304, and the access ID and password read at S308. The transmission/reception unit 81 of the schedule management server 8 receives the event start and end information, and the file data registration request information.

Next, the authentication unit 82 of the schedule management server 8 authenticates the sharing assistant server 6 using the access ID and the access password (S310). Since the authentication processing of S310 is performed in substantially the same manner as described above referring to S36, redundant description thereof is omitted below. The following describes the case where the authentication result indicates that authentication is successful.

Next, the storing/reading processing unit 89 of the schedule management server 8 stores, in the conducted event management DB 8009 (FIG. 16B), the event start and end information received at S309 (S311). Specifically, the storing/reading processing unit 89 adds one record of event start and end information, to the conducted event management table in the conducted event management DB 8009.

The storing/reading processing unit 89 stores various types of data or information, received at S309, in the conducted event record management DB 8008 (FIG. 16A) (S312). Specifically, the storing/reading processing unit 89 stores, in the conducted event record management DB 8008, various data (or information) including information on the file data, in association with the project ID and the conducted event ID received at S309. Accordingly, the schedule management server 8 is able to manage information regarding the file data, in substantially the similar manner as the sharing assistant server 6 manages the file data.

Next, the transmission/reception unit 81 transmits file data registration information indicating that the file data is registered, to the sharing assistant server 6 (S313). Accordingly, the transmission/reception unit 61 of the sharing assistant server 6 receives the file data registration information.

The transmission/reception unit 61 of the sharing assistant server 6 transmits the file data registration information received from the schedule management server 8, to the electronic whiteboard 2 (S314). The transmission/reception unit 21 of the electronic whiteboard 2 receives the file data registration information.

In response to receiving the file data registration information notification at the transmission/reception unit 21, the storing/reading processing unit 29 of the electronic whiteboard 2 deletes the file data, which has been registered, from the specific storage area of the storage unit 2000 (S315). Since the file data that has been transmitted to the sharing assistant server 6 is deleted from the electronic whiteboard 2, leakage of confidential information that might have been shared during the meeting can be prevented.

The following describes transitions of screen displayed by the electronic whiteboard 2, when controlling processing to end the event. In response to acceptance of an instruction to end the event by the acceptance unit 22 at S301, the display control unit 24 controls the display 220 to display an event end screen 270 as illustrated in FIG. 50. The event end screen 270 includes a tool bar 271, a file display area 272, a file uploading selection area 273, an "OK" button 278 to be pressed to end the event, and a "CANCEL" button 279 to be pressed to cancel processing to end the event. The tool bar 271 includes graphical images such as icons r1, r2 and r3, which are similar to the icons illustrated in FIG. 30. The file display area 272 includes file data images 272a, 272b and 272c, each being used for identifying file data stored in a specific storage area of the storage unit 2000. The file uploading selection area 273 includes a check box for selecting whether or not the file data represented by the data file image, displayed in the file display area 272, is to be uploaded to the sharing assistant server 6.

When the acceptance unit 22 accepts selection of the "OK" button 278 after the file uploading selection area 273 is selected, the display control unit 24 controls the display 220 to display a file uploading screen 280a as illustrated in FIG. 51. That is, the file uploading screen 280a is displayed on the display 220, when the file data stored in the specific storage area of the storage unit 2000, is being uploaded to the sharing assistant server 6. The file uploading screen 280a includes an event name 281 of the event to end, the event end date and time 282, a display area 283 for displaying the progress in updating the data file, and a "CANCEL" button 288 for interrupting (or cancelling) uploading of the file data. The display area 283 indicates a number of file data items to be updated ("3" in FIG. 51), and a number of file data items that have been uploaded ("0" in FIG. 51).

When uploading of the file data is completed, the display control unit 24 controls the display 220 to display an uploading completion screen 280b illustrated in FIG. 52. The uploading completion screen 280b includes a "Close" button 289 to be pressed to end the event. When the uploading completion screen 280b is displayed on the display 220, as described above referring to S315, the storing/reading processing unit 29 of the electronic whiteboard 2 deletes the file data, which has been uploaded, from the specific storage area of the storage unit 2000.

On the other hand, when uploading of any file data fails, during when the file uploading screen 280a is being displayed on the display 220, the display control unit 24 displays information for identifying the file data that uploading has failed (such as the file name). For example, if uploading of file data has failed due to a trouble in the communication network 10, the user participating in the event may print any file data that has been generated or edited during the event, or store such data file in the USB memory 2600 connected to the electronic whiteboard 2.

When the file data is kept stored in the specific storage area of the storage unit 2000 after the event ends, for example, due to failure in uploading, the storing/reading processing unit 29 of the electronic whiteboard 2 may delete the file data stored in the specific storage area, before or at the time of starting a next event for the electronic whiteboard 2. Since the data file that is kept stored can be deleted from the electronic whiteboard 2, the risk of leakage of confidential information that might have been shared during the meeting can be reduced.

Figure 53:
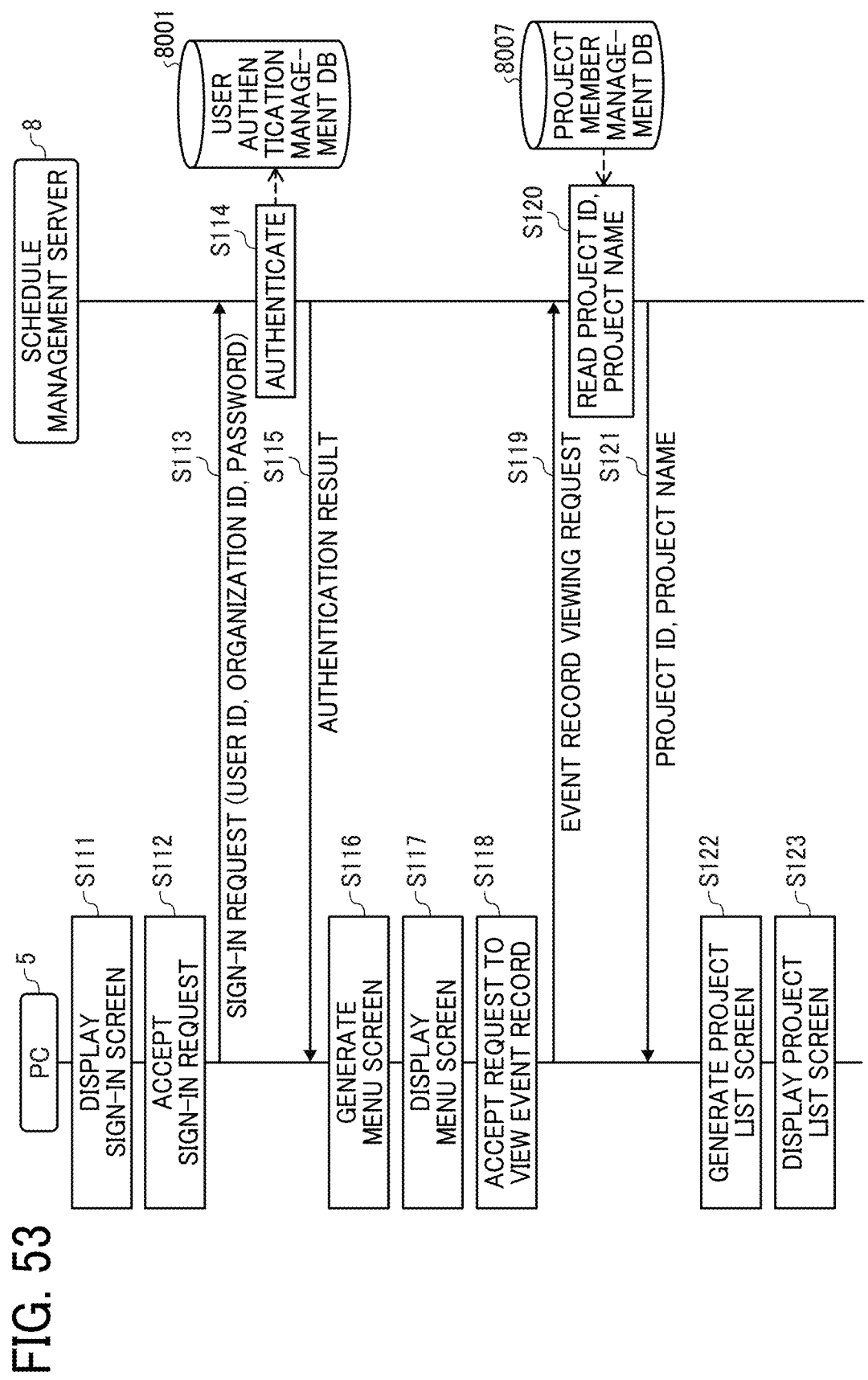
FIG. 53 is a sequence diagram illustrating operation of controlling processing to output a record of the event, according to an embodiment.
Figure 54:
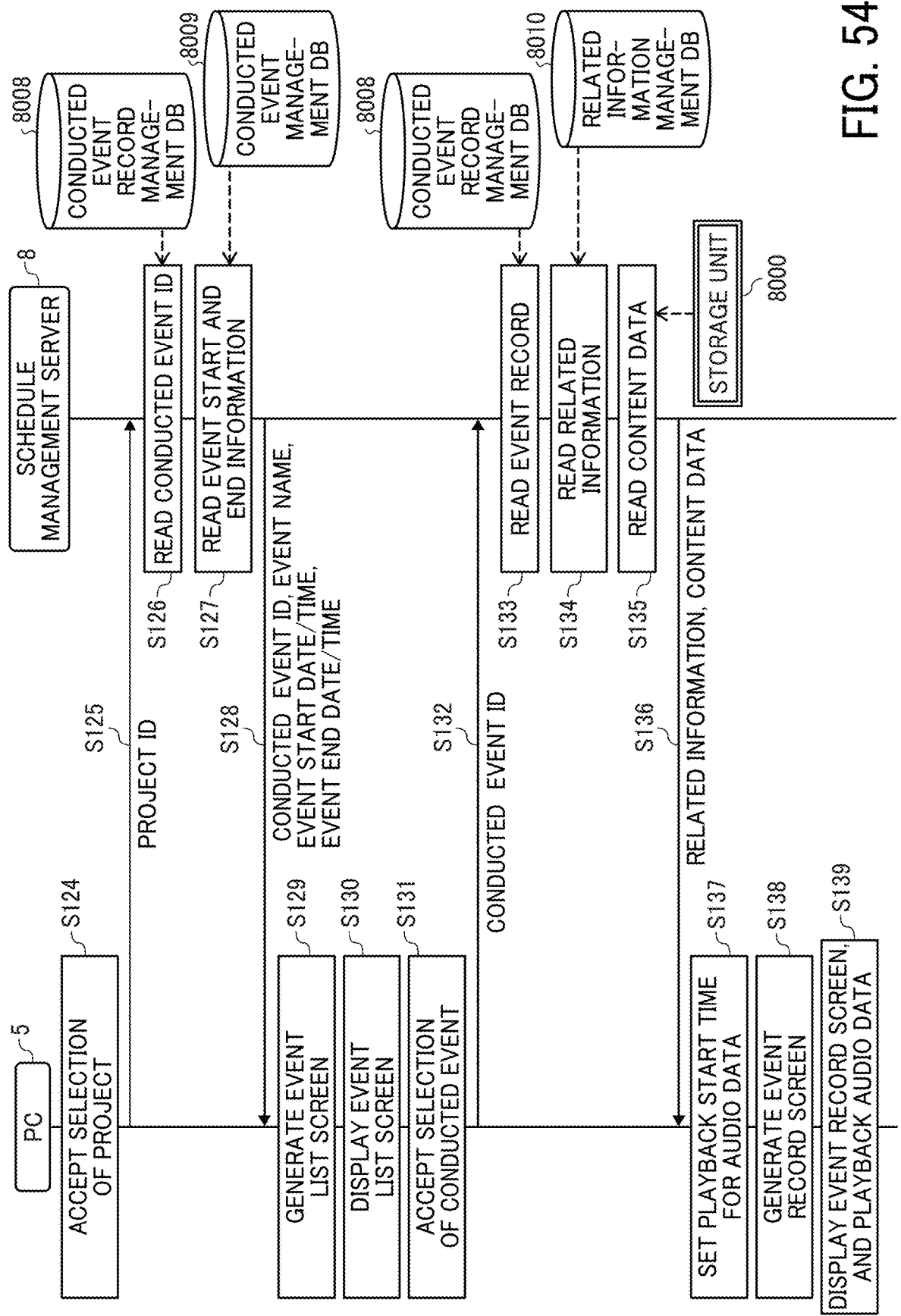
FIG. 54 is a sequence diagram illustrating operation of controlling processing to output a record of the event, according to an embodiment.
Figure 55:
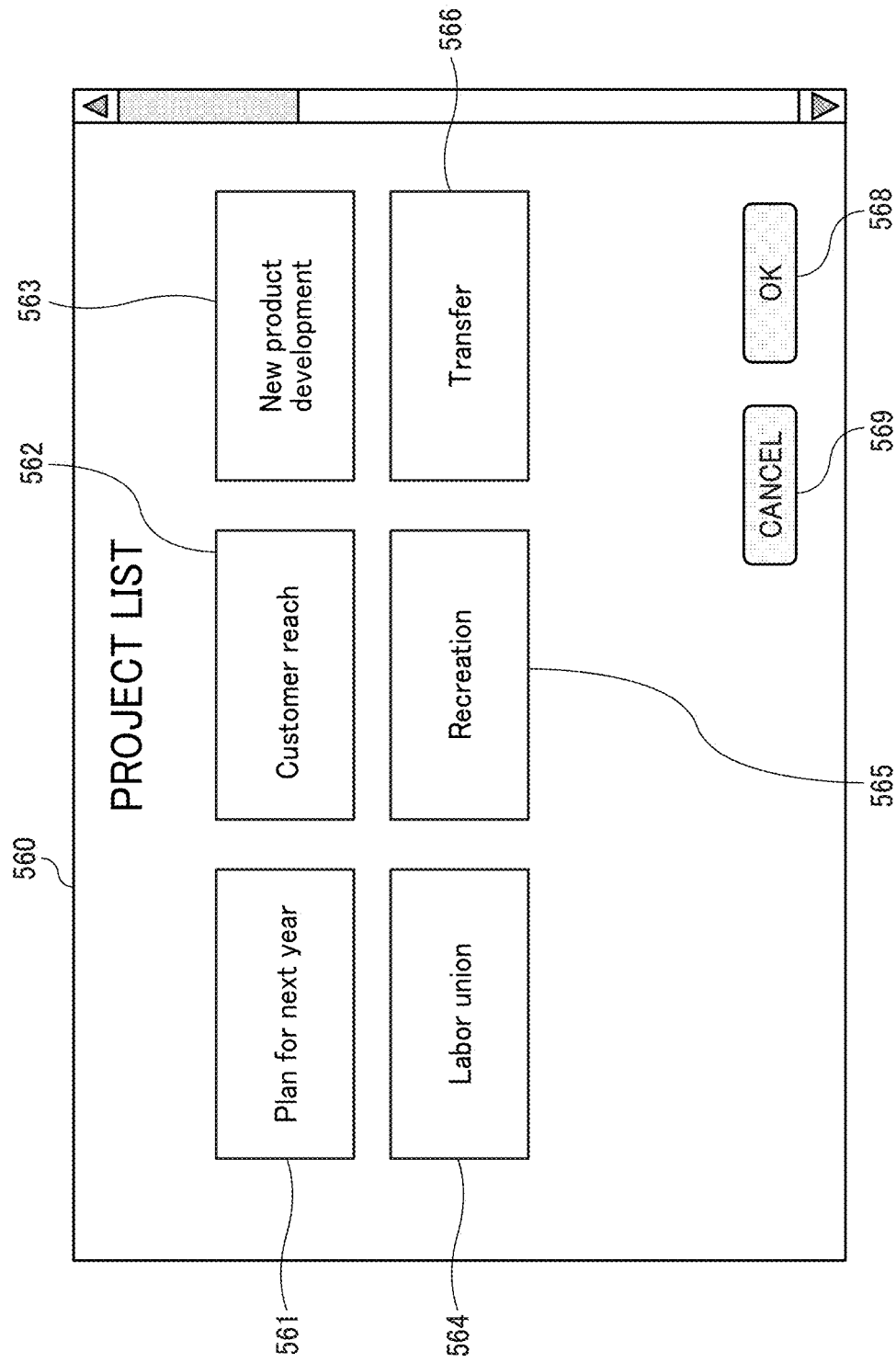
FIG. 55 is an illustration of an example project list screen, displayed by the PC, according to an embodiment of the present disclosure.
Figure 56:
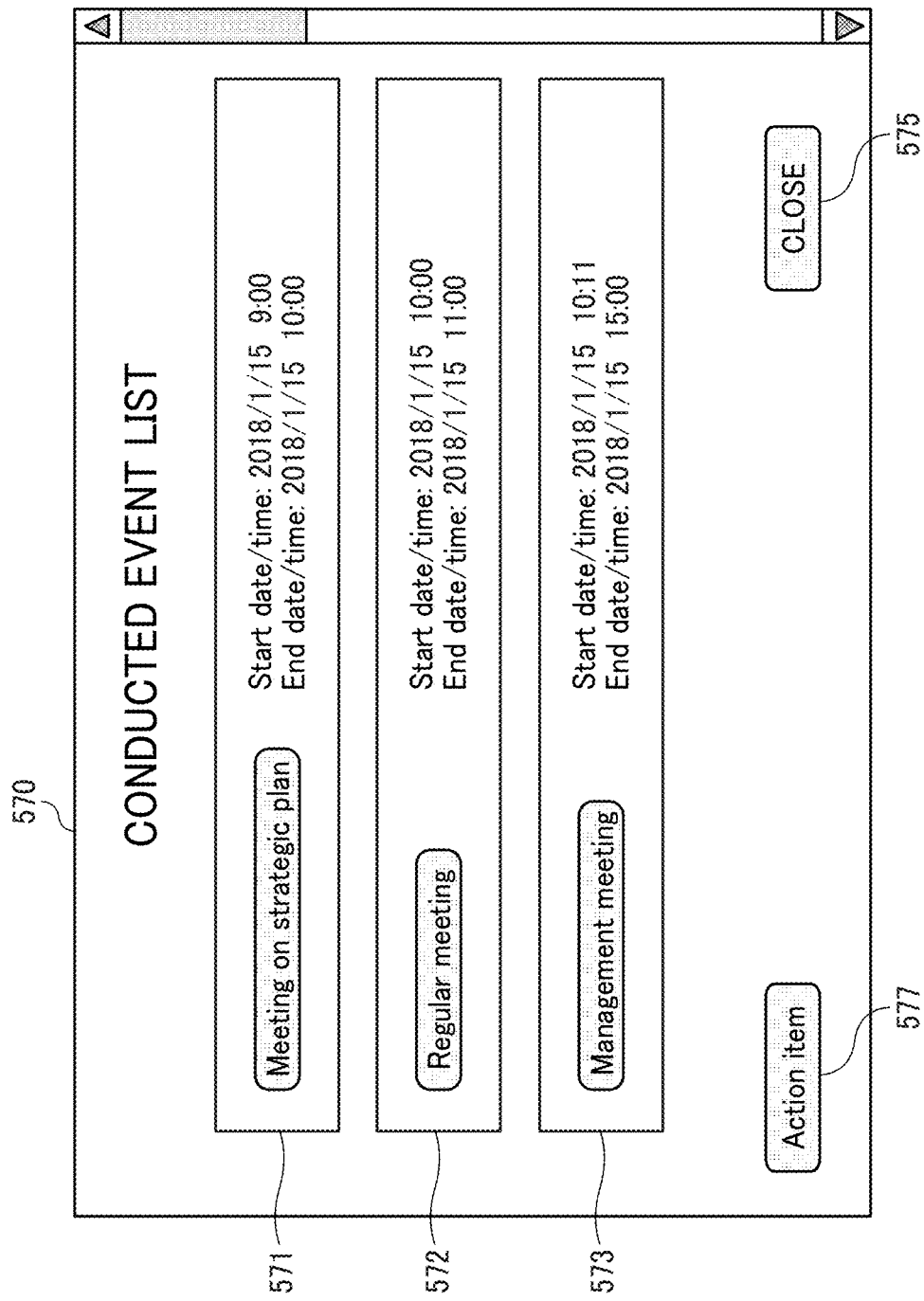
FIG. 56 is an illustration of an example of a conducted event list screen, displayed by the PC, according to an embodiment of the present disclosure.
Figure 57:
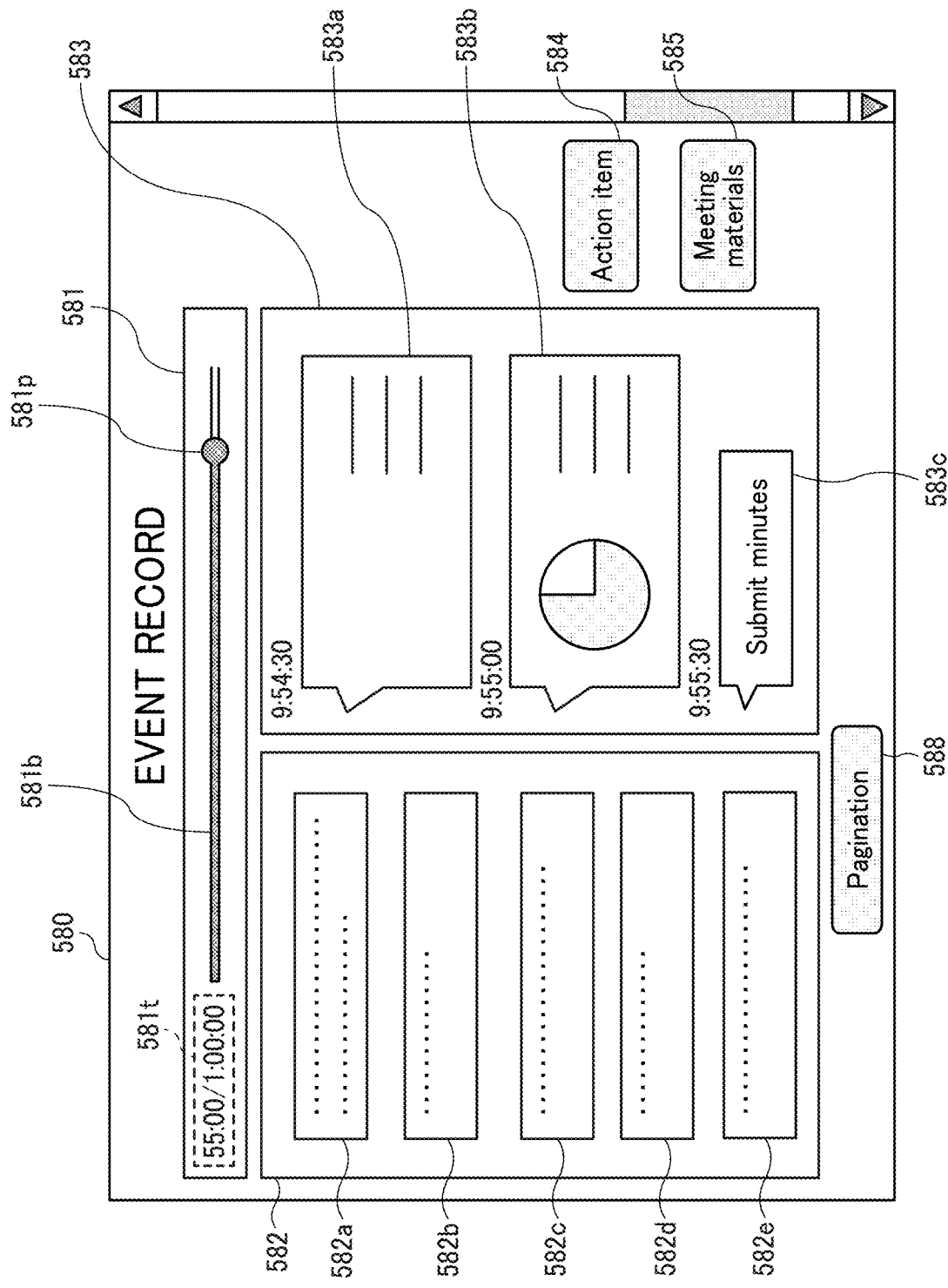
FIG. 57 is an illustration of an example of an event record screen, displayed by the PC, according to an embodiment of the present disclosure.
Figure 58:
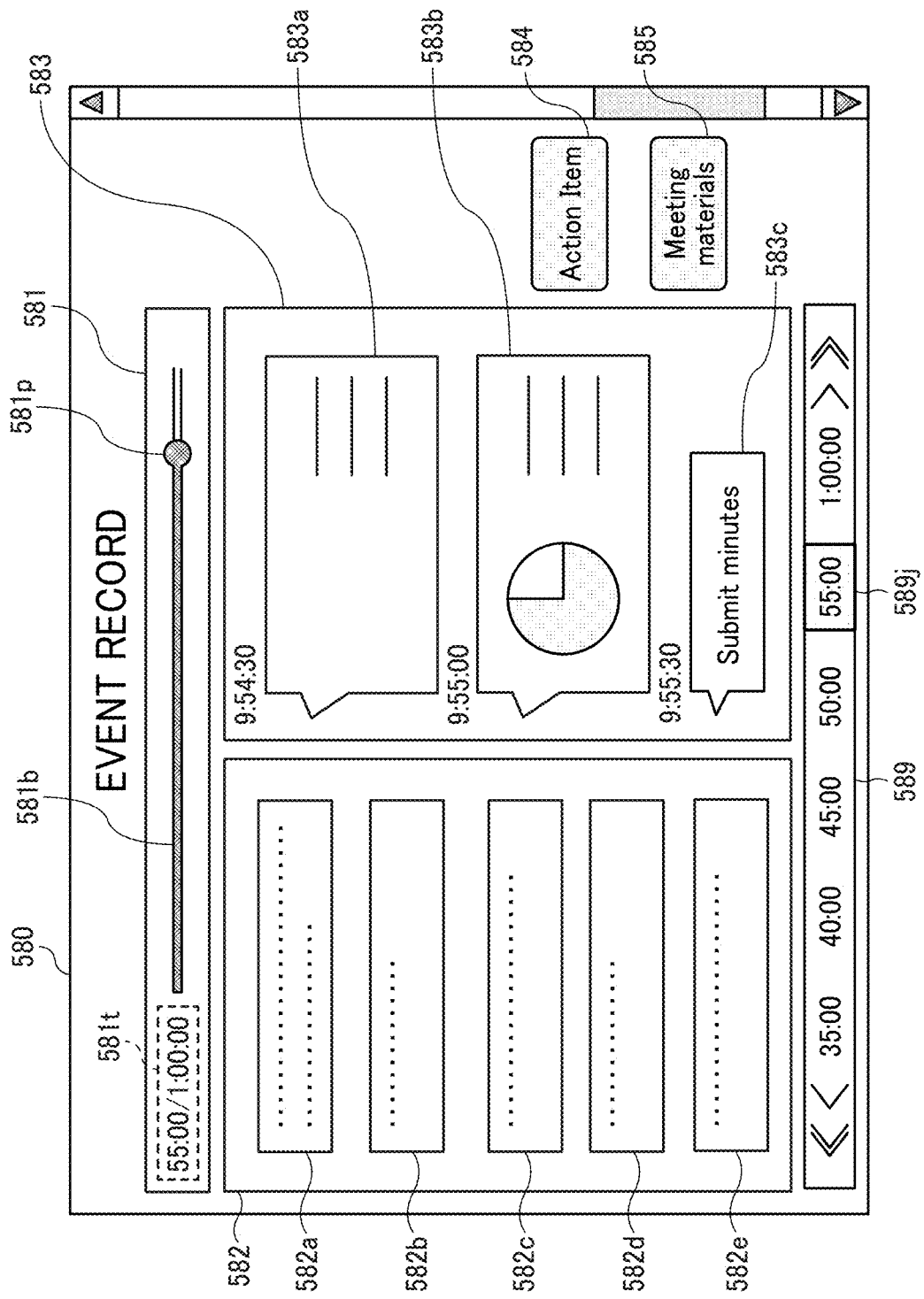
FIG. 58 is an illustration of an example of an event record screen, displayed by the PC, according to an embodiment of the present disclosure.
Figure 59:
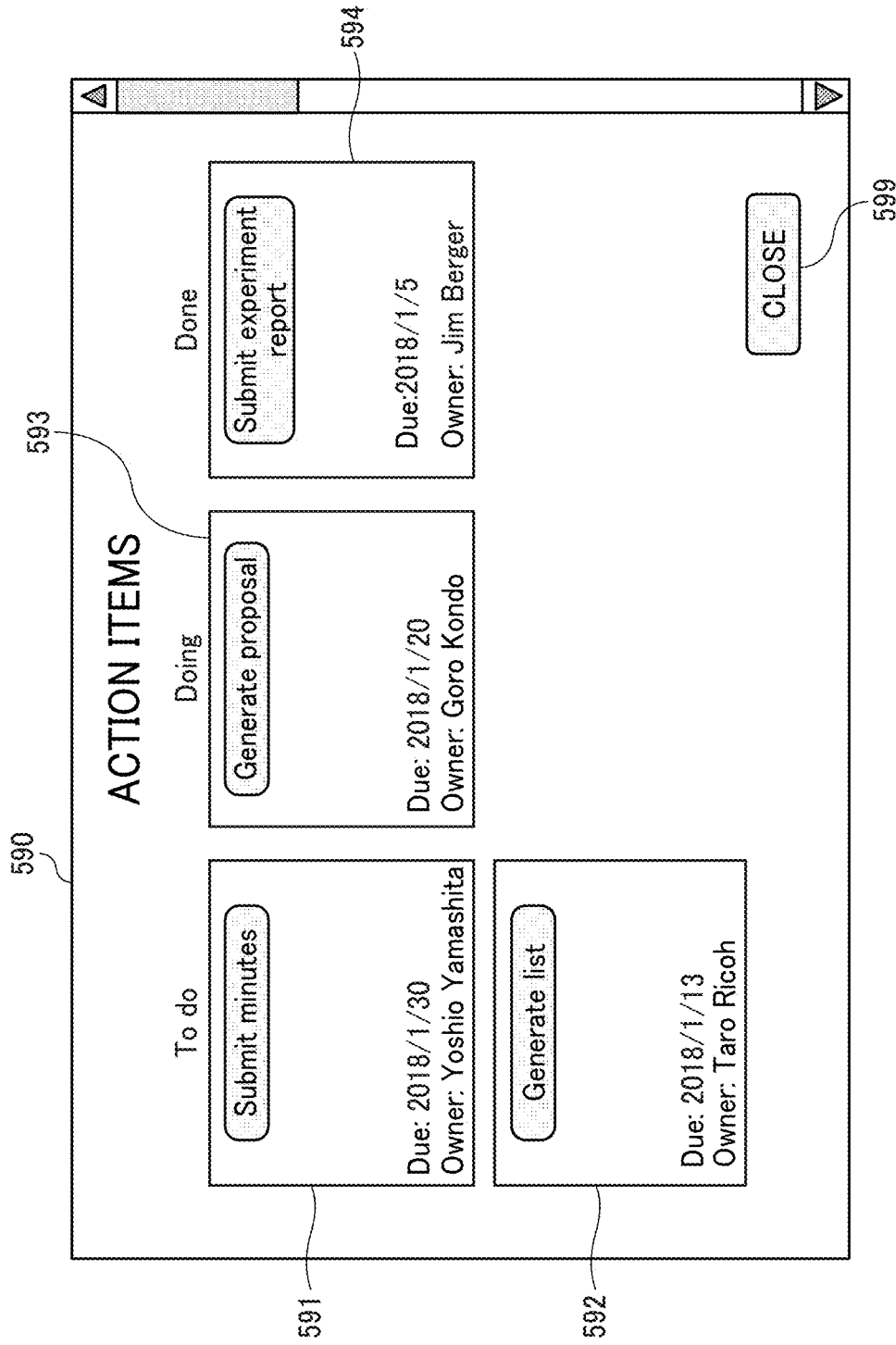
FIG. 59 is an illustration of an example of an action item screen, displayed by the PC, according to an embodiment of the present disclosure.

Processing to View Event Record:

Referring to FIG. 53 to FIG. 59, operation of viewing of an event record is described according to an embodiment. FIG. 53 and FIG. 54 are sequence diagrams illustrating operation of outputting a record of the event, according to an embodiment. FIG. 55 is an illustration of an example of a project list screen, displayed by the PC 5. FIG. 56 is an illustration of an example of a conducted event list screen, displayed by the PC 5. FIG. 57 and FIG. 58 are each an illustration of an example of an event record screen, displayed by the PC 5. FIG. 59 is an illustration of an example of an action item screen, displayed by the PC 5. Referring now to FIG. 53 and FIG. 54, example operation of outputting a record of the event to be viewed by a user is described. Processes of S111 to S117 of FIG. 53 are performed in substantially the similar manner as described above referring to S11 to S17 of FIG. 20, and redundant description thereof is omitted.

In response to pressing of the "View event record" button 543 in the menu screen 540 of FIG. 22, the acceptance unit 52 of the PC 5 accepts a request for viewing the event record (S118).

The transmission/reception unit 51 of the PC 5 transmits an event record viewing request, which indicates a request for viewing the event record, to the schedule management server 8 (S119). Accordingly, the transmission/reception unit 81 of the schedule management server 8 receives the event record viewing request.

Next, the storing/reading processing unit 89 of the schedule management server 8 searches the project member management DB 8007 (FIG. 15B) using the user ID and the organization ID received at S113 as a search key, to obtain the project IDs and the project names of all projects, which correspond to the user ID and the organization ID (S120). The transmission/reception unit 81 transmits the project ID and the project name of each project to the PC 5 (S121).

The generation unit 56 of the PC 5 generates a project list screen 560 as illustrated in FIG. 55, using the project IDs and the project names of all projects that are received at S121 (S122). The display control unit 54 of the PC 5 controls the display 508 to display the project list screen 560 generated by the generation unit 56 (S123). The project list screen 560 includes contents that are substantially the same as contents included in the project list screen 240 displayed by the electronic whiteboard 2 as illustrated in FIG. 28. The project icons 561 to 566 and buttons 568 and 569 in FIG. 55 correspond to the project icons 241 to 246 and buttons 248 and 249 in FIG. 28, respectively.

For example, referring to FIG. 54, when the user A presses the project icon 561 with the mouse 512 or the like, the acceptance unit 52 accepts a selection of the project indicated by the project icon 561 (S124).

The transmission/reception unit 51 of the PC 5 transmits the project ID of the project selected at S124 to the schedule management server 8 (S125). Accordingly, the transmission/reception unit 81 of the schedule management server 8 receives the project ID.

The storing/reading processing unit 89 of the schedule management server 8 searches the conducted event record management DB 8008 (FIG. 16A) using the project ID received at S125 as a search key, to obtain the corresponding conducted event ID (S126). The storing/reading processing unit 89 reads all conducted event IDs associated with the project ID received at S125. The storing/reading processing unit 89 further searches the conducted event management DB 8009 (FIG. 16B), using each conducted event ID read at S126 as a search key, to read the event start and end information corresponding to the conducted event ID (S127). The event start and end information includes the conducted event ID, the event name, the event start date and time, and the event end date and time.

The transmission/reception unit 81 transmits the conducted event ID, event name, event start date and time, and event end date and time, read at S127 for each conducted event of the selected project, to the PC 5 (S128). The transmission/reception unit 51 of the PC 5 receives the conducted event ID, event name, start date and time, and end date and time.

The generation unit 56 of the PC 5 generates a conducted event list screen 570 as illustrated in FIG. 56, using various data (or information) received at S128 (S129). The display control unit 54 of the PC 5 controls the display 508 to display the conducted event list screen 570 generated by the generation unit 56 (S130). As illustrated in FIG. 56, the conducted event list screen 570 includes event information 571, 572, and 573, etc., each indicating an event that was held. For example, the event information 571 to 573 each include a name of the conducted event, and start date and time and end date and time of the conducted event. The event information 571 to 573 is an example of record information selection area for receiving a selection of a conducted event subjected to viewing the event record. The conducted event list screen 570 further includes a "CLOSE" button 575 to be pressed to close the conducted event list screen 570, at its lower right. The conducted event list screen 570 further includes a "Action Item" button 577 to be pressed to view the action item, at its lower left. The "Action Item" button 577 is an example of an action item selection area for receiving an instruction to display an action item.

The acceptance unit 52 of the PC 5 accepts selection of a conducted event in the conducted event list screen 570 (S131). Specifically, when the user selects the event information for a particular conducted event, from the conducted event list screen 570, the acceptance unit 52 receives a selection of the particular conducted event. The transmission/reception unit 51 of the PC 5 transmits the conducted event ID of the conducted event of which selection is accepted by the acceptance unit 52 at S131 to the schedule management server 8 (S132). Accordingly, the transmission/reception unit 81 of the schedule management server 8 receives the conducted event ID.

The storing/reading processing unit 89 of the schedule management server 8 searches the conducted event record management DB 8008 (FIG. 16A) using the conducted event ID received at S132 as a search key, to obtain event record information associated with the conducted event ID (S133). The event record information includes the content processing ID, type of content processing, start date and time of content processing, and end date and time of content processing.

The storing/reading processing unit 89 of the schedule management server 8 searches the related information management DB 8010 using the conducted event ID received at S132 as a search key, to obtain related information associated with the conducted event ID (S134). The related information includes the content generation time, content processing ID, and type of content processing, by type of content data. In case the content type is text data or image data, the related information further includes a sequence number. The content generation time included in the related information is an example of time information.

The storing/reading processing unit 89 reads out content data, from a storage destination of the content data, using information indicating the storage destination of the content data, which can be obtained from the event record information read at S133 (S135). The transmission/reception unit 81 transmits, to the PC 5, the related information and the content data (S136). The transmission/reception unit 51 of the PC 5 receives the related information and the content data.

Next, the audio control unit 58 of the schedule management server 8 sets a playback start time of audio data (S137).

The audio data is an example of content data received at S136. In such case, the audio control unit 58 sets a playback start time of audio data, which is associated with the content generation time "00:00" in the related information, as the playback start time of audio data.

The generation unit 56 of the PC 5 generates an event record screen 580 as illustrated in FIG. 57, using the related information and the content data received at S136 (S138). More specifically, the generation unit 56 generates the event record screen 580 such that images of text data (voice text data) are displayed in a text data display area 582 in an order of sequence number in the related information. Further, the generation unit 56 generates the event record screen 580 such that images of image data (screenshot) are displayed in a screenshot data display area 583 in an order of sequence number in the related information. Further, the generation unit 56 generates the event record screen 580 such that a playback point 581p is displayed in a playback display area 581, specifically, at a location determined by the playback start time that is set at S137.

The display control unit 54 of the PC 5 controls the display 508 to display the event record screen 580 generated by the generation unit 56 (S139). Further, the audio control unit 58 of the PC 5 starts to playback the audio data from the playback start time that is set at S137. As illustrated in FIG. 57, in the event record screen 580, content data, each generated during the event, are displayed, side by side, while being classified by type of content processing. Specifically, the event record screen 580 includes the playback display area 581 for displaying a playback start time of audio data, the text data display area 582 for displaying text data converted from audio data, and the screenshot data display area 583 for displaying image data of screenshot. The event record screen 580 further includes an "action item" button 584 to be pressed to check the action item, a "meeting materials" button 585 to be pressed to check the meeting materials, and "pagination" button 588 to be pressed to display a pagination display area 589 illustrated in FIG. 58.

The playback display area 581 includes the playback point 581p, which is an example of a playback point selector that can be selected by the user to set the current location in the duration of audio data. The playback point selector further indicates a point where playback of audio data starts, which could be any point of a total playback time. The playback point selector, which may be draggable by the user, may be implemented by a seekbar thumb or a slider. While the playback point 581p is displayed as a point in this example, the playback point selector may have any desired graphical representation. For example, the playback point selector may be displayed as having any shape such as a circle, square, etc., or may be displayed as any graphical component such as an icon or a thumbnail image. The playback display area 581 further includes a slider bar 581b. Similarly to a progress bar, the slider bar 581b keeps track of the current location in the duration of audio data. With this function, the slider bar 581b is able to show a playback progress. With the playback point 581p and the slider bar 581b, the user can instantly know which part of voice data has been reproduced. The playback display area 581 further includes a playback time indicator 581t, which indicates a numeral value of the current playback time point with respect to the total playback time. With the playback time indicator 581t, the user can instantly know, which part of audio data is currently output, out of the total playback time. In this example, the playback point 581p and the slider bar 581b may be collectively referred to as a seek bar. The seek bar is an area for receiving designation on a playback start time of recorded data, while displaying the playback point of the recorded data. The user is able to instantly know which part of the recorded data is being reproduced, from the beginning to the end, by referring to the position of the playback point 581p on the slider bar 581b. The user can move the playback point 581p using any desired input device such as the mouse 512, to instruct to playback the recorded data from any desired playback point. The playback point 581p is an example of a playback point selector. The seek bar, that is, the playback point 581p and the slider bar 581b, are an example of a playback progress display image.

Still referring to FIG. 57, in the text data display area 582, text data 582a, 582b, 582c, 582d, and 582e are displayed in an order determined by the content generation time. In this example, text data 582a, 582b, 582c, 582d, and 582e are displayed, from the top to the bottom, in a temporal order determined by the content generation time. Similarly, in the screenshot data display area 583, screenshot (captured) images 583a, 583b, and 583c are displayed in an order determined by the content generation time. In this example, screenshot images 583a, 583b, and 583c are displayed, from the top to the bottom, in a temporal order determined by the content generation time. Thus, the text data display area 582 and the screenshot data display area 583 are displayed, side by side, in time series. As the user moves the playback point 581p with the mouse, for example, the acceptance unit 52 detects such movement. The display control unit 54 changes text data displayed in the text data display area 582 and screenshot image data displayed in the screenshot data display area 583, to text data and screenshot image data each corresponding to a point of time that is indicated by the moved position of the playback point 581p. For example, if the user is looking for some information on a particular topic, the user can easily find out a time period during when such topic has been discussed, using the image data of screenshot or the text data of voice. For example, with the screenshot image 583b showing a circle graph, the user is able to recognize more easily a time during when the circle graph has been discussed. Once the screenshot image 583b of the circle graph is found, the user can easily find the text data 582c and 582d, which are displayed side by side with this screenshot image 583b, to check details of discussion. In this example, the screenshot images 583a and 583b are each a screenshot image of the entire screen of the display 220. The image 583c is an image of an action item, which has been detected at S71-2.

FIG. 58 is an illustration of an example image, which is displayed on the display 508, in response to pressing of the "pagination" button 588 illustrated in FIG. 57. In this disclosure, "pagination" functions as a navigator, which assists a user in moving between pages in case contents are displayed in more than one page. For example, for the webpage, "pagination" corresponds to processing to divide display contents into a plurality of pages, and providing a link to each page. Using the "pagination", the user can easily access a desired content, while the content provider can easily know which content the user is viewing. "Pagination" is also referred to as "page division", "page feed", "paging", or "pager".

When the user presses the "pagination" button 588, the acceptance unit 52 receives the pressing of the "pagination" button 588. As illustrated in FIG. 58, the display control unit 54 controls the display 508 to display a pagination display area 589 at a lower part of the event record screen 580. In this pagination display area 589, for example, a total event time (such as a total meeting time) is divided into a plurality of time slots (here, every 5 minutes), while the time slot having a point of time indicated by the playback point 581p is displayed differently (elapsed time display area 589j). In this example, such time slot is bounded by a bold line. Until the pressing of the "pagination" button 588 is accepted, the acceptance unit 52 waits for the pressing.

When the acceptance unit 52 of the PC 5 receives selection of the "Action Item" button 577 of the conducted event list screen 570 at S131, the generation unit 56 displays an action item screen 590 as illustrated in FIG. 59. The display control unit 54 controls the display 508 to display the action item screen 590 generated by the generation unit 56. As illustrated in FIG. 59, the action item screen 590 includes action item information 591 to 594. For example, the action item information 591 includes an image representing details of the action item identified as described above referring to FIG. 45, the user name selected from the candidate list of FIG. 46, and the due date entered via the screen of FIG. 47. The action item screen 590 further includes a "CLOSE" button 599 to be pressed to close the action item screen 590, at the lower right. The action item screen 590 illustrated in FIG. 59 displays all action items associated with the project ID that has been selected at S124. When the acceptance unit 52 receives pressing of the "action item" button 584 on the event record screen 580 illustrated in FIG. 57, the display control unit 54 controls the display 508 to display the action item screen 590 in substantially the similar manner.

As described above referring to FIG. 53 to FIG. 59, the event record screen is displayed using the PC 5. Alternatively, the user may select the icon r2 illustrated in FIG. 30, to cause the electronic whiteboard 2 to display the event record screen. In addition, as described above referring to FIG. 20, the operation of registering a schedule is performed using the PC 5. Alternatively, the schedule registration may be performed using the electronic whiteboard 2 in substantially the similar manner. Any example operation, or any screen processed during such operation, illustrated in FIG. 53 to FIG. 59, is performed or displayed by the PC 5. In a substantially similar manner, the above-described operation or screen may be performed or displayed at least in part using any other device such as the electronic whiteboard 2, the videoconference terminal 3, and the car navigation system 4.

The image data for display at the PC 5, as described above referring to FIG. 53 to FIG. 59, is generated by the generation unit 56 of the PC 5. Alternatively, such image data may be generated by the schedule management server 8. In such case, in one example, at the schedule management server 8, the generation unit 83 generates image data, and the transmission/reception unit 81 transmits the generated image data to the PC 5 for display.

In one or more embodiments, as illustrated in FIG. 31 to FIG. 40, the electronic whiteboard 2 is a communication terminal communicable with the voice-to-text conversion server 9 (an example of conversion system) that converts audio data relating to content generated during an event currently being conducted into text data.

The electronic whiteboard 2 accepts selection of one of a first mode (e.g., the sound source "Microphone" included in the subtitle display setting screen 120) and a second mode (e.g., the sound source "LOOPBACK" included in the subtitle display setting screen 120). In the first mode, audio data representing sound collected by the microphone 2200 (an example of a sound collecting device) is converted into text data. In the second mode, audio data representing sound to be output from the speaker 2300 (an example of a sound output device) is converted into text data. The electronic whiteboard 2 transmits audio data corresponding to the selected mode to the voice-to-text conversion server 9. The electronic whiteboard 2 receives text data converted from the transmitted audio data from the voice-to-text conversion server 9, and controls the display 220 (an example of a display unit) to display the received text data. Thereby, a user of the electronic whiteboard 2 can select a desired display format in which subtitles (text) is to be displayed according to the type of the event currently being conducted. The electronic whiteboard 2 displays subtitles (text) according to the type of the event currently being conducted.

Further, according to one or more embodiments, as illustrated in FIG. 31 to FIG. 40, the transmission/reception unit 21 (an example of first receiving means) of the electronic whiteboard 2 (an example of a communication terminal) receives audio data based on sound collected by another communication terminal, and the speaker 2300 (an example of a sound output device) outputs sound representing the audio data received by the transmission/reception unit 21. Thereby, when an event such as a remote conference is conducted using the electronic whiteboard 2 communicating with another communication terminal, the electronic whiteboard 2 can switch the communication terminal from which sound is to be acquired, wherein subtitles (text data) to be displayed is generated based on the sound. Further, the user of the electronic whiteboard 2 can select one of the electronic whiteboard 2 itself and another communication terminal as a target sound source from which collected voice is converted to text for display.

Furthermore, according to one or more embodiments, as illustrated in FIG. 31 to FIG. 40, the acceptance unit 22 (an example of accepting means) of the electronic whiteboard 2 (an example of a communication terminal) receives a selection of whether or not to display text based on the text data. When the acceptance unit 22 receives the selection to display the text, the display control unit 24 (an example of display control means) controls the display 220 (an example of a display unit) to display the text. Thereby, the user of the electronic whiteboard 2 can select whether or not to display subtitles (text) according to the type of event, and the electronic whiteboard 2 can switch whether to display subtitles (text) on the on-going-event screen 170 according to the user's request.

Further, according to one or more embodiments, as illustrated in FIG. 31 to FIG. 40, the acceptance unit 22 (an example of accepting means) of the electronic whiteboard 2 (an example of a communication terminal) receives a selection of a text display format. When the acceptance unit 22 receives the selection of a line-by-line display format as the text display format, the display control unit 24 (an example of display control means) controls the display 220 (an example of a display unit) to display the text line by line. By contrast, when the acceptance unit 22 receives the selection of a timeline display format, the display control unit 24 controls the display 220 to display the text in a timeline format (in a chronological order). Thereby, the user of the electronic whiteboard 2 can select a desired display format in which text is to be displayed according to the type of event and/or needs of the user, and the electronic whiteboard 2 can switch the text (subtitles) display format on the on-going-event screen 170 according to the user's request.

Furthermore, according to one or more embodiments, as illustrated in FIG. 31 to FIG. 40, the acceptance unit 22 (an example of accepting means) of the electronic whiteboard 2 (an example of a communication terminal) receives a selection of a display language of the text, and the display control unit 24 (an example of a display control means) controls the display 220 (an example of a display unit) to display the text based on the text data converted in the selected display language. Thereby, the user of the electronic whiteboard 2 can select a desired display language in which text is to be displayed according to the type of event and/or needs of the user, and the electronic whiteboard 2 can switch the language in which the text (subtitles) is displayed on the on-going-event screen 170 according to the user's request.

According to one or more embodiments of the present disclosure, at a communication terminal conducting an event, subtitle display is performed according to a type of the event currently being conducted.

Each of the functions of the described embodiments may be implemented by one or more processing circuits or circuitry.

Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. A communication terminal, comprising:
    circuitry configured to:
        control a display to display available sound source modes;
        receive an input, from a user in response to the display of the available sound source modes, of a selection of one of a first mode and a second mode of the available sound source modes, the first mode being in which audio data is obtained based on sound collected by a sound collecting device, the second mode being in which audio data is obtained based on sound to be output from a sound output device, and the audio data relates to content obtained during an event being conducted;
        transmit, to a conversion system via a network, audio data corresponding to the one of the first mode and the second mode indicated in the selection;
        receive, from the conversion system via the network, text data converted from the transmitted audio data; and
        control the display to display text based on the received text data.

2. The communication terminal of claim 1, wherein
    the circuitry is further configured to receive audio data obtained based on sound collected by another communication terminal, and
    the sound to be output from the sound output device is sound represented by the received audio data obtained based on the sound collected by the another communication terminal.

3. The communication terminal of claim 1, wherein the circuitry is further configured to:
    receive a second selection of whether to display text based on the text data; and
    control the display to display the text based on the text data in response to the second selection indicating to display the text.

4. The communication terminal of claim 1, wherein the circuitry is further configured to:
    receive a second selection of a desired display format in which the text is to be displayed; and
    control the display to display the text based on the text data in the desired display format indicated in the second selection.

5. The communication terminal of claim 4, wherein the circuitry is further configured to:
    receive a third selection of a line-by-line display format as the desired display format; and
    control the display to display the text line-by-line based on the text data.

6. The communication terminal of claim 4, wherein the circuitry is further configured to:
    receive a third selection of a timeline display format as the desired display format; and
    control the display to display the text in a chronological order based on the text data.

7. The communication terminal of claim 1, wherein the circuitry is further configured to:
    receive a second selection of a desired display language in which the text is to be displayed; and
    control the display to display the text based on the text data in the desired display language indicated in the second selection.

8. A sharing system, comprising:
    the communication terminal of claim 1; and
    the conversion system communicably, which includes second circuitry configured to:
        receive the audio data transmitted by the communication terminal;
        convert the received audio data into the text data; and
        transmit the text data to the communication terminal.

9. The sharing system of claim 8, further comprising:
    a control system communicable with the communication terminal, the control system configured to store content data related to content obtained during an event being conducted, wherein
    the communication terminal transmits the content data to the control system.

10. A display control method performed by a communication terminal, the display control method comprising:
    controlling a display to display available sound source modes;
    receiving an input, from a user in response to the display of the available sound source modes, of a selection of one of a first mode and a second mode of the available sound source modes, the first mode being in which audio data is obtained based on sound collected by a sound collecting device, the second mode being in which audio data is obtained based on sound to be output from a sound output device, and the audio data relates to content obtained during an event being conducted;
    transmitting, to a conversion system via a network, audio data corresponding to the one of the first mode and the second mode indicated in the selection;
    receiving, from the conversion system via the network, text data converted from the transmitted audio data; and
    controlling the display to display text based on the received text data.

11. The display control method of claim 10, wherein
the method further comprises receiving audio data obtained based on sound collected by another communication terminal, and
the sound to be output from the sound output device is sound represented by the received audio data obtained based on the sound collected by the another communication terminal.

12. The display control method of claim 10, further comprising:
receiving a second selection of whether to display text based on the text data; and
controlling the display to display the text based on the text data in response to the second selection indicating to display the text.

13. The display control method of claim 10, further comprising:
receiving a second selection of a desired display format in which the text is to be displayed; and
controlling the display to display the text based on the text data in the desired display format indicated in the second selection.

14. The display control method of claim 13, further comprising:
receiving a third selection of a line-by-line display format as the desired display format; and
controlling the display to display the text line-by-line based on the text data.

15. The display control method of claim 13, further comprising:
receiving a third selection of a timeline display format as the desired display format; and
controlling the display to display the text in a chronological order based on the text data.

16. The display control method of claim 10, further comprising:
receiving a second selection of a desired display language in which the text is to be displayed; and
controlling the display to display the text based on the text data in the desired display language indicated in the second selection.

17. A non-transitory computer-readable medium storing computer executable instructions which, when executed by circuitry of a communication terminal, causes the communication terminal to:
control a display to display available sound source modes;
receive an input, from a user in response to the display of the available sound source modes, of a selection of one of a first mode and a second mode of the available sound source modes, the first mode being in which audio data is obtained based on sound collected by a sound collecting device, the second mode being in which audio data is obtained based on sound to be output from a sound output device, and the audio data relates to content obtained during an event being conducted;
transmit, to a conversion system via a network, audio data corresponding to the one of the first mode and the second mode indicated in the selection;
receive, from the conversion system via the network, text data converted from the transmitted audio data; and
control the display to display text based on the received text data.

18. The non-transitory computer-readable medium of claim 17, wherein
the communication terminal is further is further caused to receive audio data obtained based on sound collected by another communication terminal, and
the sound to be output from the sound output device is sound represented by the received audio data obtained based on the sound collected by the another communication terminal.

19. The non-transitory computer-readable medium of claim 17, wherein the communication terminal is further is further caused to:
receive a second selection of whether to display text based on the text data; and
control the display to display the text based on the text data in response to the second selection indicating to display the text.

20. The non-transitory computer-readable medium of claim 17, wherein the communication terminal is further is further caused to:
receive a second selection of a desired display format in which the text is to be displayed; and
control the display to display the text based on the text data in the desired display format indicated in the second selection.

* * * * *